United States Patent
Boemi et al.

(10) Patent No.: US 12,556,418 B2
(45) Date of Patent: Feb. 17, 2026

(54) MULTI-DROP PoE NETWORK FOR POWER DISTRIBUTION AND COMMUNICATION

(71) Applicant: POE-X PTY LTD., Kenthurst (AU)

(72) Inventors: Norman Samuel Boemi, Kenthurst (AU); David John Bull, Lane Cove (AU); James Bull, North Kellyville (AU)

(73) Assignee: POE-X PTY LTD., Kenthurst (AU)

( * ) Notice: Subject to any disclaimer, the term of this patent is extended or adjusted under 35 U.S.C. 154(b) by 103 days.

(21) Appl. No.: 18/572,611

(22) PCT Filed: Apr. 29, 2022

(86) PCT No.: PCT/AU2022/050396
§ 371 (c)(1),
(2) Date: Dec. 20, 2023

(87) PCT Pub. No.: WO2022/266696
PCT Pub. Date: Dec. 29, 2022

(65) Prior Publication Data
US 2024/0297804 A1  Sep. 5, 2024

(30) Foreign Application Priority Data

Jun. 21, 2021 (AU) .................. 2021901864
Aug. 23, 2021 (AU) .................. 2021902644
Aug. 24, 2021 (AU) .................. 2021107006

(51) Int. Cl.
*H04L 12/10* (2006.01)
*H02J 1/08* (2006.01)
(Continued)

(52) U.S. Cl.
CPC .............. *H04L 12/10* (2013.01); *H02J 1/08* (2013.01); *H02J 9/02* (2013.01); *H05B 47/187* (2024.01)

(58) Field of Classification Search
CPC .............. H04L 12/10; H04L 12/40032; H04L 12/40045; H02J 1/08; H02J 9/02;
(Continued)

(56) References Cited

U.S. PATENT DOCUMENTS

2018/0294982 A1* 10/2018 Boemi .............. H04L 12/40032
2020/0067718 A1*  2/2020 Karnik ................... H04L 12/42

* cited by examiner

Primary Examiner — David S Huang
(74) Attorney, Agent, or Firm — Maschoff Brennan

(57) ABSTRACT

The present invention proposes a DC power distribution system comprising power source equipment (PSE) providing high powered power over ethernet connections of 200 W per ethernet cable connected with powered devices (PDs) and power distribution units (PDUs). The PD and PDUs connected to the PSE have second ethernet port for extending the high power PoE connection to at least a second PDU or PD. The system also provides a common mode longitudinal system for communicating across the network of PSE, PD and PDU devices and sensor data and command data sent to and from connected PD. The PD and PDU devices incorporate a supervisor circuit for monitoring the s high power PoE connection and for directing the communications with other connected devices. The PDU devices incorporate DC-to-AC inverters for providing AC power, locally from the high power PoE DC connections, where AC power is required.

20 Claims, 57 Drawing Sheets

(51) Int. Cl.
*H02J 9/02* (2006.01)
*H05B 47/185* (2020.01)

(58) Field of Classification Search
CPC .......... H02J 1/00; H02J 9/061; H02J 2300/20; H02J 2310/12; H05B 47/187; H05B 47/185; H02H 3/08; H02H 3/207; H02H 5/04; H01R 13/52; H01R 25/006; H01R 24/64; H02B 1/52; H02M 7/21; H04Q 1/13

See application file for complete search history.

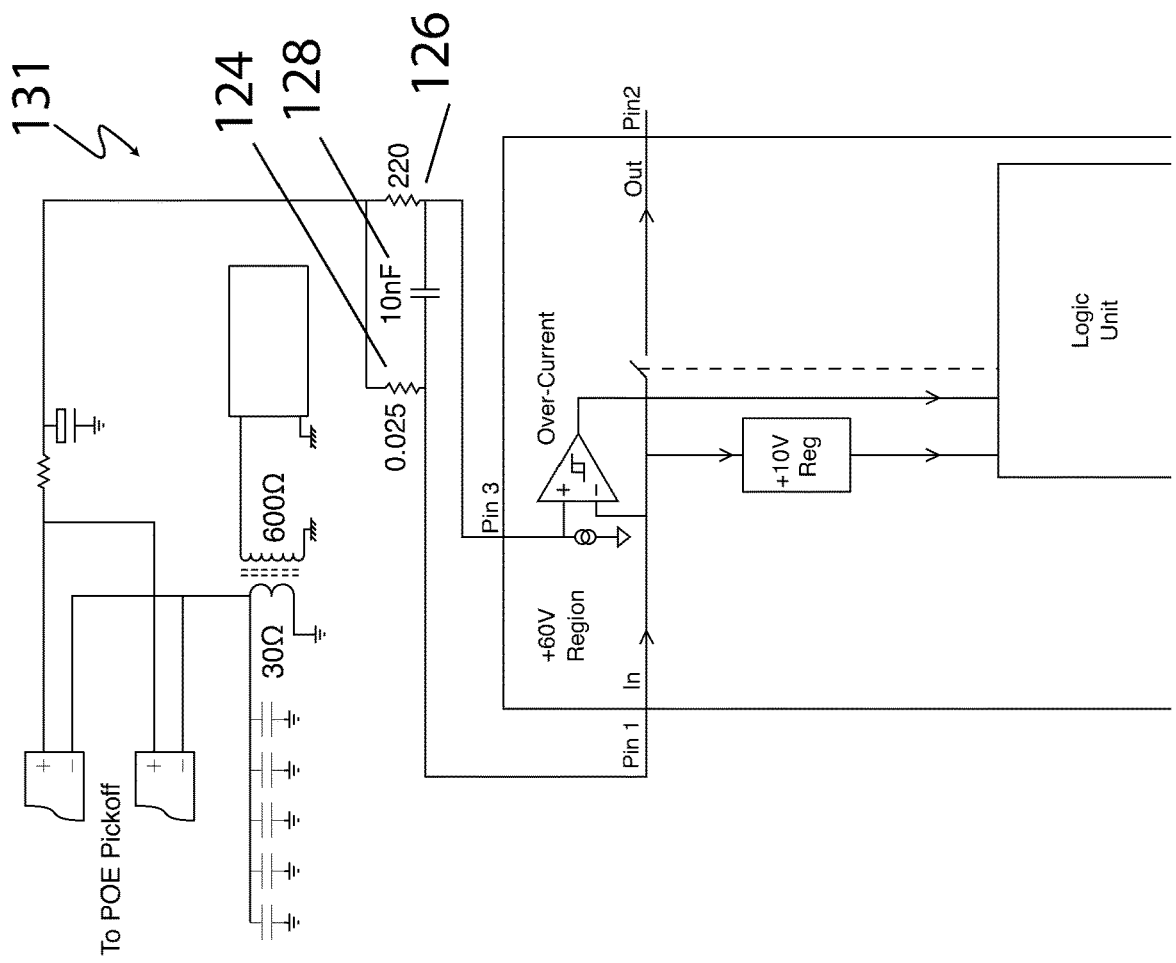

| Pin# | Description | Conditions | Comments |
|---|---|---|---|
| 1 | PoE DC in | 30v < V < 70v | Supply to Switch and Internal Regulators |
| 2 | Output Switch | $I_{switch}$< 10A  -0.8v< V < 90v | Either used as isolation switch for DC:AC convertor or as a stand-alone CC or CV-LED drive |
| 3 | Over Current Sense/Set | Vcc - 6V | |
| 4 | Oscillator-input | -0.6v< V< 10.5v | 220 KHz Crystal or LC resonant circuit |
| 5 | Oscillator- out put | -0.6v< V< 10.5v | 220 KHz Crystal or LC resonant circuit |
| 6 | +5V (Internal) | (<40mA) | Supplies modem, microcontroller and buck reg bias |
| 7 | GND | | < 20mA For modem, micro and buck reg |
| 8 | Low-Voltage Lockout SetD | -0.6v< V< 10.5v | $R_{VoltageSet}$=5.0V |
| 9 | High Temperature Lockout Set | -0.6v< V< 70v | $R_{TempSet}$=100Ω/TMax |
| 10 | Load Sense Amp Feedback | -0.6v< V< 10.5v | Load feedback sense |
| 11 | Load Sense Amp Gain Set | -0.6v< V< 10.5v | Buck reg Gain Set by Resistor to Pin 12 |
| 12 | Load Sense Amp Out | -0.6v< V< 10.5v | Buck Reg Gain Set |
| 13 | Start-up-Lockout Timer | Active Low | Typically, 1ms.for inrush current settling |
| 14 | Drive Inhibit | Active Low | 1/P used for microcontroller based PWM dimming |
| 15 | Under Voltage Alarm | Active Low | Open Drain O/P (can drive status LED or uCinput) |
| 16 | Over Temperature Alarm | Active Low | Open Drain O/P (can drive status LED or uCinput) |
| 17 | Over Current Alarm | Active Low | Open Drain O/P (can drive status LED or uCinput) |

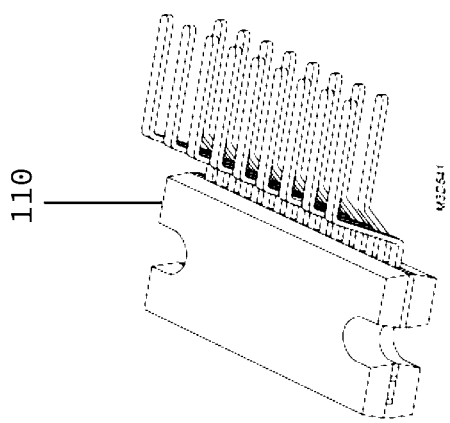

Fig. 30

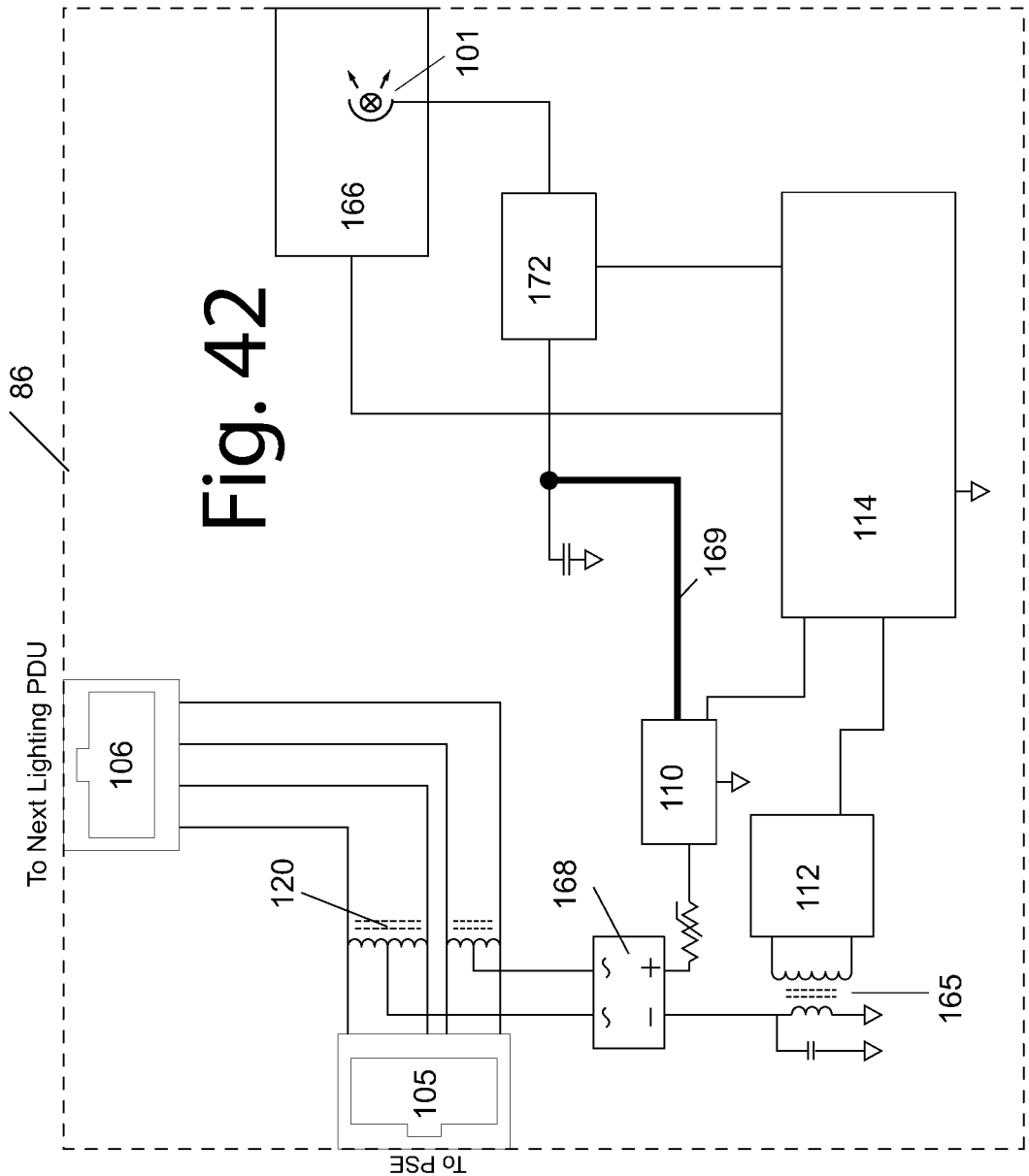

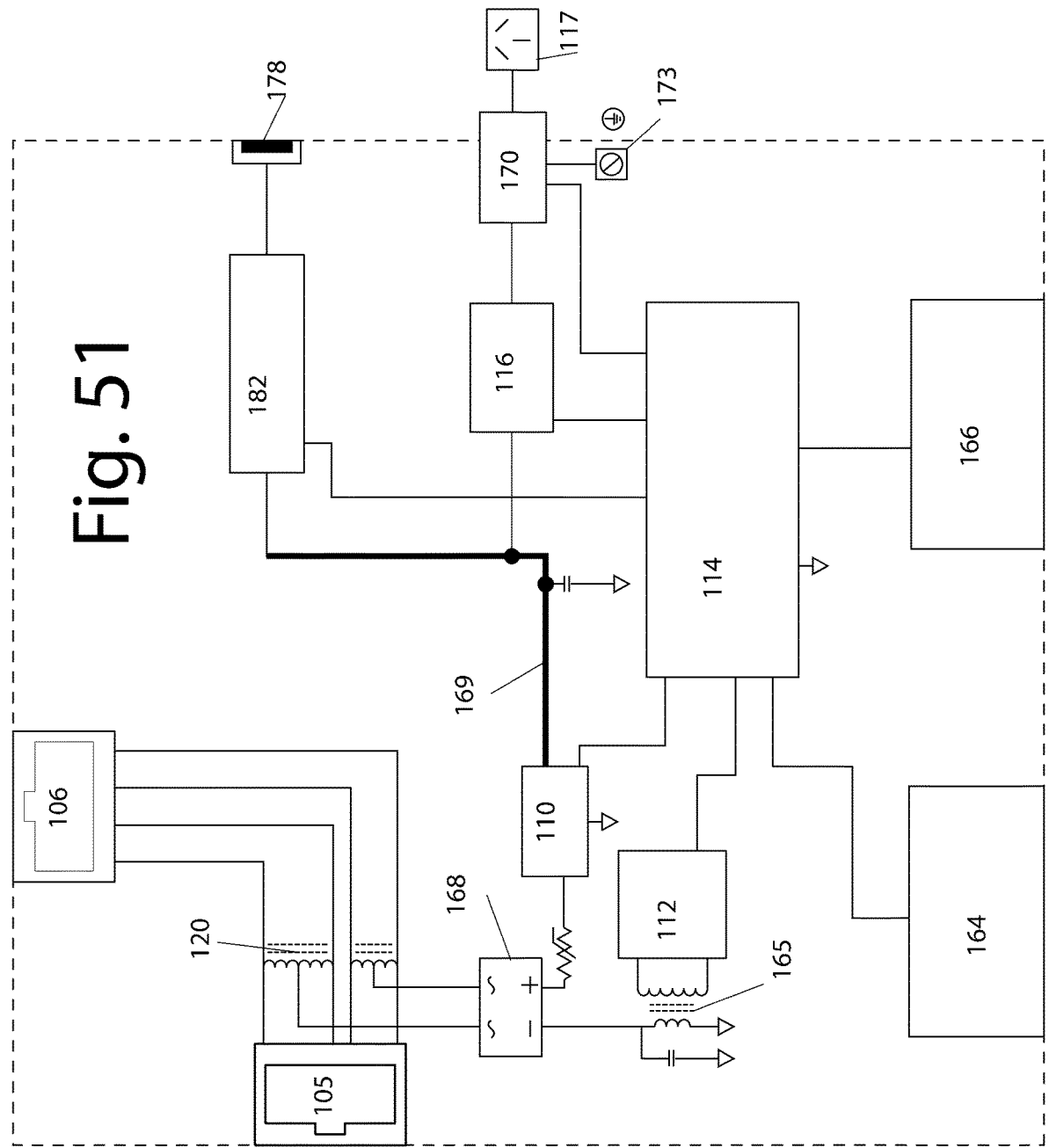

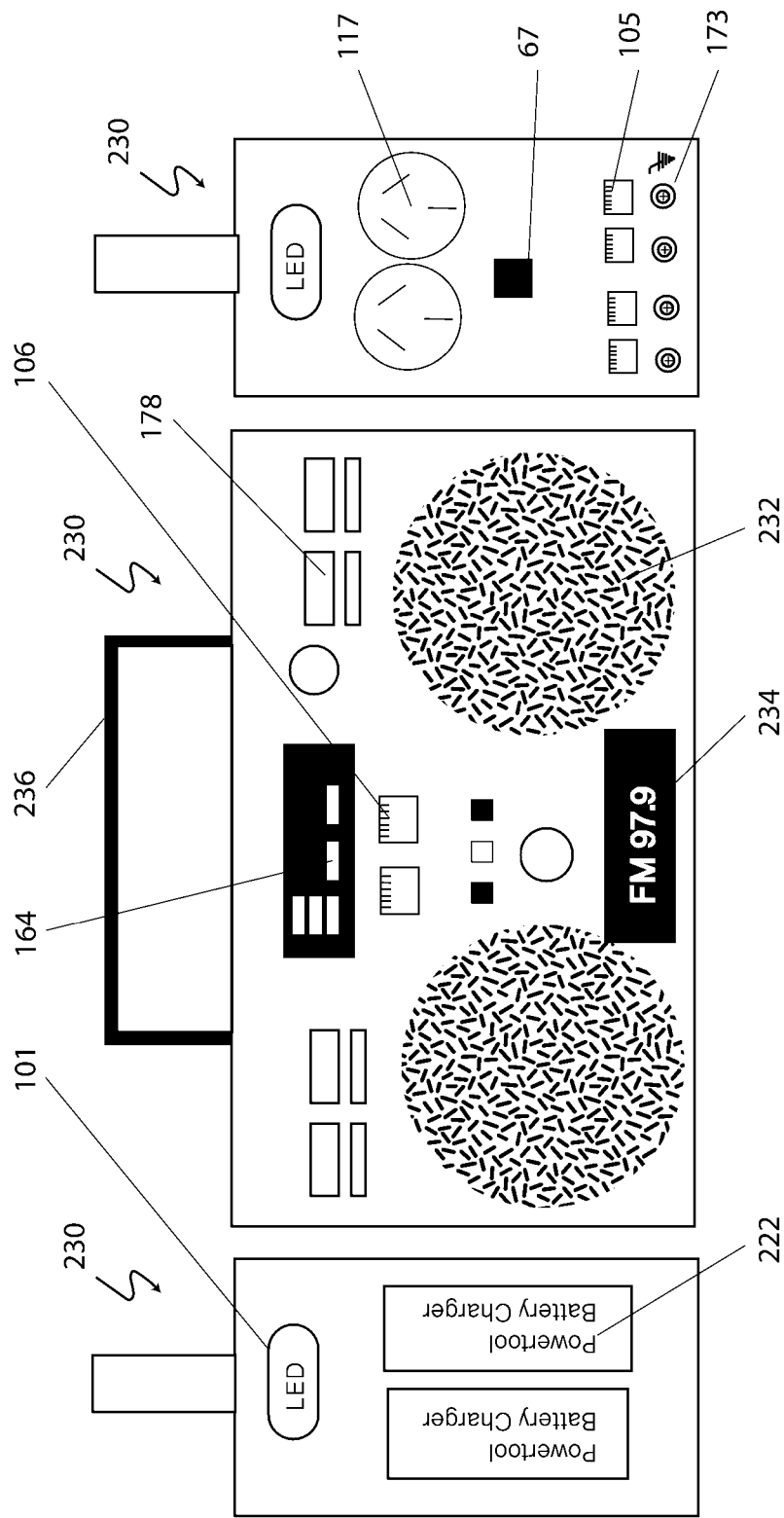

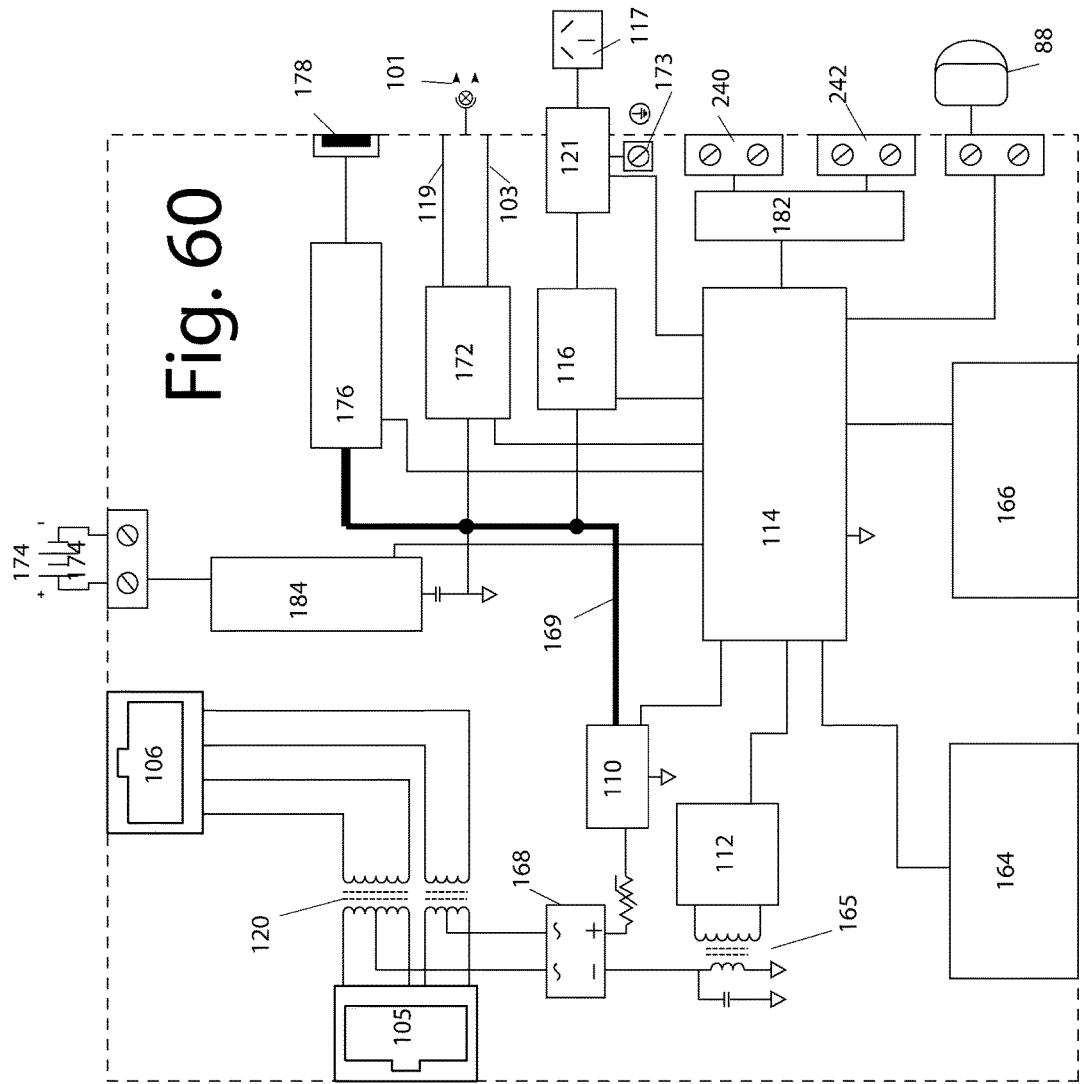

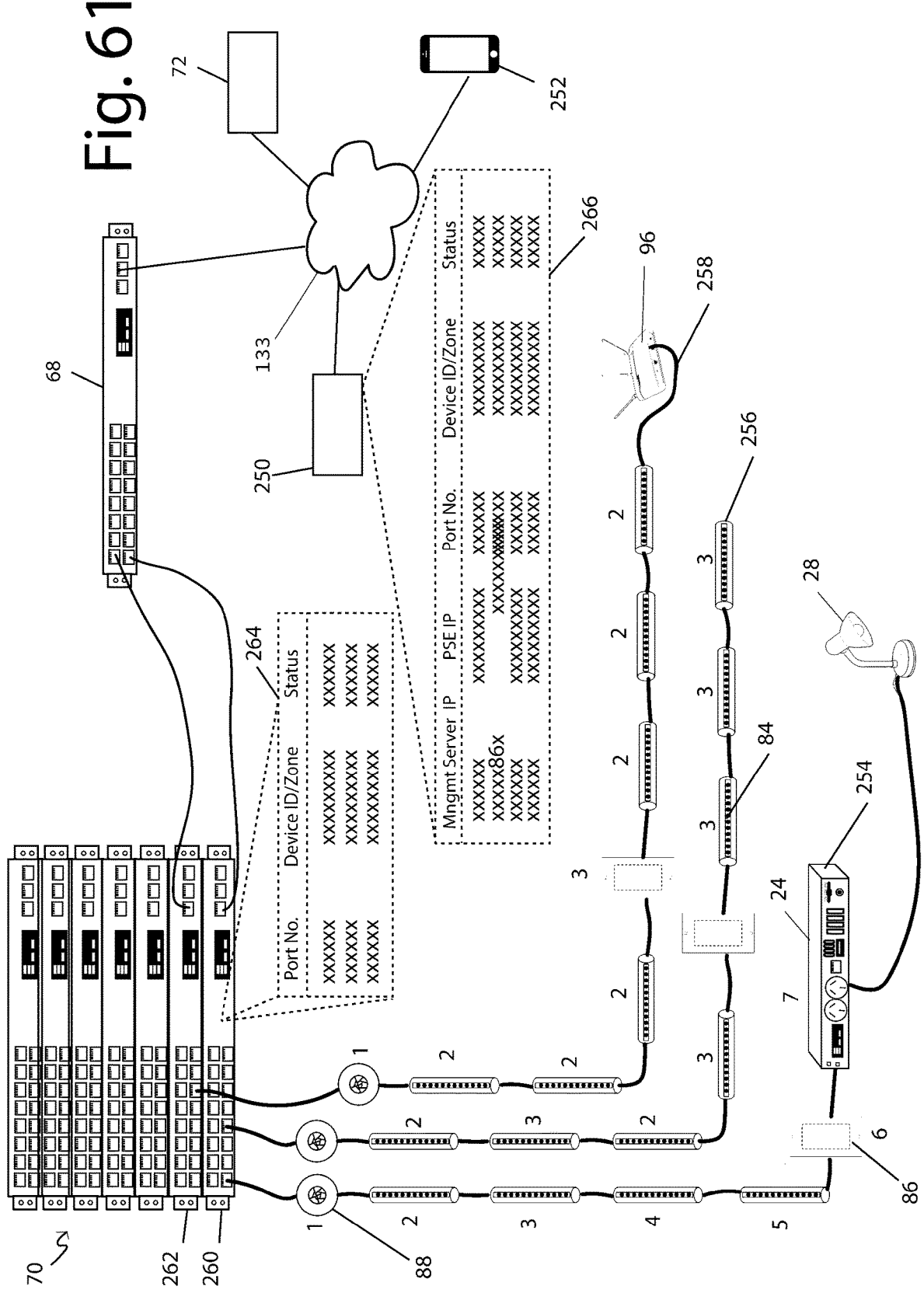

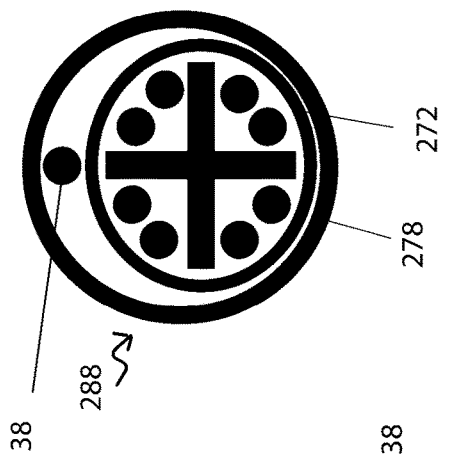
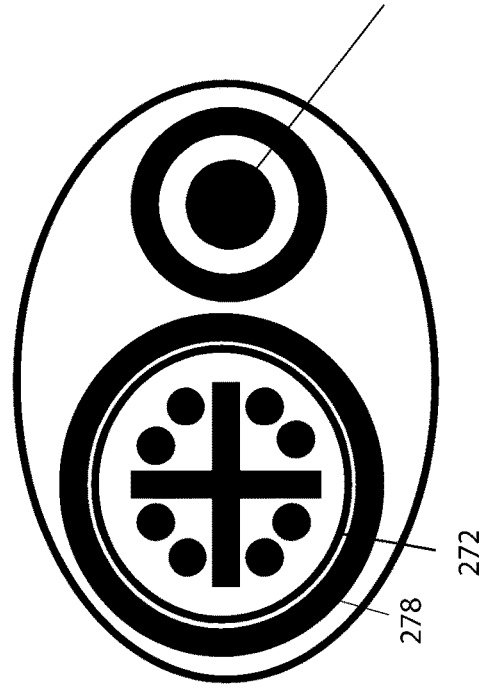
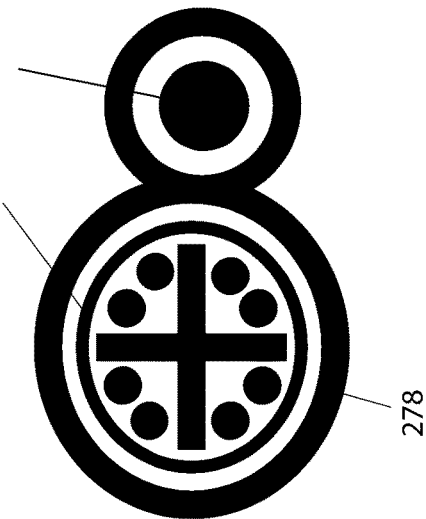
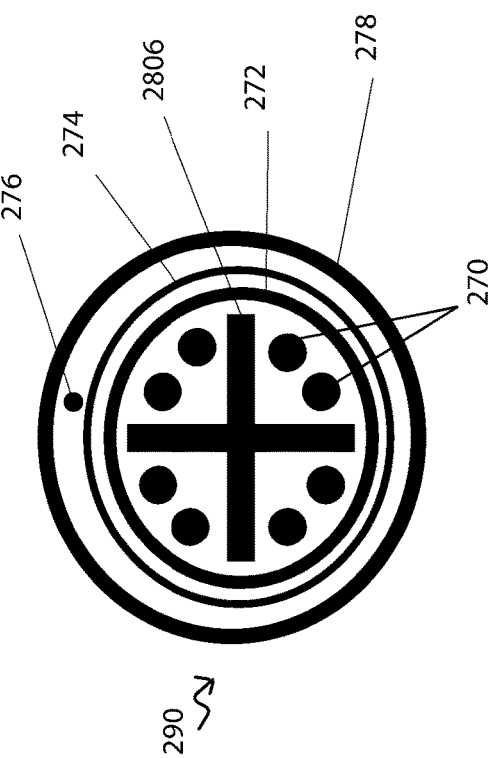
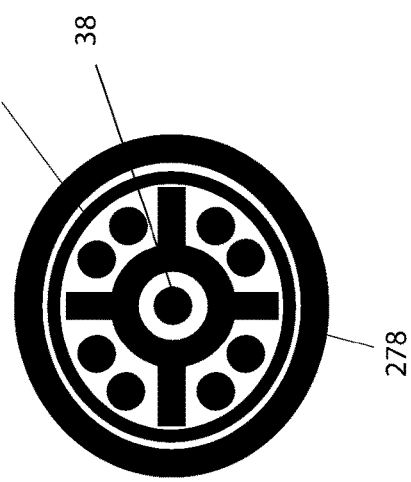

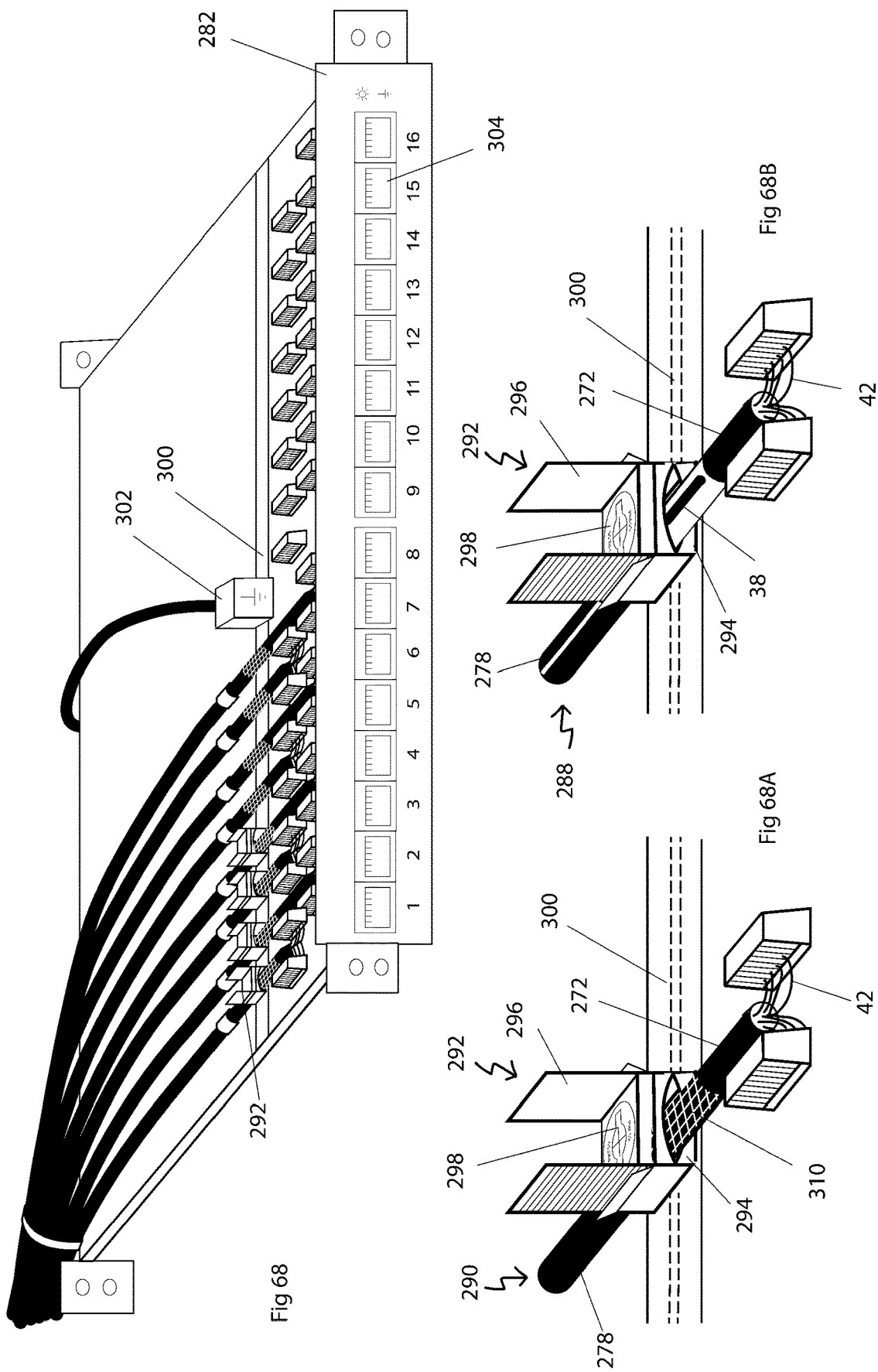

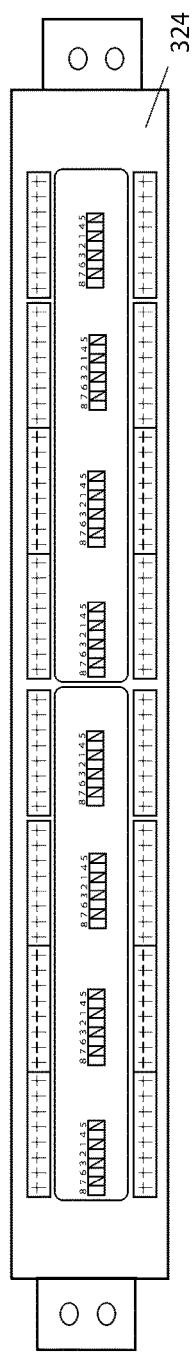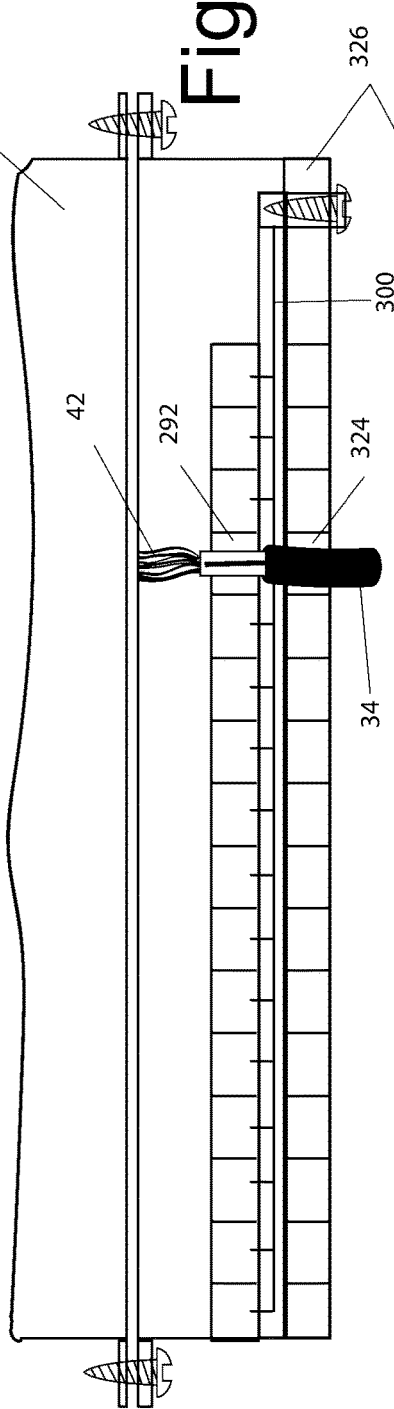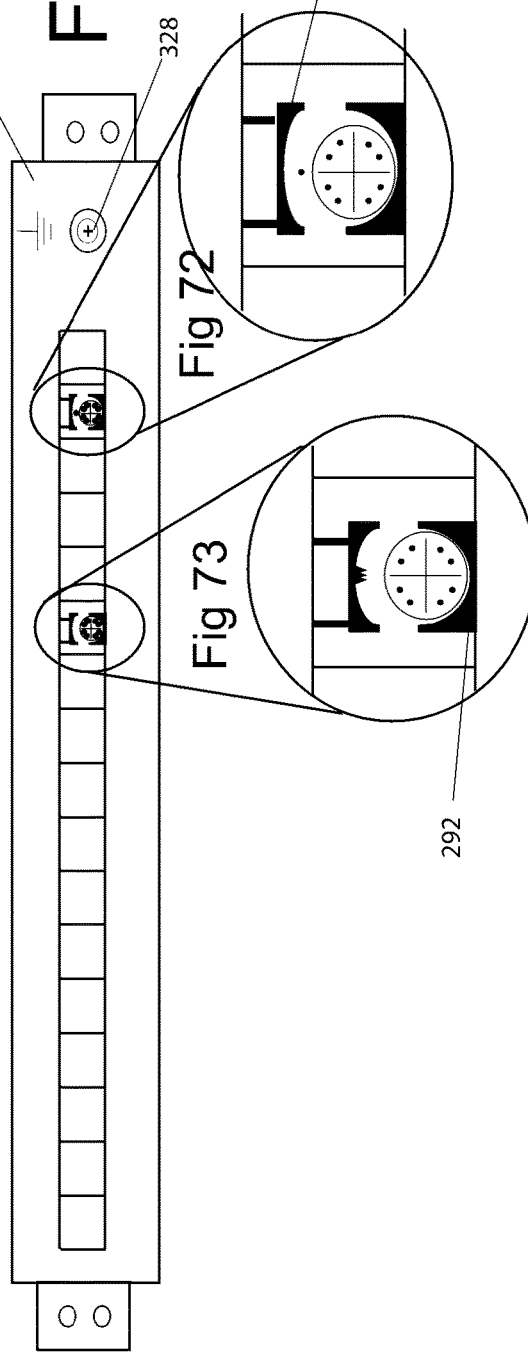

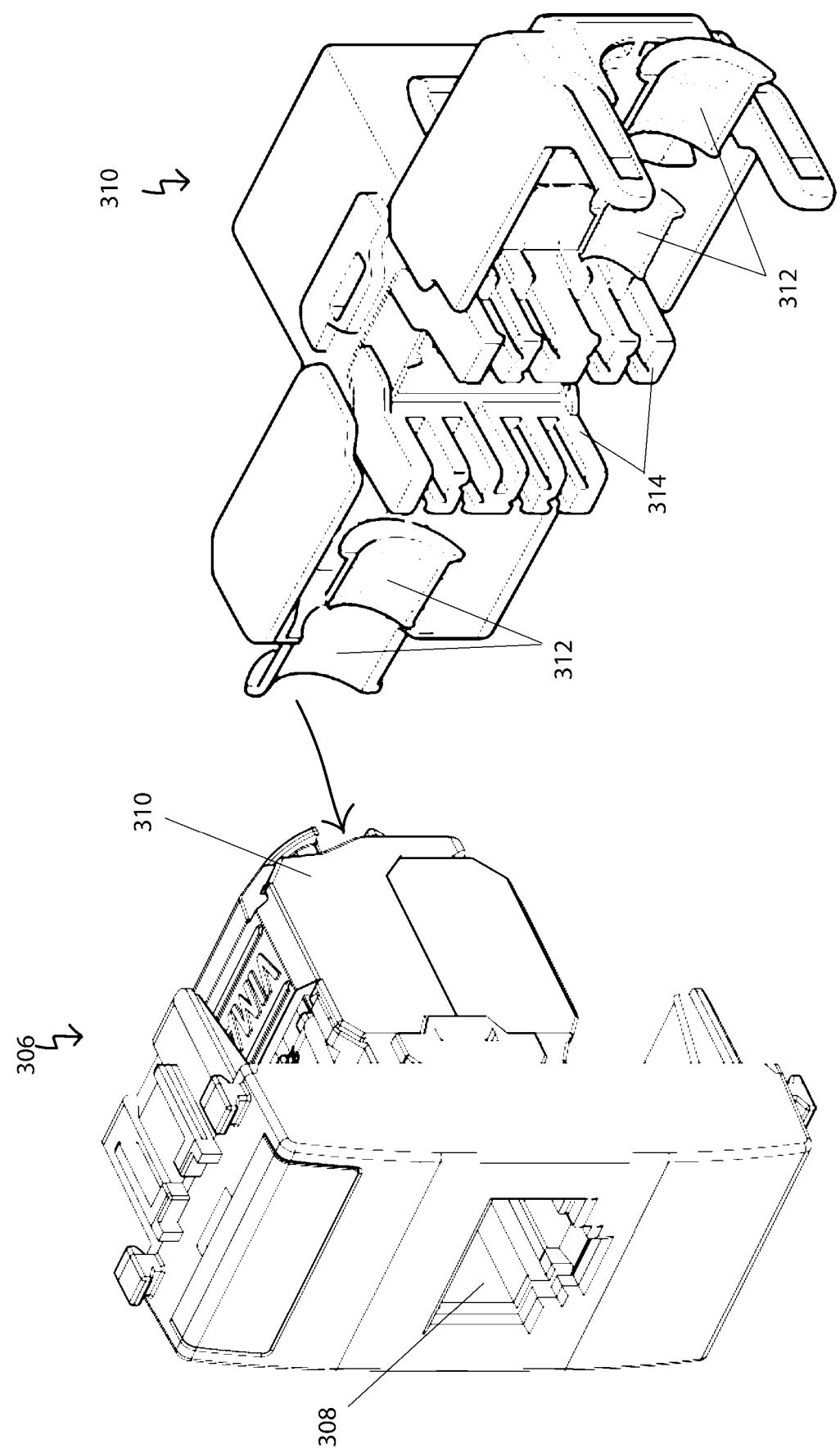

Fig 80

| Frame | Address | Length | Command | Data | CRC-8 | Frame |
|---|---|---|---|---|---|---|
| 1byte | 1byte | 1byte | 1byte | Variable | 1byte | 1byte |

Address:
| Port# | Zone# |
|---|---|
| 4 bits | 4 bits |

| | |
|---|---|
| 00 | Current Port |
| 01 | PSE Port #01 |
| 02 | PSE Port #02 |
| 03 | PSE Port #03 |
| 04 | PSE Port #04 |
| 05 | PSE Port #05 |
| 06 | PSE Port #06 |
| 07 | PSE Port #07 |
| 08 | PSE Port #08 |
| 09 | PSE Port #09 |
| 10 | PSE Port #10 |
| 11 | PSE Port #11 |
| 12 | PSE Port #12 |
| 13 | PSE Port #13 |
| 14 | PSE Port #14 |
| 15 | PSE Port #15 |

| | | | | |
|---|---|---|---|---|
| 00 | Reserved | | | |
| 01 | Light Set | 1 Byte | | Initiated by Light Switch PD or BMS |
| | | Light Intensity | 0=Off, 255=100% |
| 02 | Dim Rate Set | 1 Byte | | Initiated by Light Switch PD or BMS (1 byte) |
| | | Ramp Time | 0=0 s, 255=25.5 Sec |
| 03 | Light Status | 1 Byte | | Initiated by lighting PD (1 byte) |
| | | | | 0 = Faulty |
| 04 | Invertor Set | 1 Byte | | Initiated by BMS (1 byte) |
| | | Power Switch | 0 = Off |
| 05 | Invertor Status | 4 bytes | | Initiated by invertor event or as a response to invertor set command |
| | | Iout | 0=0A, 255=25.5A |
| | | Vin | 0=0V, 255=63.75V |
| | | Temp | 0 = 0 °C, 255=127.5 °C |
| | | % Batt | 0 = 0% 255=100% battery left |
| 06 | Temp Alarm Set | 1 Byte | | PD over-temp alarm set. If the PD's temperature exceeds this value the PD |
| | | Temp Thresh | 0 = 0 °C, 255=127.5 °C |
| 07 | Temp Alarm Status | 1 Byte | | PD over-temp alarm sense |
| | | | | 0 = 0 °C, 255 =127.5 °C |
| 08 | PIR Set | 2 Bytes | | Command Initiated from BMS |
| | | Sense Delay | 0 = 0 ms, 255 = 2.55 s |
| | | Polling Rate | 0 = Continuous, 255 = 25.5 s |
| 09 | PIR Status | 2 Bytes | | Seconds off occupancy |
| | | Time in sec | 0 = 0 s, 65535 = 18.2h |

| Frame | Address | Length | Command | Data | CRC-8 | Frame |
|---|---|---|---|---|---|---|
| $170_{10}$ | $01_{10}$ | $02_{10}$ | $01_{10}$ | $255_{10}$ | | $170_{10}$ |

| PDU #1 | Luminaire Set to Zone 1 |
|---|---|
| PDU #2 | Luminaire Set to Zone 1 |
| PDU #3 | Light Switch to Zone 1 |
| PDU #4 | Luminaire Set to Zone 2 |
| PDU #5 | Light Switch to Zone 2 |

Fig 82

Set Dimming Rate

| Frame | Address | Length | Command | Data | CRC-8 | Frame |
|---|---|---|---|---|---|---|
| $170_{10}$ | $02_{10}$ | $02_{10}$ | $02_{10}$ | $100_{10}$ | | $170_{10}$ |

Set Light(s) to 50%

| Frame | Address | Length | Command | Data | CRC-8 | Frame |
|---|---|---|---|---|---|---|
| $170_{10}$ | $02_{10}$ | $02_{10}$ | $01_{10}$ | $127_{10}$ | | $170_{10}$ |

| PDU #1 | Luminaire Set to Zone 1 |
|---|---|
| PDU #2 | Luminaire Set to Zone 1 |
| PDU #3 | Light Switch to Zone 1 |
| PDU #4 | Luminaire Set to Zone 2 |
| PDU #5 | Light Switch to Zone 2 |

| Frame | Address | Length | Command | Data | CRC-8 | Frame |
|---|---|---|---|---|---|---|
| $170_{10}$ | n | $01_{10}$ | $02_{10}$ | $02_{10}$ | $100_{10}$ | | $170_{10}$ |

| PDU #1 | Luminaire Set to Zone 1 |
|---|---|
| PDU #2 | Luminaire Set to Zone 1 |
| PDU #4 | Luminaire Set to Zone 2 |
| PDU #5 | Light Switch to Zone 2 |

Fig 84
| Frame | Address | Length | Command | Data | CRC-8 | Frame |
|---|---|---|---|---|---|---|
| $170_{10}$ | $02_{10}$ | $02_{10}$ | $04_{10}$ | $100_{10}$ | | $170_{10}$ |
Event: Response from PU#4 GPO inverter status
| Frame | Address | Length | Command | Data | CRC-8 | Frame |
|---|---|---|---|---|---|---|
| $170_{10}$ | $02_{10}$ | $05_{10}$ | $05_{10}$ | | | $170_{10}$ |
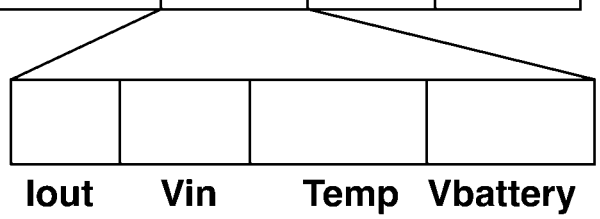
Iout  Vin  Temp  Vbattery
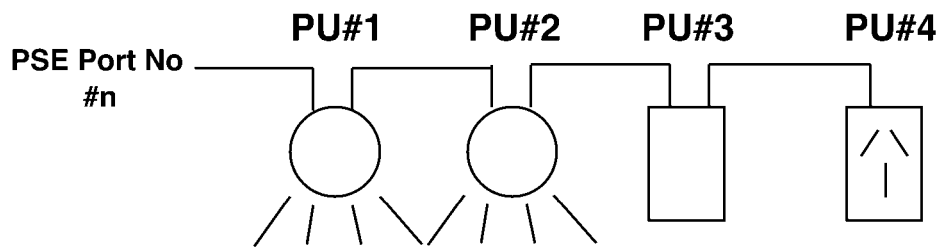
PSE Port No #n — PU#1 — PU#2 — PU#3 — PU#4
| PDU #1 | Luminaire Set to Zone 1 |
|---|---|
| PDU #2 | Luminaire Set to Zone 1 |
| PDU #3 | Light Switch Set to Zone 1 |
| PDU #4 | GPO Set to Zone 2 |

Fig 85
Event: Command from BMS to turn on PU#4 (GPO)
| Frame | Address | Length | Command | Data | CRC-8 | Frame |
|---|---|---|---|---|---|---|
| $170_{10}$ | $02_{10}$ | $02_{10}$ | $08_{10}$ | | | $170_{10}$ |
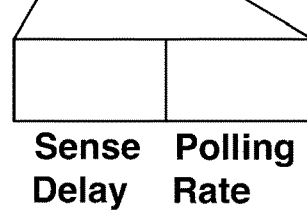
Sense Delay | Polling Rate
Event: Response from PU#4 GPO inverter status
| Frame | Address | Length | Command | Data | CRC-8 | Frame |
|---|---|---|---|---|---|---|
| $170_{10}$ | $02_{10}$ | $02_{10}$ | $09_{10}$ | | | $170_{10}$ |
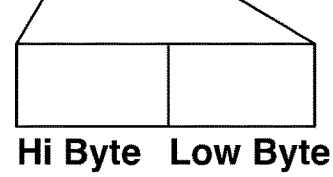
Hi Byte | Low Byte
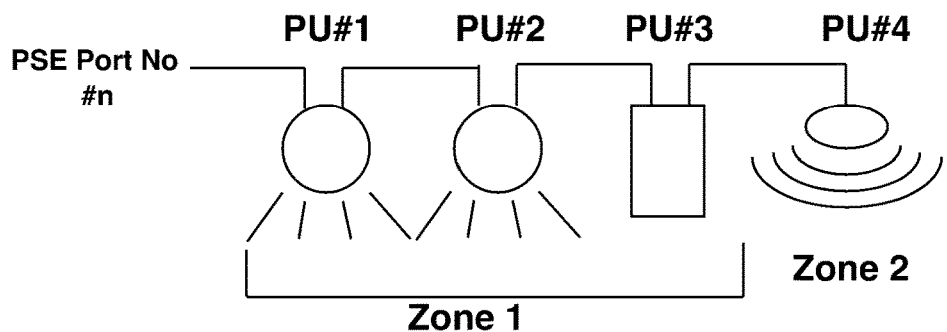
| PDU #1 | Luminaire Set to Zone 1 |
|---|---|
| PDU #2 | Luminaire Set to Zone 1 |
| PDU #3 | Light Switch Set to Zone 1 |
| PDU #4 | PIR Set to Zone 2 |

MULTI-DROP PoE NETWORK FOR POWER DISTRIBUTION AND COMMUNICATION

THE FIELD OF THE INVENTION

The field of the invention relates to power transmission and novel managed power transmission protocols, apparatus and network topologies.

BACKGROUND TO THE INVENTION

A major challenge of the $21^{st}$ century is to improve on the distribution of electricity. The $20^{th}$ century model of the electrical grid providing power to users via large power stations, high voltage AC transmission (up to 1 million V) and transforming AC for local distribution (240V/120V) has been disrupted. $21^{st}$ century technologies such as solar and wind powered electricity generation and battery storage have resulted in DC power being introduced into electrical distribution systems or grids, particularly at the consumer or household level, which has required changes to existing infrastructure and methods of providing power.

Traditional AC distribution in the home or commercial premises only transmit power and no information about the devices connected to the power or the requirements for power that such devices have. Traditional AC power delivery circuits have also, topologically, involved multi-drop technology. That is, one the one AC power line (comprising an active, a neutral, and an earth) is able to be connected to multiple devices along its length.

There are multiple technologies that have emerged in the 21 century that have expanded and changed power distribution in the home and office which was previously performed exclusively by the provision of AC power connections. These include technologies that are intelligent and manage the power consumed in the power network. One such technology is known as Power Over Ethernet. Power over Ethernet, or PoE, describes systems that pass DC electric power along with data on twisted-pair Ethernet cabling. This allows a single cable to provide both a data connection and electric power to devices such as wireless access points (WAPs), Internet Protocol (IP) cameras, and voice over Internet Protocol (VOIP) phones.

PoE systems traditionally transmit low power DC power together with network communication signals including signals which relate to the nature of the connected devices and a negotiated agreement on how much power to draw from the POE connection. POE systems are generally comprised of an AC powered Power Source Equipment ("PSE") which is usually an AC powered POE enabled switch or mid span injector and a single Powered Device ("PD") connected to the PSE over an ethernet cable. PSEs are connected to a plurality of PDs in a star topology where each PD is connected to the PSE exclusively over the one cable.

PCT/2016/000334 and PCT/AU2017/000160 have described for the first time, high powered PSE devices capable of delivering between 100 W to 300 W of DC power per PoE connection. These connections can also be used to deliver AC power to devices requiring it by using one or more high powered POE connections to Power Distribution Units ("PDU") which invert the DC power provided over the POE connection by the PSE and delivers it as AC power for local consumption. This includes PSE equipment powered by locally generated DC power including battery and renewable sources. In addition PCT/AU2017/000160 describes a common-mode signalling protocol and apparatus for communicating over the PoE connection formed between PSEs, PDUs and PDs. Multi-drop PoE technologies are not common. PCT/2016/000334 and PCT/AU2017/000160 both describe daisy-chained PoE LED lights where up to five luminaires are described on each minimum 100 W POE connection. However control of such a plurality of devices was not possible as precisely as in the case of conventional PoE on existing ethernet networks designed to operate in a star topology. Daisy chained or multi-drop ethernet connections are long felt want in the communications industry as a multi-drop topology would obviate many deficiencies of traditional PoE systems. Some speculation has been made on the provision of a multi-drop ethernet PoE system however such system incorporated in every connected PD device a mini-switch or hub for communicating via TCP/IP a method which is cumbersome, complicated and expensive if the only information conveyed down the ethernet line is low level information about the power consumed and perhaps small amounts of data from the PD.

It is an object of the invention to provide power distribution system comprising PSEs, PDUs and PDs that deliver up to 300 W of power per PoE connection and wherein each connection is a managed power distribution system that, at least, addresses the impacts of any voltage drops and inrush situations. Finally, it is also an object of the present invention to provide power distribution system comprising PSEs, PDUs and PDs that can power a plurality of PDs on a single PoE connection without the inclusion of micro-switches or hubs.

SUMMARY OF THE INVENTION

In a first aspect of the invention there is provided a power distribution system comprising:
(i) A power over ethernet connection provided by a first ethernet cable containing ethernet conductors wherein the power over ethernet connection is comprised of at least:
200 W of DC power; and
data packets comprised of electrical signals wherein the signals are injected longitudinally across at least some of the ethernet conductors in the ethernet cable; and
(ii) at least two devices and wherein the first device has at least two ethernet ports, one for connection to the first ethernet cable and the other for connection to the device over a second ethernet cable and wherein the first and second ethernet ports are directly connected such that electrical signals conducted over the first ethernet cable pass through the first PD into the second ethernet cable, and wherein at least the first and second devices are adapted to operate on DC power picked off the ethernet conductors.

Preferably the first and second devices communicate with each other via common mode signaling using modems contained in the first and second devices.

More preferably the system additionally comprises a power source equipment (PSE) with at least one high powered power over ethernet port for creating the power over ethernet connection including providing the 200 W of DC power for transmission over the power over ethernet connection and for communicating with the devices other via common mode signaling using modems contained in the PSE and devices.

Still more preferably there are at least two high powered power over ethernet ports on the PSE creating two high powered power over ethernet connections upon which each connection features the at least two devices on each connection, and wherein at least one of the devices connected to one of the at least two high powered power over ethernet ports is able to communicate with a device connected to the other high powered power over ethernet port through the PSE which receives the data packets transmitted on one power over ethernet connection and directs the or a data packet along the second power over ethernet connection to the other device.

Preferably the PSE is adapted to receive commands from legacy building management systems and send data packets to connected devices containing commands.

Preferably each device may comprise:
a PDU with inverter an AC outlet;
LED light; and/or
control panel.

Preferably the PSE device is a network switch or a mid span injector.

More preferably the at least two devices comprise a LED light and a control switch for controlling the LED light.

Still more preferably the PSE device also provides via its at least one high powered power over ethernet port full IEEE compliant TCP/IP high bandwidth, high speed data network signals and communications protocols for communicating with a conventional TCP/IP networking device connected to the PSE via an ethernet connection that has interspersed between the PSE and the conventional TCP/IP networking device at least one device drawing DC power for its operation from the ethernet connection received via one ethernet port of the device and forwarded on via a second ethernet port of the device and wherein a modem in the device is used to communicate with at least the PSE via common mode (longitudinal) signaling.

Preferably the PSE is in turn connected to an external TCP/IP network which the conventional TCP/IP networking device which is connected to the PSE at the terminus of the at least one high powered power over ethernet connection can communicate with the external TCP/IP network using conventional TCP/IP network protocols.

Preferably the PSE also provides conventional IEEE 802.3 power distribution capabilities to a conventional TCP/IP networking device when is connected to the PSE at the terminus of the at least one high powered power over ethernet connection.

Preferably the longitudinal signally occurs between devices at rate of up to 2400 baud.

Preferably the longitudinal signaling is used to convey information about power requirements to the PSE.

More preferably the longitudinal signaling is used to convey information about the power requirements of the powered devices to the PSE.

Still more preferably the longitudinal signaling is used to transmit data.

Preferably the data further includes sensor data generated by a sensor.

Preferably the data further includes commands for connected devices including PSE, powered devices and any devices connected thereto.

Preferably the devices may comprise LED lights and wherein command data includes data received and acted on by the LED lights to change a property of the emitted light including state (on/off), brightness, and colour/temperature.

Alternatively the device is a switch or control panel which generates and sends command data to connected devices including LED lights.

Preferably the device is a PIR sensor which generates sensor data which in turn generates a command sent to connected LED lights.

Preferably the PSE is connected to other information systems and receives signals from the other information systems which are translated into commands by the PSE which in turn are transmitted to one or more of the plurality of powered devices via longitudinal signaling.

Preferably the other information system is a lighting controller that issues commands alter a property of at least one LED light, and wherein the PSE receives the commands and converts them into commands that are transmitted to the at least one LED light (PD) via longitudinal signaling which are acted upon by the LED light.

In a second aspect of the invention there is provided a PDU which comprises:
at least one ethernet port for receiving at least one high powered power over ethernet connection comprising at least 200 W of DC power and data packets transmitted via common mode (longitudinal) signaling;
a DC to AC inverter for inverting DC power to AC power output between 110V and 230V over at least one general power outlet for connecting at least one AC powered device;
an RCD connected to a path to earth;
a modem;
a microcontroller;
a supervisor circuit for powering the microcontroller and wherein the supervisor circuit is adapted to respond to the following situations:
the common mode DC voltage superimposed on the ethernet bearers is to low; or
the common mode DC current is too high; or
the temperature is too high.

Preferably the PDU has a second ethernet port for supplying high powered power over ethernet connection to downstream devices.

Preferably the PDU is provided in the form of a desktop hub for a computer user and wherein the power distribution unit further comprises:
a plurality of USB ports including at least one USB PD port for powering a computer and connected it to devices connected to the PDU including connected displays which receive video signals from the computer for display;
at least one video port for connecting at least one external video display; and
a computer networking interface for connecting the computer to a TCP/IP network provided by the TCP/IP ethernet connection provided by the PSE.

Alternatively the PDU is provided in the form of a power outlet and wherein the PDU provides at least one AC outlet for connecting an AC powered device.

Preferably the PDU further provides at least one USB port for powering DC powered devices where the DC power is derived from the high powered ethernet connection.

Preferably the PDU further provides at least one ethernet port for providing TCP/IP networking.

Preferably the PDU is adapted communicate wirelessly with connected wireless devices via a wireless network adaptor in the power outlet.

Preferably the wireless network comprises a home automation network adaptor for receiving controls for powering or depowering the AC power from the inverter.

Preferably the wireless network comprises a WIFI adaptor for creating or extending a TCP/IP network from TCP/IP signals received over the high powered power over ethernet connection derived from the PSE.

Preferably the at least one ethernet port providing TCP/IP networking also provides DC power for downstream devices or conventional iEEE power over ethernet connections for conventional power over ethernet devices.

Preferably the PDU is provided in the form of a charging station in which there are a plurality of ports for charging connected devices including USB PD ports and wherein the power distribution unit further comprises a battery for portable and remote use when charged and in built LED lighting for emergency or remote illumination.

Preferably the charging station further comprises a WIFI adaptor for extending or creating a wireless PCT/IP network.

Preferably the PDU is a lighting control PDU which is adapted to receive lighting commands and translate the lighting commands into signals that able to be acted upon by other systems using different protocols and wherein the PDU is adapted to output the translated signals to devices connected to the lighting control PDU that operate using the different protocols.

Preferably the other system is any of:
DALI
DSI
0-10V
Dynalight
Z wave
Zigbee
X10
Universal Powerline Bus
DMX; or
CBUS.

Preferably the PDU is provided in the form of a radio receiver and battery charger wherein the PDU additionally comprises:
a radio receiver for receiving radio signals over an antenna
a plurality of USB ports for charging and also for connecting portable A/V devices for outputting at least the audio stream
at least one speaker.

Preferably the radio receiver and battery charger PDU further comprises chargers for power tools or a dock for mounting or connecting at least one charger for charging power tools.

BRIEF DESCRIPTION OF THE DRAWINGS

Reference is now made to the following figures which depict embodiments and aspects of the invention wherein:

FIG. 19 depicts the over current detection circuit of the SIC;

FIG. 20 depicts the Series Pass Switch circuit of the SIC;

FIG. 30 depicts the Supervisor Integrated Circuit and associated table of pin designations;

FIG. 38B depicts a schematic diagram of the components of a device similar to that depicted in FIG. 39A except that the LEDs themselves are outside of the device as a separate component of a lighting system.

FIG. 42 depicts a schematic diagram of the components of the device shown in FIGS. 40 and 41;

FIG. 51 depicts a schematic diagram of the components of the device shown in FIGS. 49 and 50;

FIG. 55 shows a left side view of a portable charging station and communications device;

FIG. 56 shows a front view of a portable charging station and communications device;

FIG. 57 shows a right side view of a portable charging station and communications device;

FIG. 60 depicts a schematic for the lighting PDU of FIG. 59;

FIG. 61 depicts various embodiments of supported services and the means by which they are addressed and by which they communicate with each other;

FIG. 62 is a first embodiment of a 9 conductor ethernet cable;

FIG. 63 is a second embodiment of a 9 conductor ethernet cable;

FIG. 64 is a third embodiment of a 9 conductor ethernet cable;

FIG. 65 is a depiction of a prior art shielded CAT6a cable with drain wire;

FIG. 66 is a fifth embodiment of a 9 conductor ethernet cable;

FIG. 68 is a depiction of a patch panel according to a second embodiment of the invention;

FIG. 68A is a close up view of the earthing connector in operation with an ethernet cable with an external shielding used as a ground conductor;

FIG. 68B is a close up view of the earthing connector in operation with an ethernet cable with a ninth conductor external to the 8 conventional ethernet conductors;

FIG. 69 is a rear view of a conventional patch panel;

FIG. 70 is a top cutaway view of an earthing loom attached to the rear of the conventional patch panel of FIG. 69;

FIG. 71 is a rear view of the earthing loom;

FIG. 72 is a close up of the earthing connection made in accordance with one embodiment of the earthing loom;

FIG. 73 is a close up of the earthing connection made in accordance with a second embodiment of the earthing loom;

FIG. 75 is a RJ45 jack module for use with a 9 conductor ethernet cable and plug that provides an earth or ground connection;

FIG. 76 is a perspective view of the jack module of FIG. 75 in an opened state showing the manner in which a 9 conductor ethernet cable is attached;

FIG. 80 is a schematic depicting the structure of a data packet and a map of ports and commands which are incorporated into the data packet in accordance with a further embodiment of the invention;

FIG. 82 depicts a second scenario and exemplary data packet of the sort shown in FIG. 80 according to a second embodiment of the data packet;

FIG. 84 depicts a fourth scenario and an exemplary data packet of the sort shown in FIG. 80 according to a fourth embodiment of the data packet;

FIG. 85 depicts a fifth scenario and an exemplary data packet of the sort shown in FIG. 80 according to a fifth embodiment of the data packet.

DETAILED DESCRIPTION

Incorporation or Previously Filed Patent Application Specifications

The present invention comprises improved PSE, PDU and PD devices used in a high powered POE system capable of delivering high voltage AC to where it is needed locally. PSE, PDU and PD all communicate utilising a longitudinal common mode signalling system disclosed in PCT/AU2017/000160 and AU20211007006. PCT/2016/000334 and PCT/AU2017/000160 describe various ways in which a POE connection and earthing connections can be provided to remote PDUs and charging stations. The description of the entirety of these earlier filed patent applications are hereby incorporated by way of reference.

Power Source Equipment

Figure 1:
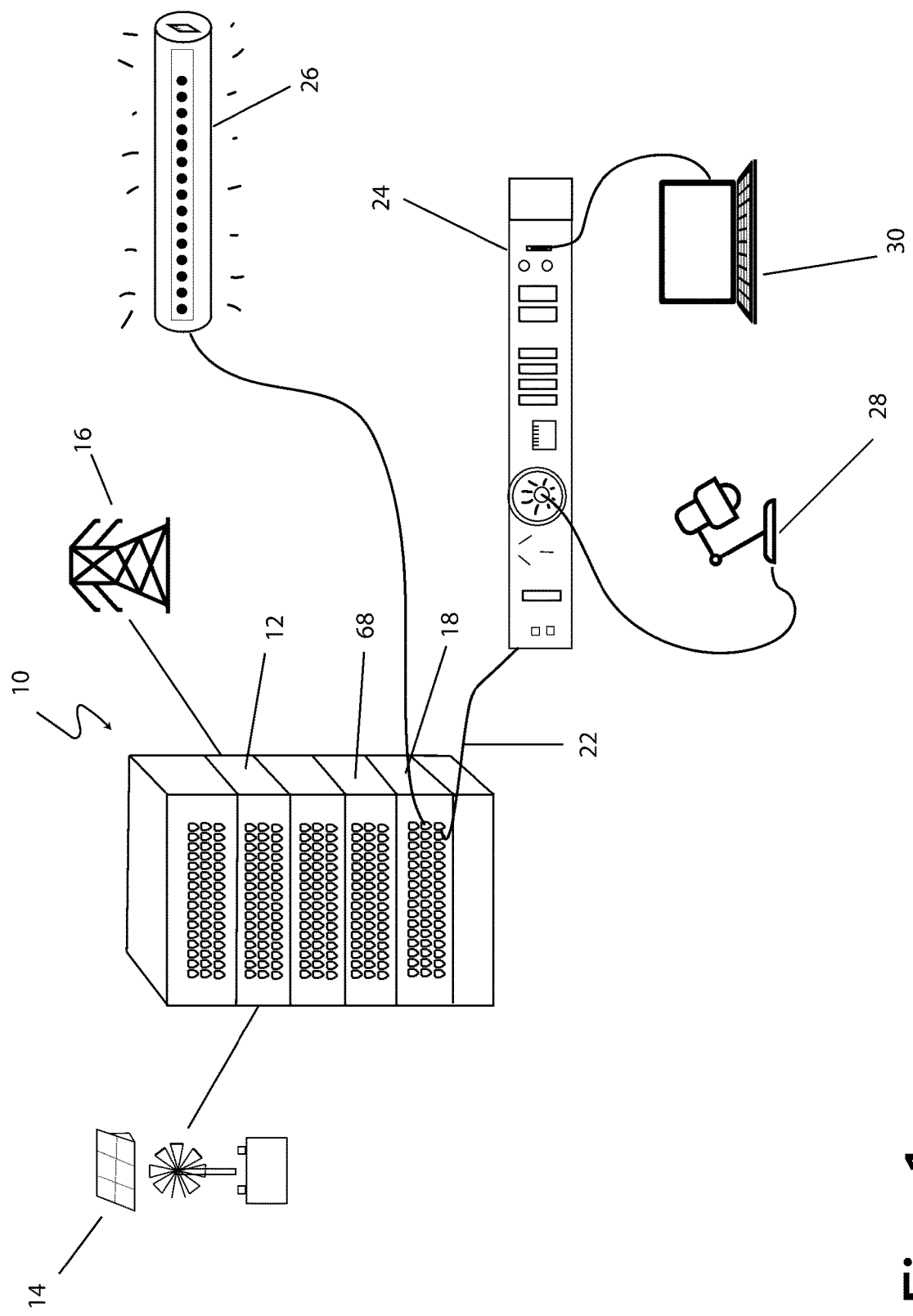
FIG. 1 depicts a first embodiment of the POE system of the present invention incorporating Power Source Equipment (PSE), Power Distribution Units (PDU) and Powered Devices (PD)

The term PSE in the present invention is used to describe the assembly of power source equipment (PSE) that is necessary to perform the present invention. FIG. 1 depicts a PSE 10 according to a first embodiment of a first aspect of the invention. Essentially the PSE described in the present invention is a device or series of devices used to output at least one high powered DC PoE connection but preferably a plurality of them. To that end it is principally comprised of a DC power supply 12 that outputs high power 56V DC power and wherein the DC power supplied is transformed from either high voltage DC power from a DC power source 14 which includes generators, solar voltaic panels, wind turbines, other renewable power sources and/or battery power, or from 240V/110V or other AC power obtained from the AC grid 16.

Referring to FIG. 1 DC power from the DC power supply 12 is fed into a POE injector 18 of PSE 10 which in the present embodiment of the invention is a mid-span injector 18 which combines DC power with the data signals received from a networking interface, in this case an ethernet network switch 20, to output a combined data and power connection (PoE connection) which can be sent over a single ethernet cable 22 to a power distribution unit (PDU) 24 or PD 26 such as a LED light. The PSE 10 can supply at least 100 W and up to 600 W of 56V DC POE power through each RJ-45 or other ethernet port. supplied to a PDU 24 with AC inverter the PDU 24 inverts the high powered DC connection (200 W-300 W as carried by the CAT cable 22) into AC power for distribution to AC powered devices 28. PDU can also use the DC power derived from POE injector 14 to power devices which require DC power such as laptop 30 over USB PD connection.

Preferably there is provided over a single PoE connection at least 200 W of DC power and more preferably between 200 W and 600 W of DC power. The data signal that this power is overlaid upon may be 10 Base T, 100 Base T & 1000 Base T (Gigabit) or 10 000 Base T, 2.5GBBASE-T and 5GBBASE-T. Indeed, any future standard for Ethernet data/power transmission that is compatible with the present invention is also claimed by the applicant to form part of the invention. Alternatively, the PSE 10 may not incorporate any TCP/IP networking functionality if it is not required. The present invention provides a communications and signalling protocol that operates between connected devices such that the system can be designed to provide power only and use the common mode signalling system for transmitting low rates of data if data is required. Notwithstanding this the present invention is described in the context of the system incorporating a switch or mid span connected to a conventional TCP/IP network such that high powered POE connections can be utilised.

Before turning to specific PSE 10 equipment described herein, it must be noted that a reference to PSE 10 hereafter is a system that incorporates a minimum:
1. DC power source 12;
2. An injector 18 or POE switch for injecting the DC power into network/data signals received by the PSE;
3. A modem for use in a signalling system for communicating with other compatible and connected devices; and
4. An associated microcontroller and memory including a basic software interface for controlling the PSE or equivalent implemented in circuits and hardware for communicating with PDUs and PDs.

PSE 10 also optionally includes
1. means for delivering an earth connection to a remote PDU or PD including by way of an earthing patch panel 32 or earthing loom 268; and
2. means for communicating with other PSEs and software agents for managing a plurality of associated PSE devices and their connected devices.

Figure 10:
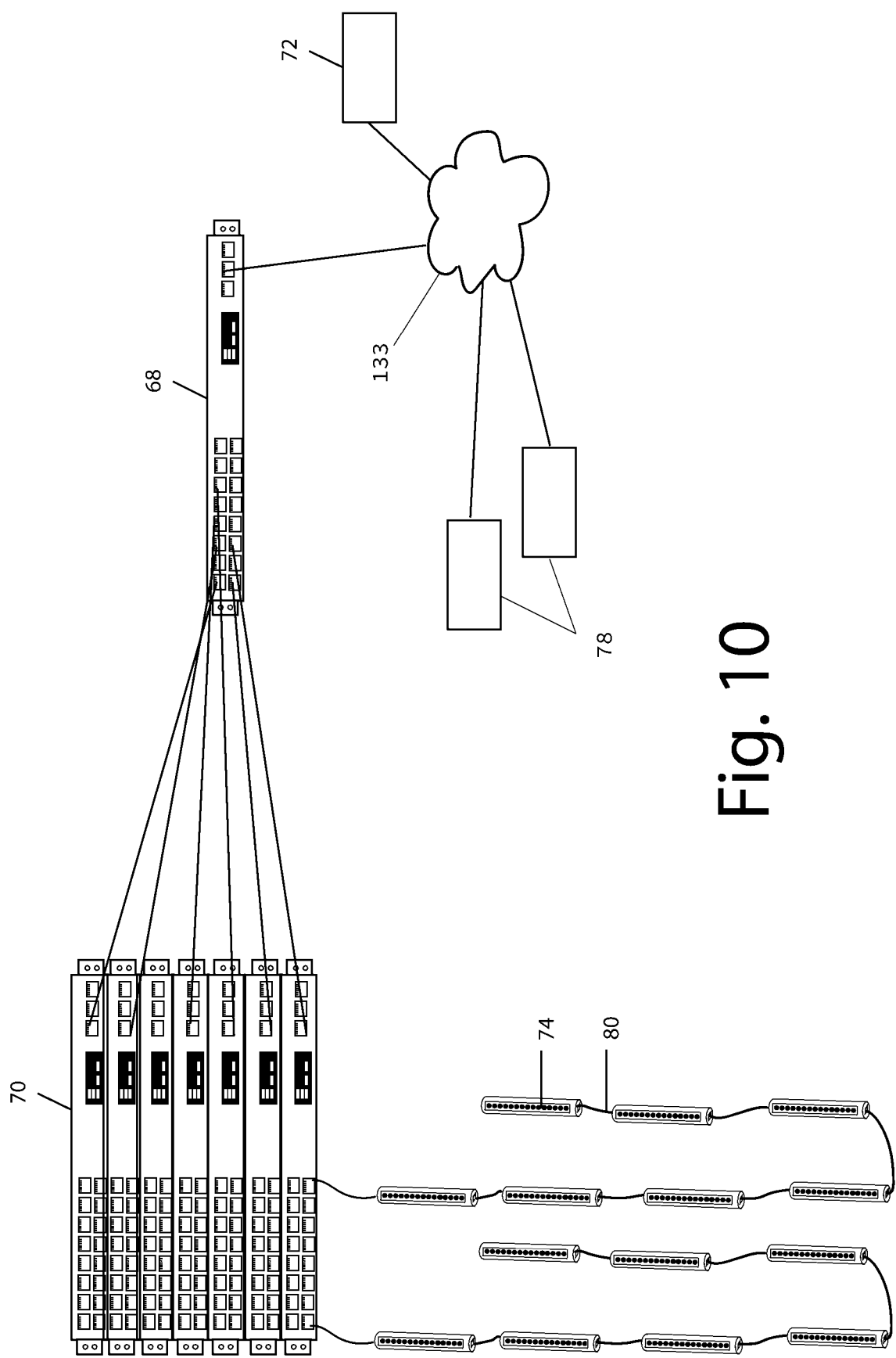
FIG. 10 depicts the system of management server, PSEs and connected devices.

All of the forgoing could be made into a single hardware unit, however, it is likely to be more efficient if some of the functions are separated. For instance, as depicted in FIGS. 10 and 61, a management server 68 containing a software agent or control application 250 for managing the plurality of PSE 70 can be executed from a single instance on a network comprising PSEs 10. Such a server or software application 250 can also communicate with external building control systems or legacy systems 72 also on the same network. Legacy building control systems 72 can be integrated into a network of PSEs, PDUs and PDs according to the present invention through software abstraction in the software management agent running on a management server 78 which can receive legacy commands and signals and convert them for communication to connected PDs and PDUs through one or more PSEs 70 connected to the management server 68. This includes DALI, DSI, KNX and other lighting protocol signals and other systems 78 that can communicate with the management server 68. Connection to the internet 133 allows the software 250 to connect to remote users using connected devices 252 who can provide instructions to the software 250 to implement in the system.

CAT Cables

The applicant has discovered that many types of Ethernet cables are unsuitable for carrying high currents associated with a combined DC power source of 200 W or more. In those cases, a high quality 23 gauge (or lower gauge cable) Cat6a shielded cable is the most appropriate choice for use with a high powered PSE and a PDU. The cables manufactured and marketed by Panduit Corporation, an Illinois corporation from the USA are of very high quality and capable of handling up to between 200 W and 300 W per cable. In particular PFL6X04BU-CEG and PFL6X04WH-CEG manufactured by Panduit Corporation are suitable for implementation of the present invention as they do not suffer from excessive temperature rises in the core of the cable and accordingly their safety and data transmission capabilities are maintained as if they were running IEEE 802.3af, 802.3at or 802.3bt standards compliant PoE for up to 100 m span.

Cables can be adapted for use in outdoor areas may be IP67 rated, gel filled and be provided with ribbing for additional strength and resilience. Examples of gel filled outdoor CAT 6A cables include PFO6X04BL-CEG sold by Panduit Corporation. Cables should be rated to operate between -20 to 70 degrees Celsius.

As will be noted in more detail below with respect to grounding PSE and PDU devices, grounded ethernet cables are also utilised in the inventive power distribution system comprising PSE, PDUs and connected devices.

Some prior art cables utilise a grounded shielding system to prevent crosstalk and other electrical effect when used in high speed gigabit ethernet applications. Surprisingly it has been found that this system can be used to provide a ground or earth connection to a PDU. An example of such a cable or cables are Cat6A made by Panduit Corporation including PFL6X04BU-CEG and PFL6X04WH-CEG. Such cables have a structure as illustrated in FIG. 65 where it can be seen that the cable has at its core 4 pairs of insulated twisted pair conductors 270 arranged around a conductor divider 280. Surrounding the conductors 270 is a layer of fire retardant insulation 272. Surrounding the insulation 272 is the metal foil tube or metal braiding 274 which is in electrical contact along its length with drain wire 276. In some cases the use of the shielding and/or the drain wire 276 as a path for an earth connection will be sufficient. However, in some scenarios, the gauge and current carrying capacity of the braided shield 274 and/or drain wire 276 will be insufficient. In such cases the modified ethernet cables of FIGS. 6, 62, 63, 64 and 66 may be employed to provide what is essentially a ninth conductor or earthing conductor 38 which is separate to the twisted pairs 270 and any shielding 274 or drain wires 276. Indeed if a earthing conductor 38 is employed, a shielded cable is not necessary to perform the invention at its most basic. If employed, the earthing conductor 38 should be of around 23 AWG gauge or less (thicker wire) to ensure that the conductor maintains its integrity should the 200-300 W of current need to pass through it back to earth.

Ground/Earth Connections

An earth connection is important to provide to PDUs 24 so that electrical safety equipment including residual current devices (RCDs) can cut power to the devices connected to the AC general power outlets to prevent electrocution. It is also important to provide a path to earth in the event of short circuits in connected AC devices 18 which require a ground or earth connection via their three pin AC plugs. PDUs 24 all have earthing lugs for connecting a local ground connection which may be an adjacent concrete pillar or cable tray. The present invention also encompasses PDUs obtaining a connection to earth from the PSE 10 via earthed cable 34 for where local earthing points may be unavailable or inconvenient.

Figure 2:
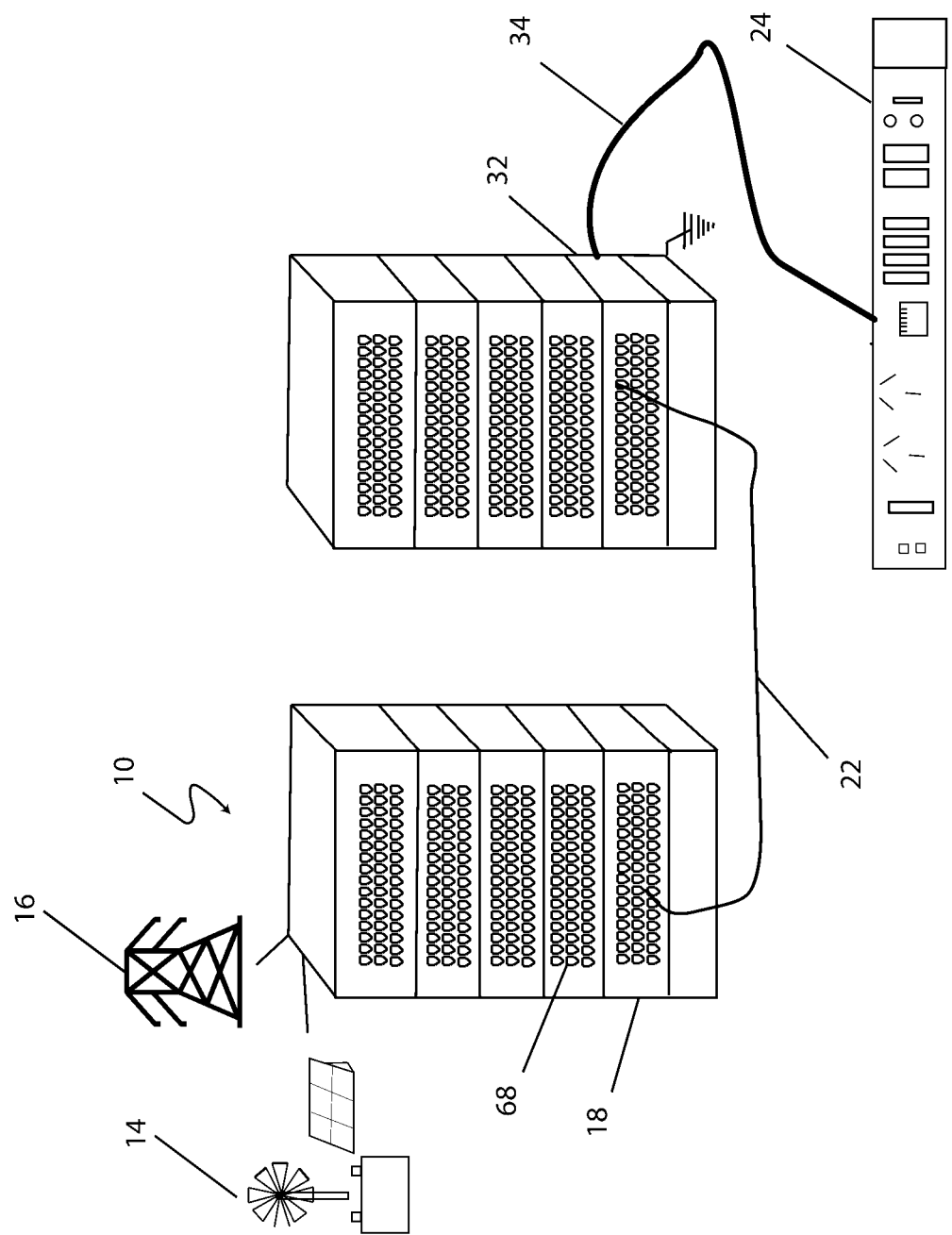
FIG. 2 depicts a second embodiment of the PSE wherein the PSE is comprised of a combined application server and a mid-span injector and a separate PSE patch panel.

The first method of providing an earth connection over ethernet cable is to utilise a prior art cable as depicted in FIG. 65 such as cables are Cat6A made by Panduit Corporation including PFL6X04BU-CEG and PFL6X04WH-CEG. The shielding and drain wire of these cables can be used as the conductor over which the connection to ground or earth is provided. At each end of the cable are RJ-45 plugs that have a full metal jacket that is in electrical communication with the shielding and drain wire of the cable such as Panduit's shielded RJ-45 plug TX6A. The RJ-45 plugs are adapted to be inserted into RJ-45 jack modules such as Panduit's CJS6X88TGY Shielded RJ45 Cat 6A TG Jack Module which have conductors on the inside of the jack which make electrical contact with the outside metal jacket of the shielded RJ-45 plug. Such a module or similar device can be included in a rackmounted POE midspan or switch. It can also be utilised in rack mounted patch panels. However, utilised at the PSE 10 end, the RJ-45 module CJS6X88TGY makes the ground connection it makes with the plug available for connecting to a local ground source at PSE 10, via ground connection kit CJSGK-XY. This includes via a grounded rack or via a patch panel bonded to a grounded rack. At the PDU end the Panduit's CJS6X88TGY Shielded RJ45 Cat 6A TG Jack Module or similar can be installed in the device to draw off the ground connection and pass it to the RCD and GPO outlet where it is required. FIG. 2 depicts PSE 10 comprising mid span injector 18 connected to a patch panel 32 via ethernet cable 22 which in turn is connected to and powers PDU 24 via earthed ethernet cable 34 such as the shielded cables. Patch panel 32 in the present embodiment provides the earth connection. It can do so via the conventional means described above using prior art shielding and bonding systems.

Figures 5, 6:
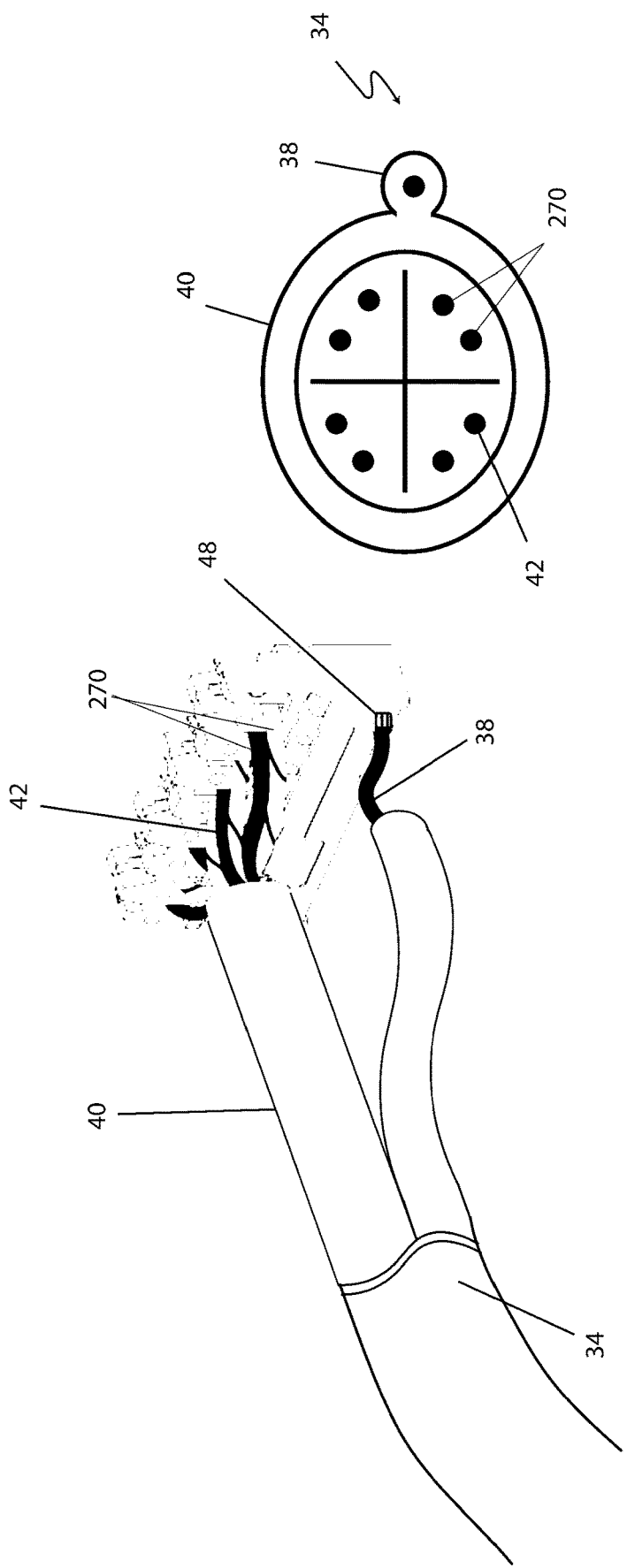
FIG. 5 depicts the ethernet conductors from a connected PDU device, including the attached earth conductor, being connected to the rear of the patch panel of FIG. 2.
FIG. 6 is a cross section of the 9 conductor modified ethernet cable depicted in FIG. 5.

The following description of grounding a PDU and connected devices shall apply in the event any of the 9 conductor cables of FIG. 6, 62 or 63 are employed to carry the ground connection.

Figure 3:
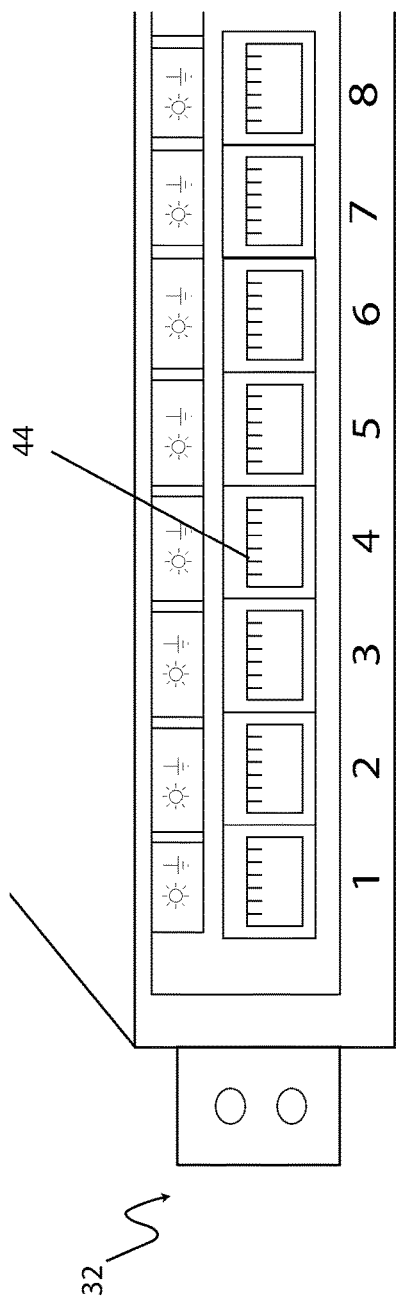
FIG. 3 depicts the front of the patch panel of FIG. 2.
Figure 4:
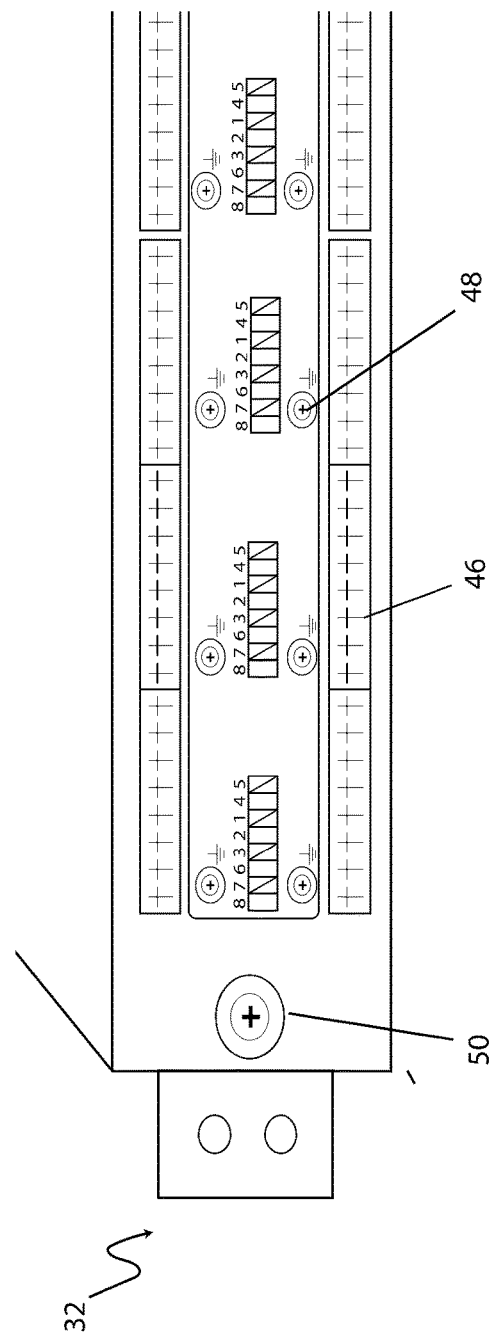
FIG. 4 depicts the rear of the patch panel of FIG. 2.

FIGS. 3 and 4 depict a patch panel 32 according to a second embodiment where it is used to provide an earth connection to the PDU as shown in FIGS. 3 to 5 when the midspan 18 of PSE 10 is not configured to provide one directly. Earthing ethernet cable 34 is comprised of nine conductors, a single earthing conductor 38 and an ethernet cable 40 with eight conductors 42 as shown in FIG. 5. FIG. 3 and FIG. 4 show a rack-mounted patch panel 32 with a plurality of RJ-45 ports 44 for receiving RJ-45 plugs carrying a PoE connection from the mid span injector 18 that have high powered DC current applied to its conductors. The mid span injector 18 and front of patch panel 32 are connected using regular CAT 5 or CAT 6 cables 22 (AWG 24 or higher rated). FIG. 4 depicts the rear of the patch panel 32 which contains a plurality of terminal connections 46 for directly connecting each ethernet conductor 42 of the ethernet cable 40 (comprising 4 twisted pairs 270) of earthing ethernet cable 34. The earthing conductor 38 can be separated from ethernet cable 40 and the earth conductor 38 fixed into earthing points 48 which are connected to an earthing circuit. In the depicted embodiment of FIG. 4, patch panel 32 has a central earthing connecter 50 which is used to provide an earth to the patch panel 32 which is connected each earth pointing 48 to a central earthing point 50.

Figure 8:
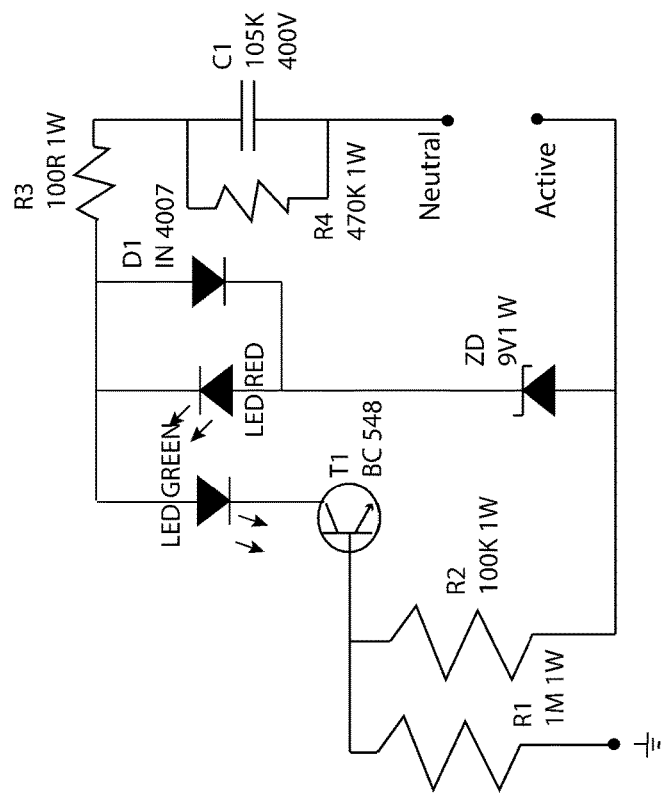
FIG. 8 depicts an earth detecting circuit for providing an indication as to whether a connection to earth is active.
Figure 7:
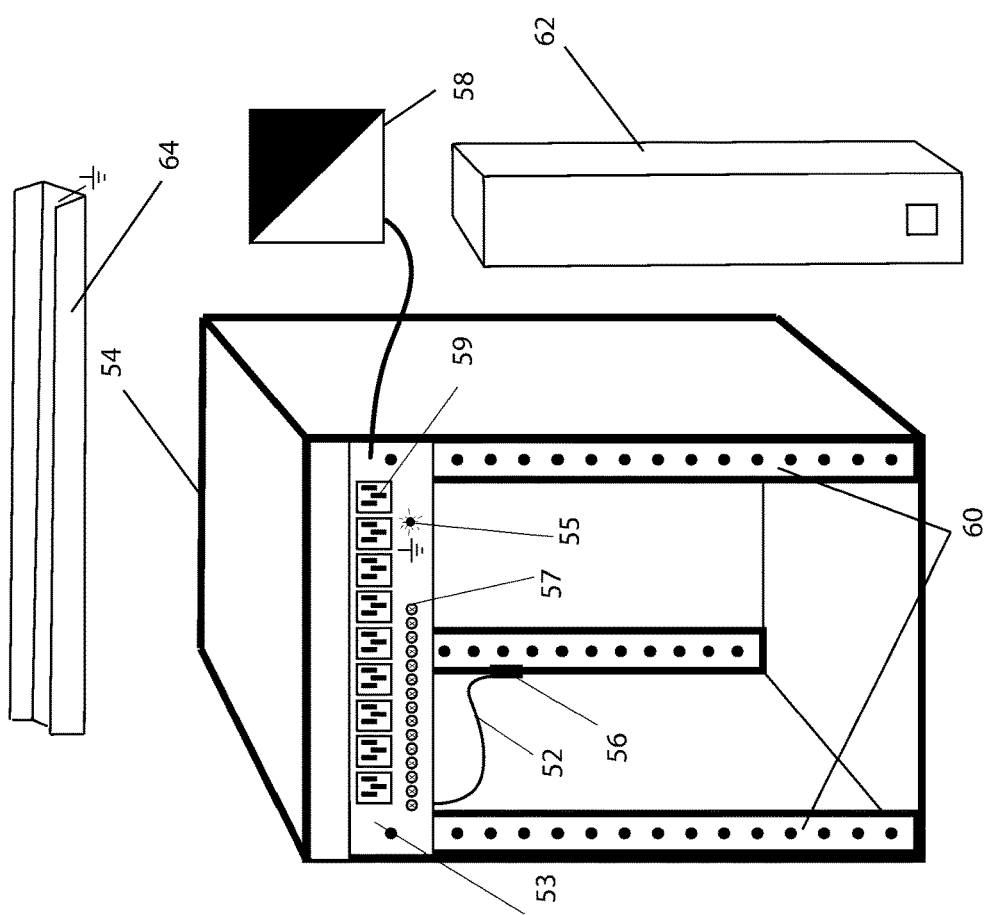
FIG. 7 depicts a metal server cabinet frame connected to the earth of an associated mains power distribution board together with other sources of a ground or earth including columns and cable trays, the figure depicts the power bar providing an indication of earth connection.

FIG. 7 depicts a grounded cabinet 54 with grounded rack rails 60 which are grounded via welded bond 56 (or screw bond) on earthing cable 52. Earthing cable 52 can be connected directly to the bus bar of distribution board 58. Alternatively it can be provided by power rail 53 which is connected to distribution board 58 and which provides a plurality of AC power outlets 59 for powering equipment contained within cabinet 54. It also has series of ground connection outlets 57 for connecting to each central ground connection 50 on each patch panel 32. Power rail 54 also provides a ground indicator 55 for providing a visual indication of whether there is an active ground connection via the use of an integrated ground detection circuit like the one depicted in FIG. 8. In addition to the grounding by way of the centralised earth points 50 which are on each patch panel 32, the mounting tabs for the patch panel 32 are metal and conduct electricity to the grounded rails 60 that they are bonded to with screws. The rails 60 additionally conduct current to the welded or screwed bonding point 56. Other manner of earthing cabinets 54 and PDUs 24 reinforced concrete columns 62 or cable trays 64 as shown in FIG. 7 or below ground using mesh bonding network connectors (MBNC).

Figure 9:
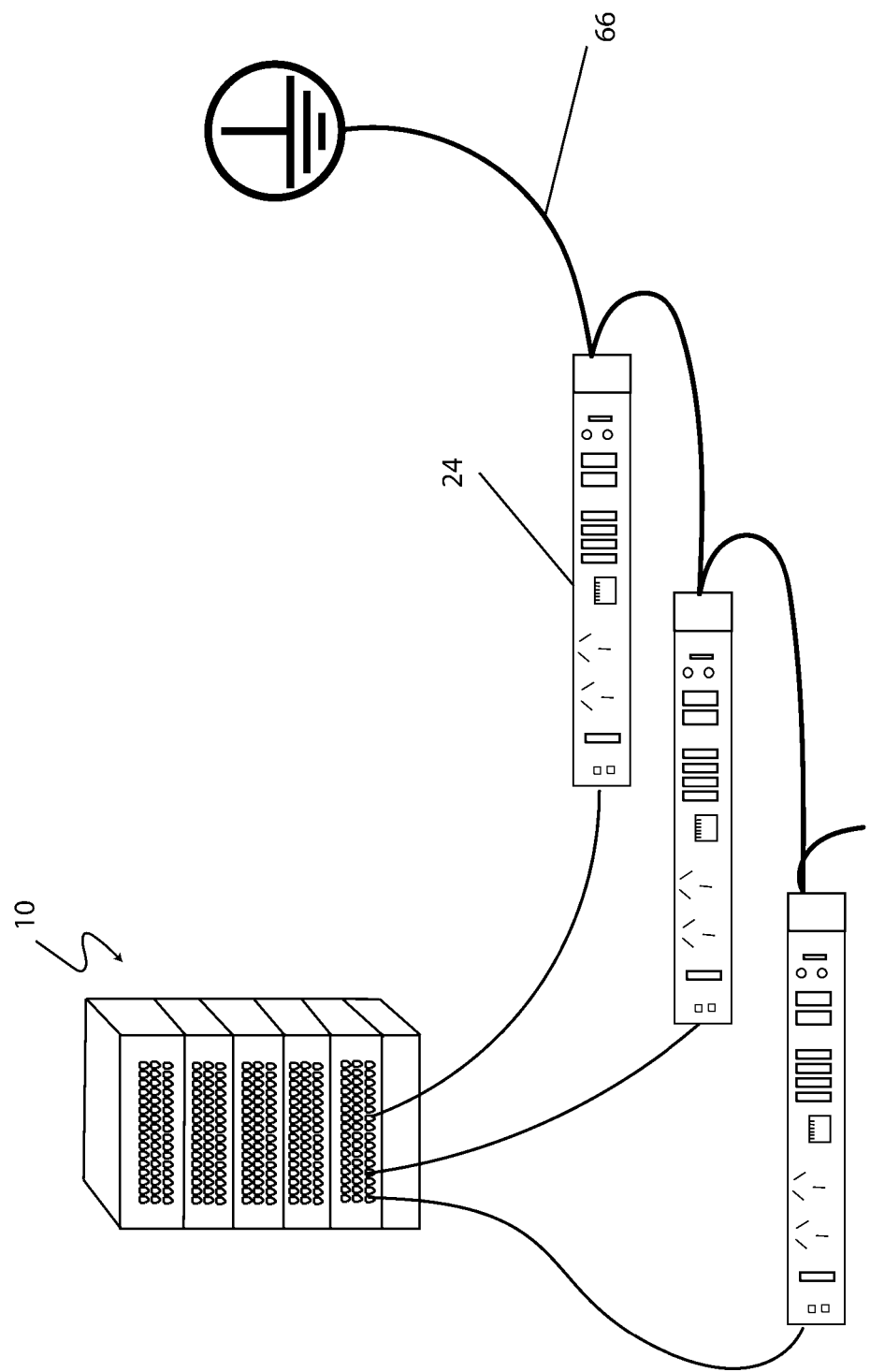
FIG. 9 depicts a PSE according to a second aspect of the invention in connection with multiple PDUs that have been connected in series by an earthing connection that is daisy-chained between PDU devices.

FIG. 9 shows an additional method of earthing PDU 24 in the absence of patch panel 32 which incorporates a daisy-chained earth connector 66 which itself can be connected to steel structures or cable tray 64 or any other source of a grounded connection to earth.

Figure 67:
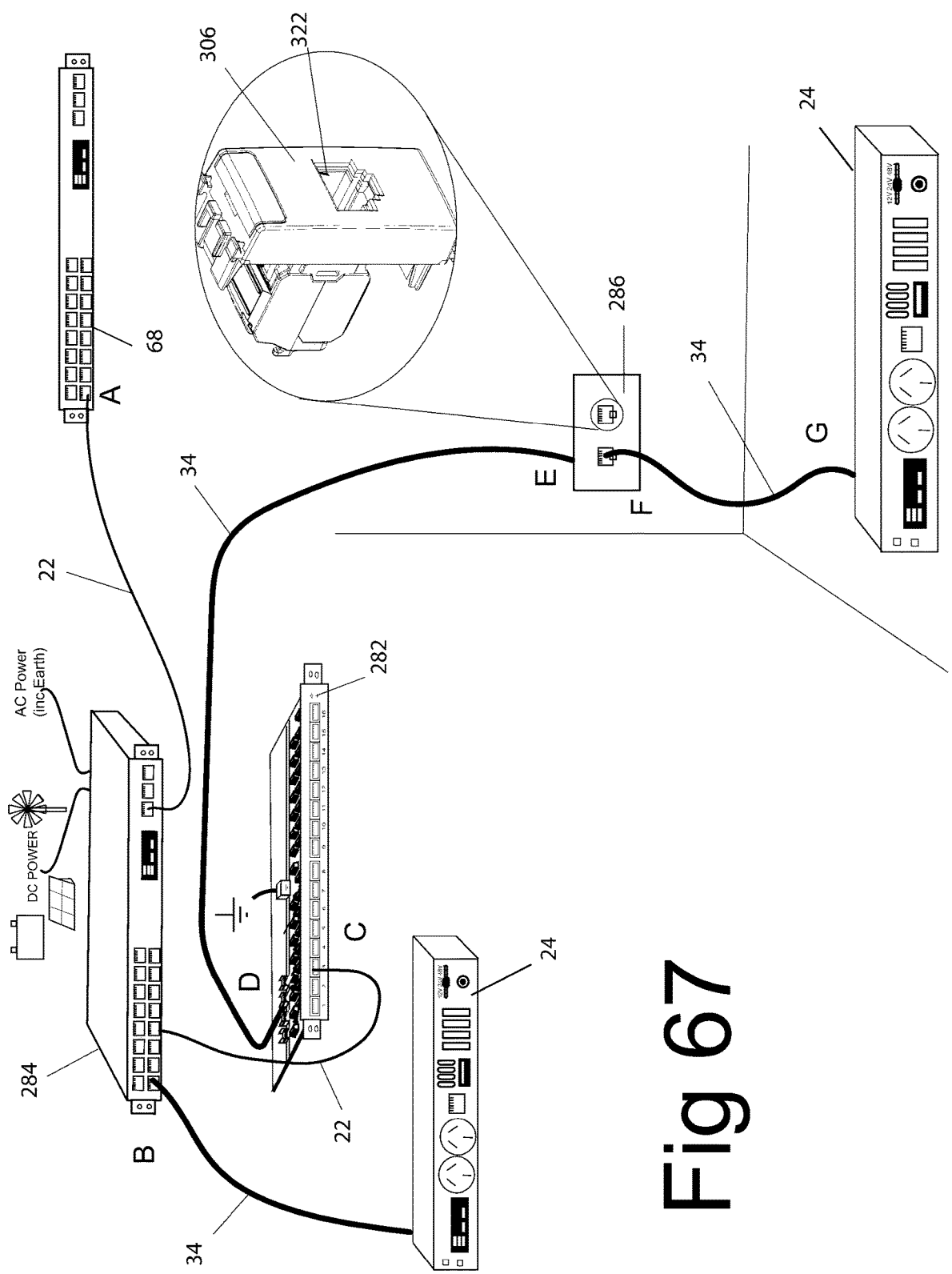
FIG. 67 is a schematic illustration of the grounding systems utilised in the system.

FIG. 67 depicts an alternative system for providing a ground or earth connection to PDU 24 from patch panel 282 or from mid span 284 (or indeed an ethernet POE switch incorporating one or more POE injectors). The diagram indicates where conventional ethernet cables 22 can be utilised, for example, between the management server 68 and mid span 284 or between the mid span 284 and patch panel 282. It also depicts the use of earthed ethernet cables 43 for example as between mid span injector 284 and PDU 24, and between patch panel and wall plate 286 and between wall plate 286 and PDU 24. The figure depicts seven connection points or types which are indicated with the letters A through G. The following describes the devices and connection types provided at each of A-G.

Patch panel 282 features connection points C and D. Patch panel 282 is best seen in FIG. 68. It differs from patch panel 32 shown in FIGS. 3 and 4 in the manner by which a grounded connection is maintained with a grounded ethernet cable 34 at connection point D, as depicted in FIG. 68. The particular type of grounded ethernet cable 34 it would best work with is the cable 288 shown in FIG. 66 where the earth conductor 38 is located under the insulation of the cable 34 and shielded cable 290 of the sort shown in FIG. 65 which has been suitably modified to have sufficient gauge for carrying the potential current. In both cases the exterior insulation 278 is stripped back revealing the earth conductor 38 in cable 288 or the shielding and drain wire of cable 290. This stripped portion is then clamped down in respective cable clamps 292. Cable clamps 292 are comprised of cable base 294 in which a cable is seated to be clamped and which is in electrical contact with embedded ground bus 300. Clamp base 294 has clamp rails 296 extending therefrom and wherein the rails have a surface or mechanisms for interacting with clamp press 298 which is moveable on the clamp rails 296. The clamp 292 is constructed in a way that the movement of the clamp press 298 on the rails 296 is one way and wherein a special tool is required to release the clamp press from its closed and clamped position as shown in FIGS. 68A and 68B. The interior of the clamp is constructed of electrically conductive material which connects the ground bus 300 with the earthing conductor 38 or the braided shield and drain wire of a suitably modified shielded cable 290. Patch panel 282 also has an earth connection 302 which provides the earth connection for distribution by the earth bus 300. This is connected to the earth points 57 on power rail 53 located in cabinet 54 as depicted in FIG. 7. Patch panel 282 also features at connection point C RJ-45 ports for inserting RH-45 plugs from Ethernet cable 22 which carry the high powered DC power and data signals but no ground connection. As these are conventional RJ-45 plugs and cables the ports 304 do not need to feature an earth connection.

Figure 74:
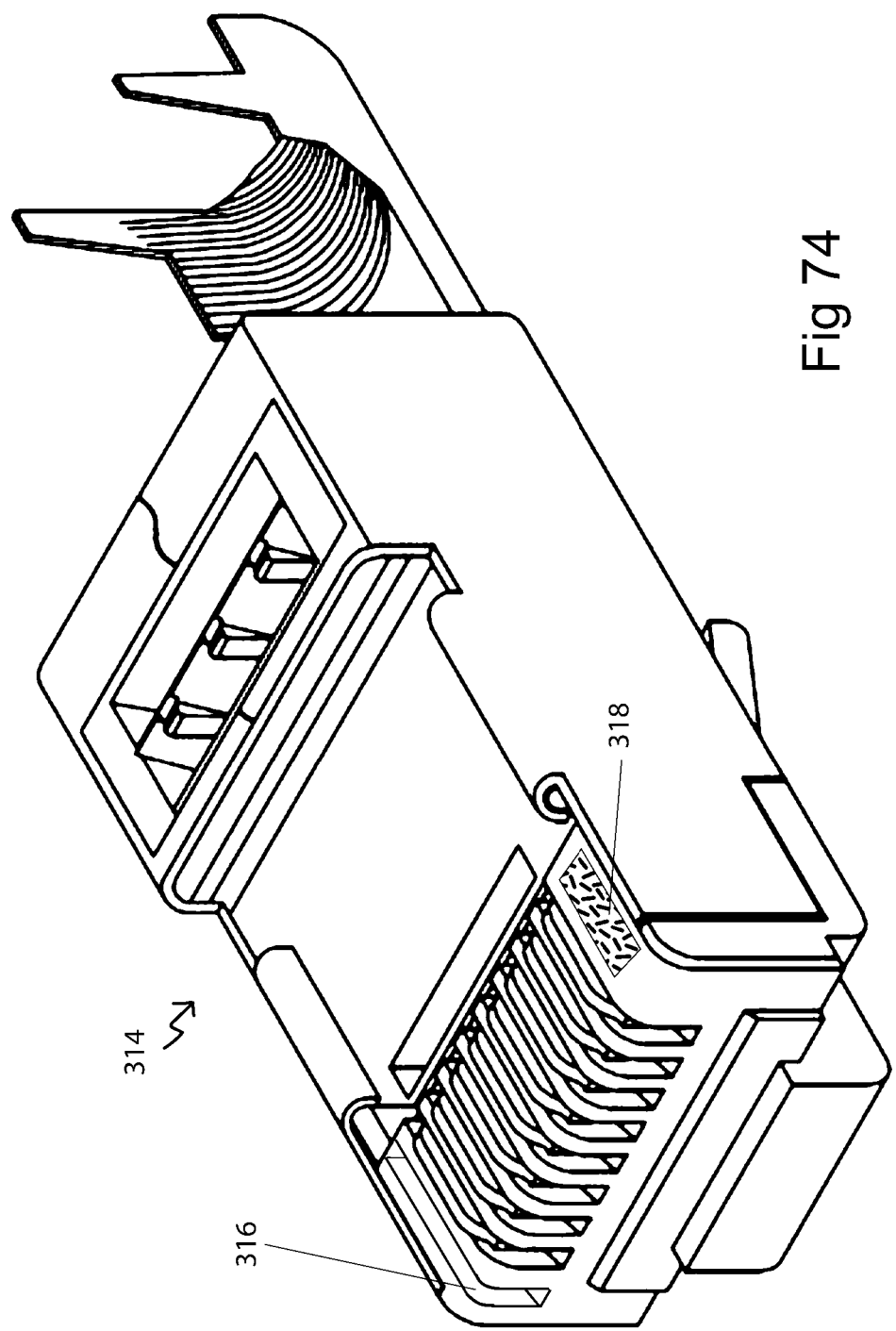
FIG. 74 is a perspective view of a modified RJ-45 for use with 9 conductor ethernet cables that provide an earth connection.
Figure 78:
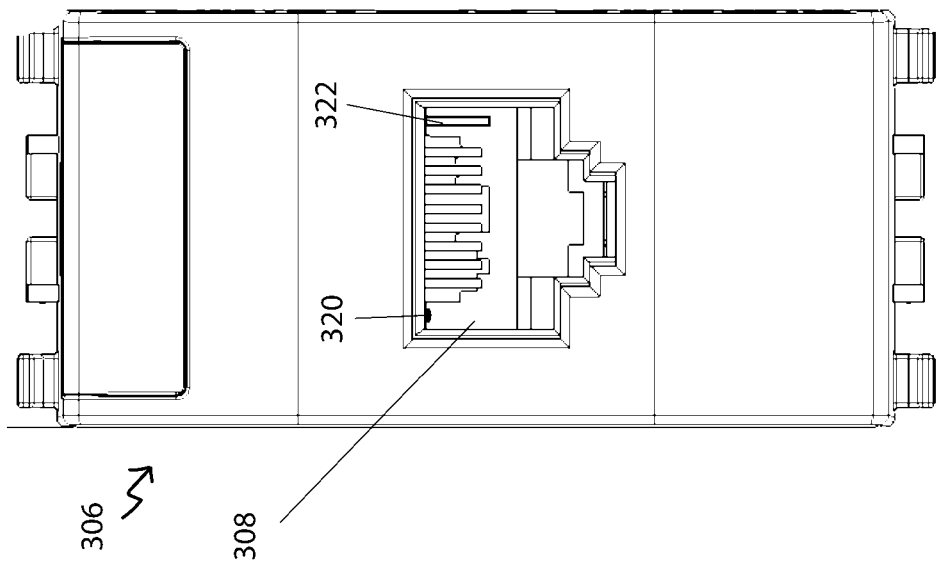
FIG. 78 is a front view of the jack module of FIG. 75.
Figure 77:
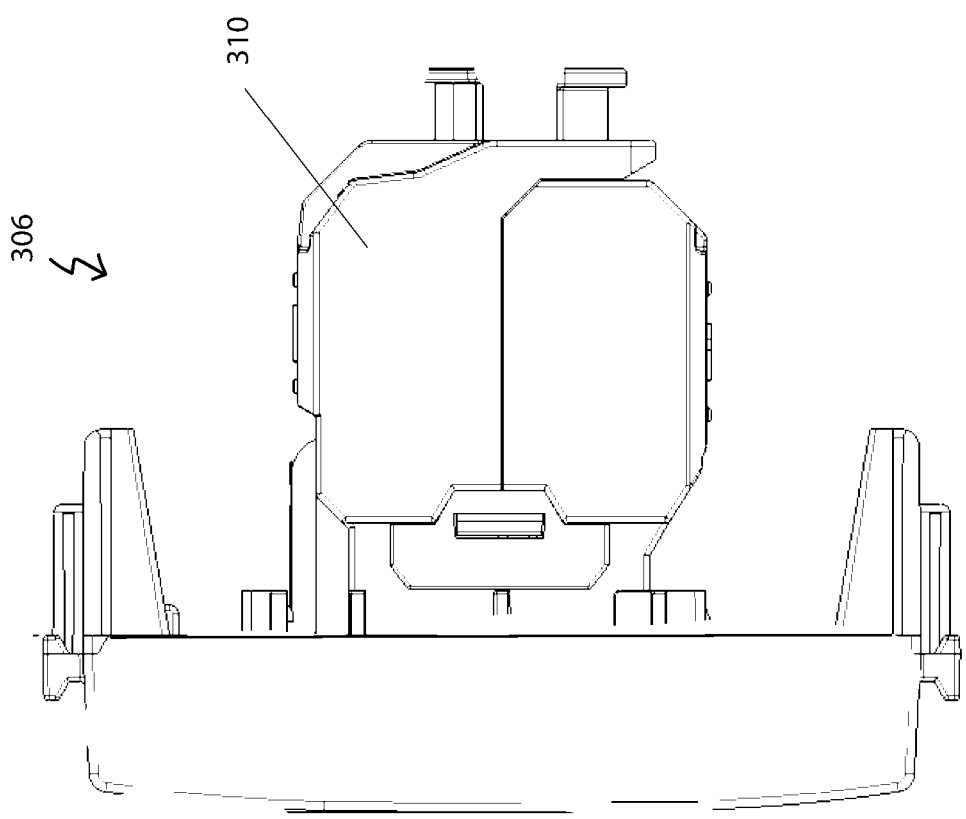
FIG. 77 is a side view of the jack module of FIG. 75.
Figure 79:
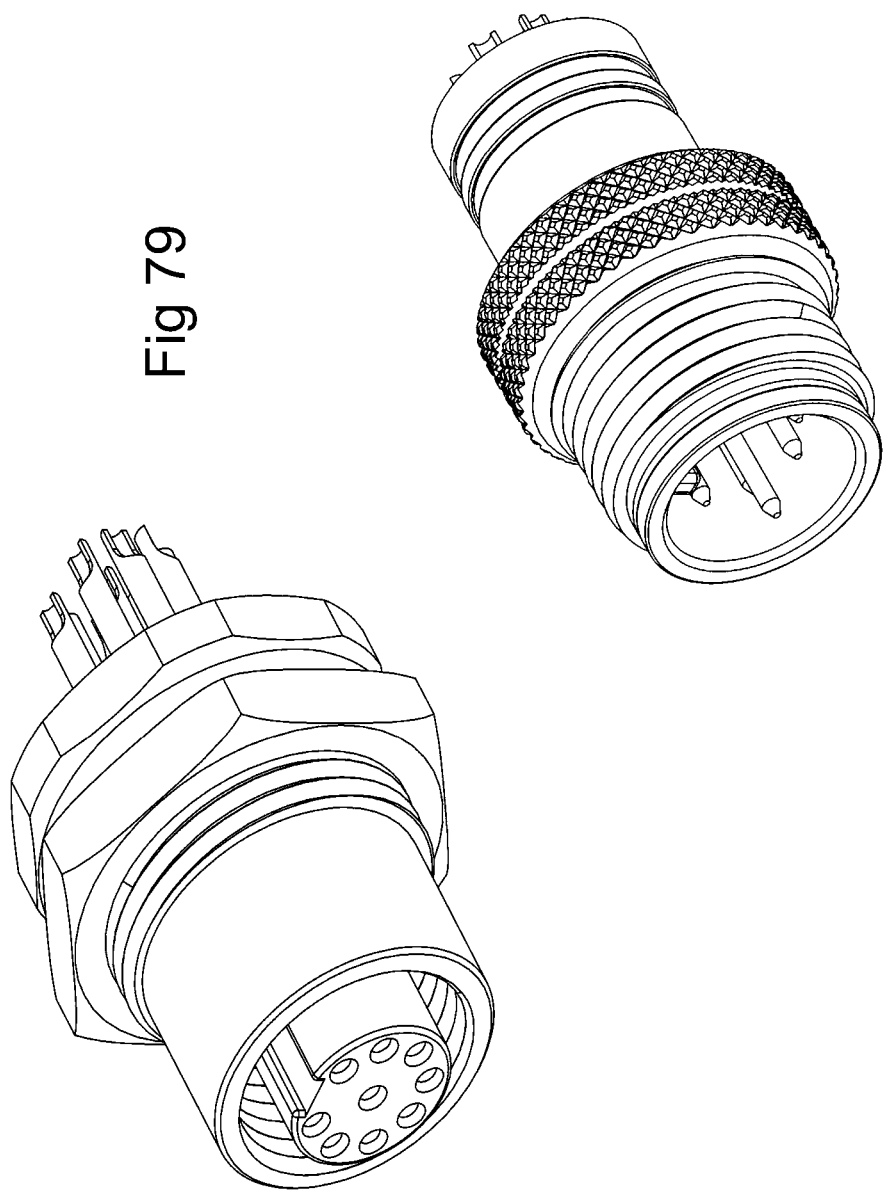
FIG. 79 is a modified M13 ethernet plug having a ninth conductor for providing an earth/ground connection.

In most fit outs where ethernet connection points are provided to multiple points on an office floor the points are provided by way of wall plates 286 which have mounted in them ethernet jack modules 306 which provide grounded ethernet ports 308. Such modules have two connection points E and F as depicted in FIG. 67. The front connection point F is comprised of grounded ethernet port 308. The rear connection point E is comprised of a cable mount 310. In use the ethernet jack module 306 is connected to ethernet cable 38 involves the data cable installer stripping back the cable to its conductors and wiring them up similar to that of connection point D at the rear of the patch panel 282 in that the outer layer of insulation 278 is removed from either cable 288 or 290 leaving exposed the braided shielding 310 or earth conductor 38 exposed. The cable mount 310 pivots open at the rear exposing the conductive cable clamps 312 and contact block 314. The individual ethernet conductors 42 are inserted into the contact block and the cable mount 310 closed with the supplied tool wherein the conductive cable clamps 312 come into electrical contact with the shielding 310 or conductor 38 and where the conductive cable clamps 312 are in electrical communication with the grounded ethernet port 308 in the ethernet jack module 306. Turning to connection point F, namely grounded ethernet port 308 we note that it is adapted to receive a grounded RJ-45 jack 314 depicted in FIG. 74. The grounded RJ-45 jack 314 shows two modifications where in practice only one would be necessary. The first is an extra jack slot 316 and the second a conductive portion or pad 318. Both carry the ground or earth connection obtained from earthed ethernet cable 34 into a portion of the plug that is inserted into grounded ethernet port 308. Turning to FIG. 78 there is depicted a grounded ethernet port 308 which is modified in two ways. In practice it may only need the one modification depending on the sort of grounded RJ-45 plug utilised. If an RJ-45 plug 315 is used with extra jack slot 316 then grounded ethernet port provides a grounding pin 322 that slots into the jack slot 316. Grounding pin 322 is in electrical communication with the conductive clamping pads 312. Similarly, terminal 320 is provided to come into electrical contact with the conductive grounding pad 318 and communicate the ground connection in this way.

Connection G at the PDU 24 and connection point B B at the mid span 284 essentially involves the same grounded RJ-45 plug from grounded ethernet cable 34 being inserted into a grounded ethernet port of the same sort as grounded ethernet port 308 (or by utilising the grounding system described earlier using the metal jacket of the ethernet plug used with shielded cables).

Attention now turns to FIGS. 69 to 73 which depict an alternate embodiment of patch panel 282. FIG. 69 depicts a conventional patch panel 324 which is not adapted to receive any of the nine conductor ethernet cables with a ground conductor 38. Conventional patch panel 324 is shown screwed together with grounding loom 326. Grounding loom 326 has a single grounding connection 328 which is connected to a ground bus (not shown) like in the case of the rear of patch panel 282. A plurality of cable clamps retainers 324 hold grounded ethernet cables 34 in place. When stripped of the outer insulation the exposed ground conductor 34 or braiding 310 is exposed and connected electrically when retained by way of cable clamps 292 of the sort described on patch panel 282. By using a grounding loom 328 it is possible to utilise existing patch panels and incorporate a connection to ground by installing the grounding loom 328 over the ends of the patch panel 324.

In the description that follows of specific embodiments of PDU devices a separate ground connection is described on each of the PDU's schematics. The skilled reader will appreciate that any of the forgoing earthing systems could be employed to provide that ground or earth connection to the stated PDU including:

1. Using modified version of the shielded CAT cable system where the outer metal jacket of the RJ-45 plugs carry the ground connection into an RJ-45 port—for use with shielded cables or any of the other grounded ethernet cables comprising ground conductors 38;
2. Using RJ-45 plugs and ports with additional slots/pins for carrying the ground/earth connection;
3. Using RJ-45 plugs and ports with additional pads and terminals for carrying the ground/earth connection;
4. Using modified M13 plugs and corresponding ports which have an extra pin/receiving slot for the ground/earth connection.

MiPOE Multi-Drop PoE

Power Over Ethernet has revolutionised low-power distribution for office appliances such as VOIP phones (Voice Over Internet Protocol), Wireless Access Points (WAPs) and security cameras. Over the past 30 years increases in Ethernet bandwidth (10 Base T, 100 Base T, 1000 Base T) have led to cables with heavier conductors required to minimise data loss at these higher data-rates. These advances in cable technology have enabled high-power PoE (100 W-300 W), however, at the same time, identifying a shortcoming of current PoE topologies (IEEE 802.3 (af)(at)). That is, Power Supply Equipment (PSE) and Powered Devices (PD) have had a one-to-one relationship. As such, neither the physical layer nor the interoperability protocols support a multi-drop interface, where a plurality of PDs can be connected to one PoE PSE port. The MiPOE Multi-Drop PoE connection and Interfaces of the present invention address this problem, enabling multiple low-powered (1 W-20 W) PDs, such as light fittings, to be powered and controlled from one 200 Watt PSE port.

The MiPOE Multi-Drop PoE of the present invention more closely follows the practices widely used in the electrical wiring topologies of commercial and residential buildings. As such, this PoE multi-drop enables the prudent use of cable routing to minimise cable wastage and facilitate judicious use of PSE ports. Apart from the power distributive nature of the PoE connection a Multi-Drop PoE port can pass through commands which may include, but not limited to, light dimming, switch commands, occupancy sensor data, door strike and alarm sensor data etc. at a rate of approximately 2400 baud. As vast majority of these appliances, such as light fitting, light-switches, sensors, General Purpose Outlets, require very little bandwidth to control and monitor, it is a waste of resources to use the high-speed Ethernet differential data bearers to send occasional control bytes over a data-circuit that may be designed to transfer data at gigabits per second. The preferred method to avoid this disruption of the primary Ethernet service is to use an orthogonal signalling method to the differential bearers. Longitudinal signalling is achieved by modulating the injected DC voltage that is carried from PSE equipment to PDs. This voltage is typically 57 VDC and must, by statutory authority, remain below 60 VDC at all times to maintain its SELV electrically safety status (Separate Extra Low Voltage). This was first disclosed in PCT/AU2017/000160.

Figure 11:
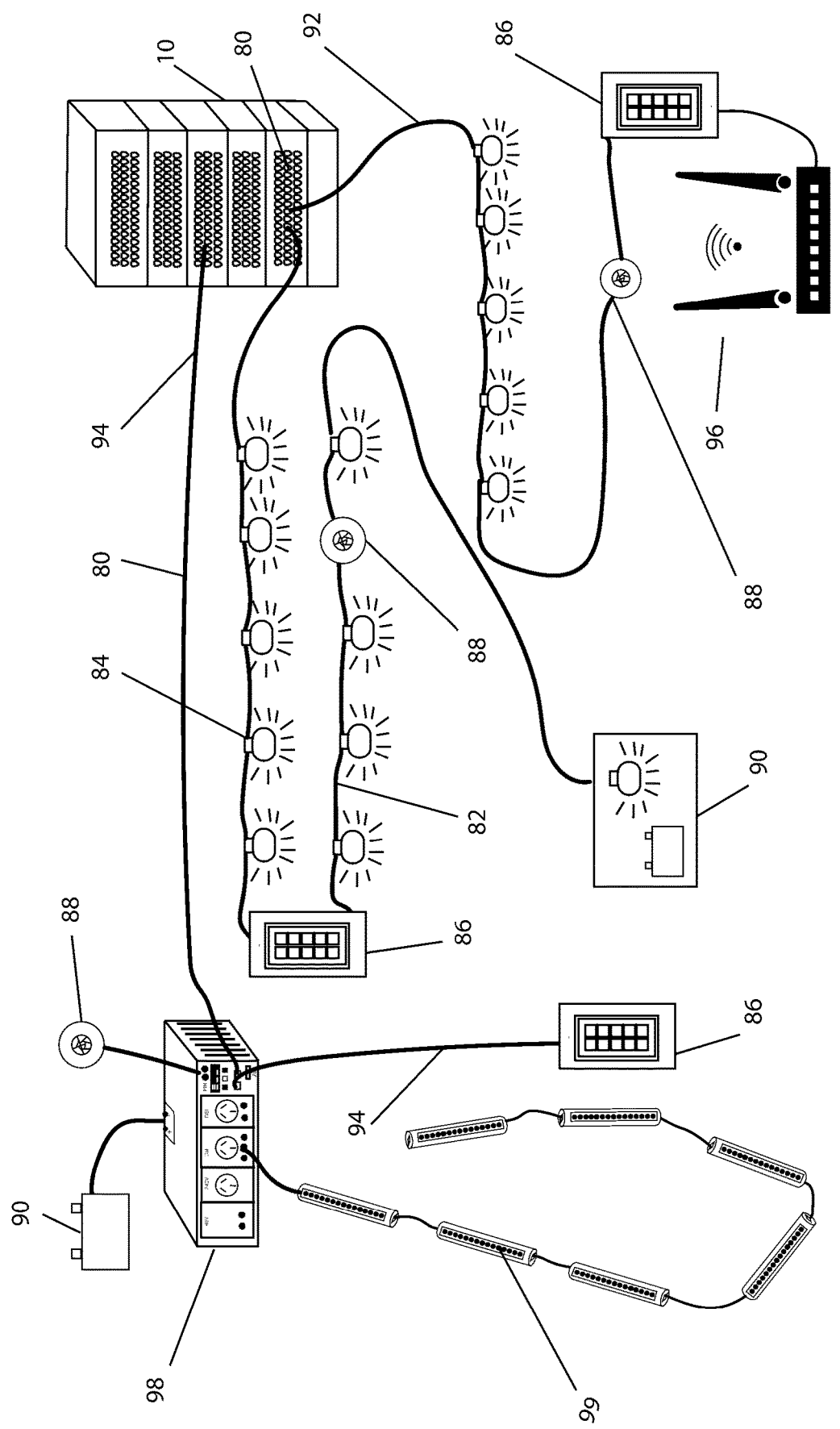
FIG. 11 is a schematic showing a PSE and strings of PDs in a multidrop arrangement.

The present invention provides the means for enabling multi-drop PoE over a plurality of devices on the one PoE connection as shown in FIGS. 11 to 14. FIG. 11 depicts a PSE 10 providing a plurality of high powered MiPOE ports 80. On MiPoE connection 82 there are a plurality of MiPoE luminaires or lights 84 together with a control panel or switch 86 and a PIR occupancy sensor 88. Connection 82 also has a battery 90 for supplying power along connection 82 in the event that the draw of power from the PSE is insufficient or where the PSE 10 ceases to operate and provide power. Battery 90 may also have a light in it and operate as an emergency light. Combined, the PDs 84, 86 and 88 consume less than 200 W of DC power. Each device can be addressed separately and communicates its state to the PSE 10. Each PD has two Rj-45 jacks for daisy-chaining the PDs along the connection 82. Each PD draws down DC power from the PoE connection 82. This allows a single MiPOE port 80 of PSE 10 to power multiple PD devices via a single RJ-45 port. The string of PD devices 82, 84 and 86 operate together to provide a user with the ability to turn the lights on and off via the switch 86 and/or automatically turn them on and off via PIR or other sensor 88. Similar arrangements of devices can be seen on connections 92 and 94 from MiPoE ports 80 of PSE 10. Connection 92 differs from connection 82 by way of terminating the MiPOE connection 92 with a device that utilises data communication protocols offered by conventional PoE over TCP/IP, namely a wireless access point 96. In the present embodiment of the invention, only one conventional PoE PD that terminates each MiPOE connection can utilise the high speed, high bandwidth data connection provided over TCP/IP by PSE 10, all of the other PDs on a MiPOE connection 80 of the present invention communicate with PSE 10 and other PDs via the common mode signalling system which supports lower baud rates than otherwise available through conventional PoE. Connection 94 demonstrates an alternative setup in which there is a lighting PDU 98 which converts DC power from the PSE 10 into AC power and accompanying DALI lighting control signals to control and power a string of DALI lights 99. The connection 94 also has switch panel 86 for manually controlling the DALI lights 99 through signals passed to lighting PDU 98 via common mode signalling protocol operating between PD, PDU and PSE devices on connection 94. As in the case of the USB PD standard, MiPOE PDs and PDUs may be able to be used to power other powered devices when necessary.

Figure 12:
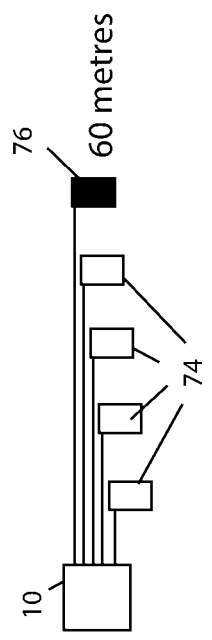
FIG. 12 depicts the star topology of prior art PoE networks.
Figure 13:
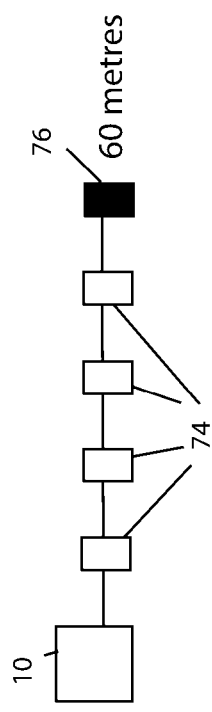
FIG. 13 depicts the multi dropped daisychained topology of the present invention in which there is one conventional PoE PD that terminates the string of PD devices according to the present invention.
Figure 14:
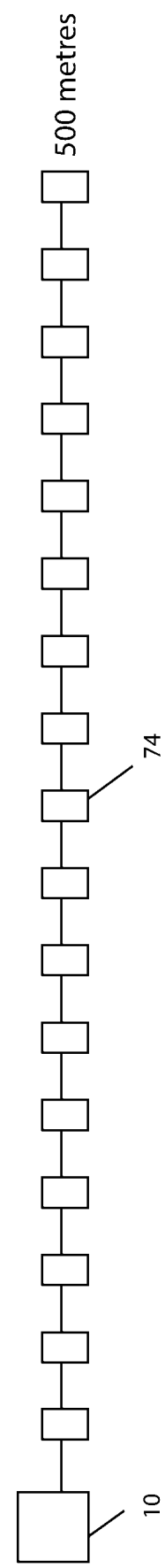
FIG. 14 depicts a string of PDs devices according to the present invention indicating the number of PDs and distance upon which the PDs can be installed on the ethernet cable.

FIGS. 12 and 13 demonstrate the savings in cabling that can be made when multiple MiPOE powered PDs and PDUs 74 are placed on the one PoE connection 80 derived from PSE 10. In these figures PD 76 is able to access the full data communication available via PoE over TCP/IP. All other devices 74 communicate with each other and PSE 10 via common mode signalling of the present invention. If none of the devices require, say, gigabit ethernet data communications, that is, does not need a conventional high bandwidth connection and only need to transmit small amounts of data, the usual limitations on the span between PSE 10 and devices 74 no longer apply. The usual limitation is approximately 60 m between connected ethernet devices. In the case depicted in FIG. 14, the span between the PSE 10 and end device can be as long as 500 metres. Such devices can also draw DC power over this length. This makes the system well suited to the provision of sensors and small monitoring devices in factories, hospitals and mine sites.

Multi-Drop PoE Modem and Supervisor Circuits

Specific mention is now made to the FIGS. 15 to 34 which depict circuits and components of the PoE system of the present invention.

To achieve a reliable, high fan-out multi-drop MiPOE network it is important to ensure that the plurality of PDs and PDUs do not adversely load the circuit. This loading could be due to excessive current draw because of an out of specification appliance (i.e. Luminaire drawing too much current). Loading can also occur on the data-lines where a single PSE Port data transmitter may need to supply a plurality (2-20) PDU data-receivers. To minimise this loading the multi-drop modem has two terminating impedances values. When listening for a command from the PSE, its default state, the modem operates in high-impedance mode, where it presents a relatively high-impedance to the common mode data-lines. This high impedance helps reduce the loading that occurs when multiple MiPOE powered devices 74 are connect to one PSE port 80.

Once a particular MiPOE powered devices 74 recognises its zone address in the message packet the MiPOE powered devices 74 responds by asserting low-impedance mode on the multidrop modem so it can overcome the various loads that the other MiPOE powered devices 74 and the PSE 10 modems present. It should be noted that this methodology will necessarily lead to uncertain termination impedances and therefore it is important to both limit cable length and modem carrier frequency as to avoid standing-wave reflection (common-mode).

Figure 15:
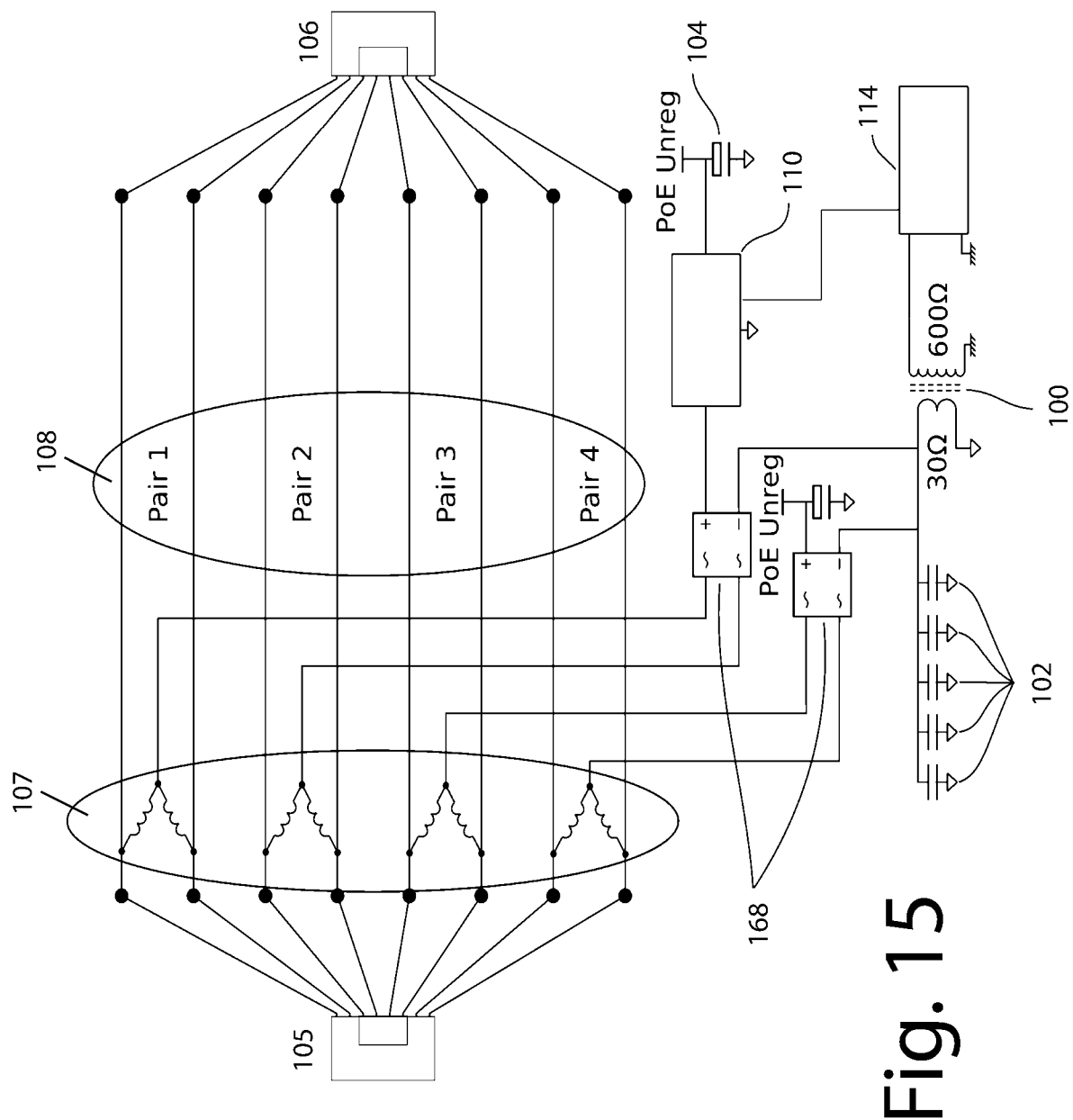
FIG. 15 is a schematic of a PoE line interface circuit that extracts the DC common mode signal from the differential pairs using the array of inductors.

Longitudinal signalling is achieved by modulating the injected DC voltage that is carried from PSE 10 over MiPOE connection 80 to MiPOE powered devices 74. This voltage is typically 57 VDC and must, by statutory authority, remain below 60 VDC at all times to maintain its SELV electrically safety status (Separate Extra Low Voltage). To help achieve this electrical separation of the ethernet data lines a resonant transformer has been employed as depicted in FIG. 15.

Apart from electrical isolation the transformer 100 provides a solid DC current path for the appliance to be powered, and through operating the resonant transformer at a high-Q (10-30) it also achieves very little loading via a high effective terminating impedance (at resonance) to minimise loading effects in this multi-drop environment. Also, the use of resonance means the transformer 100 can be relatively small which benefits both appliance fit and cost. The resonant transformer is the circuit formed by the transformer 100 and capacitor bank 102. The quality factor or Q of the resonant transformer is determined by the energy stored in the inductance or capacitor divided by the energy lost in both the capacitor and inductor. A bank of capacitors 102 was found to be generally more effective than a single capacitor as very low Effective Series Resistance (ESR) is required to achieve high Q. Likewise, a transformer 100 tightly wound on a low-loss ferrite core with wire of a large cross-sectional area or even Litz wire (multi-isolated strand) was required to achieve these high quality factors. The resonant transformer also provides impedance transformation. A common-mode bundle of various Category 6E and Category 7 cables show a combined characteristic impedance between 30-40 Ohms, whilst many low-frequency modem integrated circuits are more suitable for higher impedances, such as 600 Ohms. The transformer 100 has 2 turns on its primary and 9 turns on its secondary to achieve an impedance transformation of 30 Ohms to 600 Ohms. However, many other ratios could be effectively employed.

The choice of multi-drop carrier frequency has many competing factors. As the multi-drop interfaces works orthogonally to the existing ethernet bearers it should ideally have minimal effect on their performance. Most of this orthogonality is due to the common-mode signal having approximately equal effect on the differential data bearers (or pairs). However, a choice of carrier frequency well below the differential Ethernet carrier frequency (250 MHz-500 MHz) is prudent. Also, due to the uncertain terminating impedances associated with multi-drop interfaces a carrier frequency sufficiently low enough to not cause electrical wave reflections at the recommended cable limits of 60 metres (for conventional PoE devices requiring high bandwidth data connections). Power consumption is also an important factor, there are a wide supply of low-powered solutions available for modems with carrier frequencies that operate from 10 KHz-10 MHz which meets the above criteria. As many of these PoE appliances will be in an idle or off-state most the time it is important to minimise the energy required whilst listening for a command. The Q Factor of the transformer and anticipated data-rate also plays an important role in the choice of the CMOS integrated circuit or standard cell modem. Most of the anticipated appliances will be of a low-cost nature with extremely low date-rate half-duplex communications requirements. This coupled with the High-Q, and therefore narrow band, suggest a low-data rate, or modulation rate. A particular carrier frequency of 125 KHz was chosen based on; power consumption, data rate, availability of suitable technologies and the frequency to avoid switching frequencies of high-efficiency DC-DC and DC-AC converters that typically operate above 150 kHz. A data-rate of 2.4 kBaud was considered adequate for the occasional commands being passed through the Power Supply Equipment (PSE 10). However, a variety of carrier frequencies could be chosen, particularly if higher data-rates (such as CCT video) are required. The signal to noise ratio in these environments is quite good as the 125 kHz carrier is a long way from the differential carrier (250 MHz-500 MHz). Also, the differential pairs are subject to a looser twisting, which is still very effective at cancelling near-field and far-field interference signals. On the point of topology, it is important to note that this half-duplex multi-drop protocol enables MiPOE powered devices 74 to initiate communications, as would be required for switch controls, alarm and occupancy sensor requirements, or lamp failure indication.

An important feature of any multi-drop (daisy-chained) interface ensure that regular Ethernet traffic, that is modulated onto the differential bearers, is not disturbed, or impeded. To help insure this the Differential bearer insertion loss must be kept to a minimum. Considering each Ethernet cable coupling results in some loss it is important not to compound these losses. It is therefore important to use impedance-controlled trace and high-quality connectors that can handle the of approximately 1.5 Amp DC per data pair.

Longitudinal Signalling introduces another type of insertion loss which is far more substantial. Longitudinal cable losses are extremely low, primarily due to the low carrier frequency and maximum cable length. The skilled reader can expect cable losses of less than 1 dB over the MiPO Multi-Drop network, however, the loading effect of additional MiPOE powered devices 74 can lead to fan-out based insertion losses of 20 dB with a network of 15 MiPOE powered devices 74. However, due to the pair-bundle wrap most fair-field and near field signals are cancelled giving an excellent signal-to-noise environment. Because of the above factors a Longitudinal carrier amplitude of +6 dBm was chosen and has proven effective.

As the power transferred through Ethernet cables increases it becomes very important to monitor the condition of the cable and its connections. Of particular concern is the rising currents in Ethernet cables that are long or have damaged conductors or terminations. As most PoE applications rely on switch-mode DC-DC or DC-AC convertors this increased line resistance will lead to an increased current drawn on the PoE cables to deliver the required load power. This increased current can in-turn cause elevated cable and connector temperatures leading to failure or fire.

To mitigate these types of risks a PoE Supervisor integrated circuit or SIC 110 has been implemented as shown in FIG. 15. The PoE Supervisor 110 disables the appliance load if any of the following conditions are met:
1. The Common-mode DC voltage superimposed on the Ethernet bearers is too low.
2. The common-mode DC current on the is too high.
3. The temperature of the appliance or Supervisor Integrated Circuit goes too high.

Apart from these protective functions the PoE Supervisor 110 also provides feedback of the above conditions via status LEDs or microcontroller interface. The PoE Supervisor also provides a low-voltage (+5V) output to provide power to a microcontroller and modem. An output error amplifier has been included to enable configuration of the supervisors 110 on-board switch to form a Constant Current or Constant Voltage LED driver.

FIG. 15 Shows a MiPOE powered devices 74 pick-offs 107 that extracts the DC common mode signal from the differential pairs 108 using the array of inductors 107. The Ethernet signal is daisy chained or passed through to other PDUs from RJ45 connector 105 to RJ-45 connector 106. It is important that the circuit traces that join connectors 105 and 106 are of a controlled impedance nature and made as short as possible to minimise degradation of the differential Ethernet signal. The Bridge Rectifiers 104 correct for any polarity reversals. These rectifiers 104 have the primary of the resonant transformer in its negative return path however it could also be located in the positive rectifier circuit. The resonant transformer 100 primary presents a very low impedance to all DC and AC signals (excluding those at or near the resonant frequency). The resonant frequency is determined by the inductance of the primary of the transformer 100 and the capacitor bank 102. The recovered direct current is feed to the appliance via the PoE Unreg rail. The recovered longitudinal signal is feed to the Modem and microcontroller 114

Figure 16:
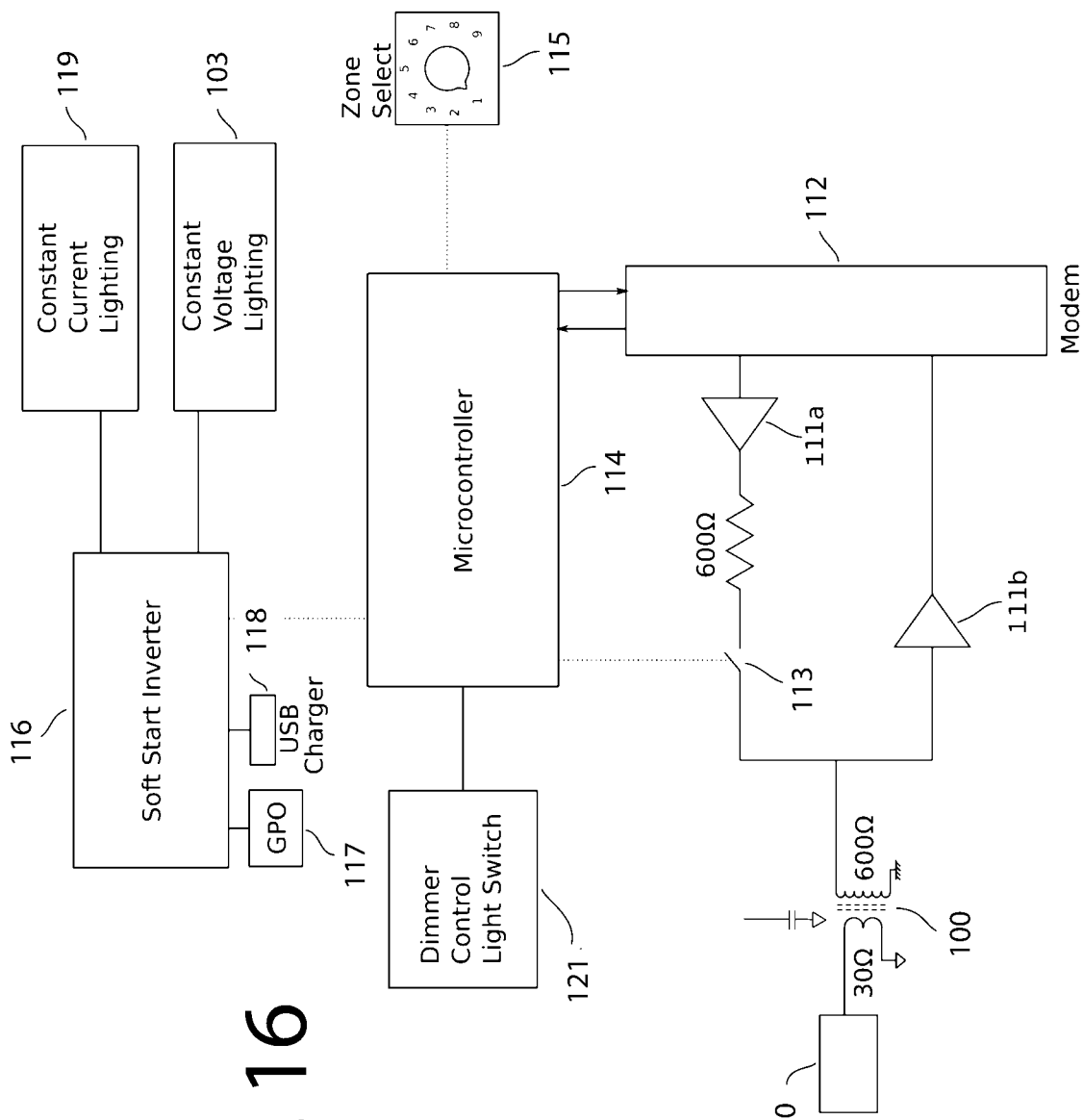
FIG. 16 is a schematic of a modem and control unit incorporating the PoE line interface circuit of FIG. 15.

FIG. 16 shows the modem and control unit of a MiPOE powered device 74, its purpose is to communicate with the PSE 10 or other MiPOE powered devices 74. After the modem signal is recovered from the Power Distribution pickoff circuit 120 it is fed via the transformer 100 into the receiver amplifier which then feeds any incoming signals to the Modem (Modulator-Demodulator) 112. This incoming signal is then decoded, and the resultant command is passed through the microcontroller 140. Any command responses or commands initiated from the MiPOE powered device 74 are then modulated through modem 112 and inserted onto the common-mode Ethernet bearer via closure of data-direction switch 113. It is important that this half-duplex communication response only occur if no other MiPOE powered device 74 or PSE 10 carrier signal is detected.

Each MiPOE powered device 74 on a particular PSE port 80 can be grouped into one of several zones via the Zone Selection switch 115. In this way a single PSE port can support dozens of lighting devices and control them provided they are in the same selected zone and on the same PSE port 80.

A multi-function soft-start inverter 116 is where the recovered DC voltage is transformed into the required power for lighting under micro-controller 114 control. The inverter 116 optionally includes a high-powered (200 watt) DC to AC inverter for feeding AC power (240/120V) to a General Purpose Outlet (GPO) 117 to meet office/home office power supply requirements for AC powered devices 28 such as, desk lamps, laptop power supply units, phone chargers, computer monitors and televisions.

In other embodiments of MiPOE powered device 74 other peripherals include USB charging module 118, occupancy sensor, and temperature sensors. Both Constant-Current 119 and Constant-Voltage 118 outputs LED lighting is dimmable under microcontroller control based on sensed inputs from dimmer switch 121. Information about the particular load, such as load current, power-factor, lamp-current, lamp-failure or PoE pick-off voltage etc. can be feedback to a centralised Building Management System in the case of commercial installation or a Home Automation System for residential purposes via communication with PSE 10 which in turn is connected to management server 68.

Figure 17:
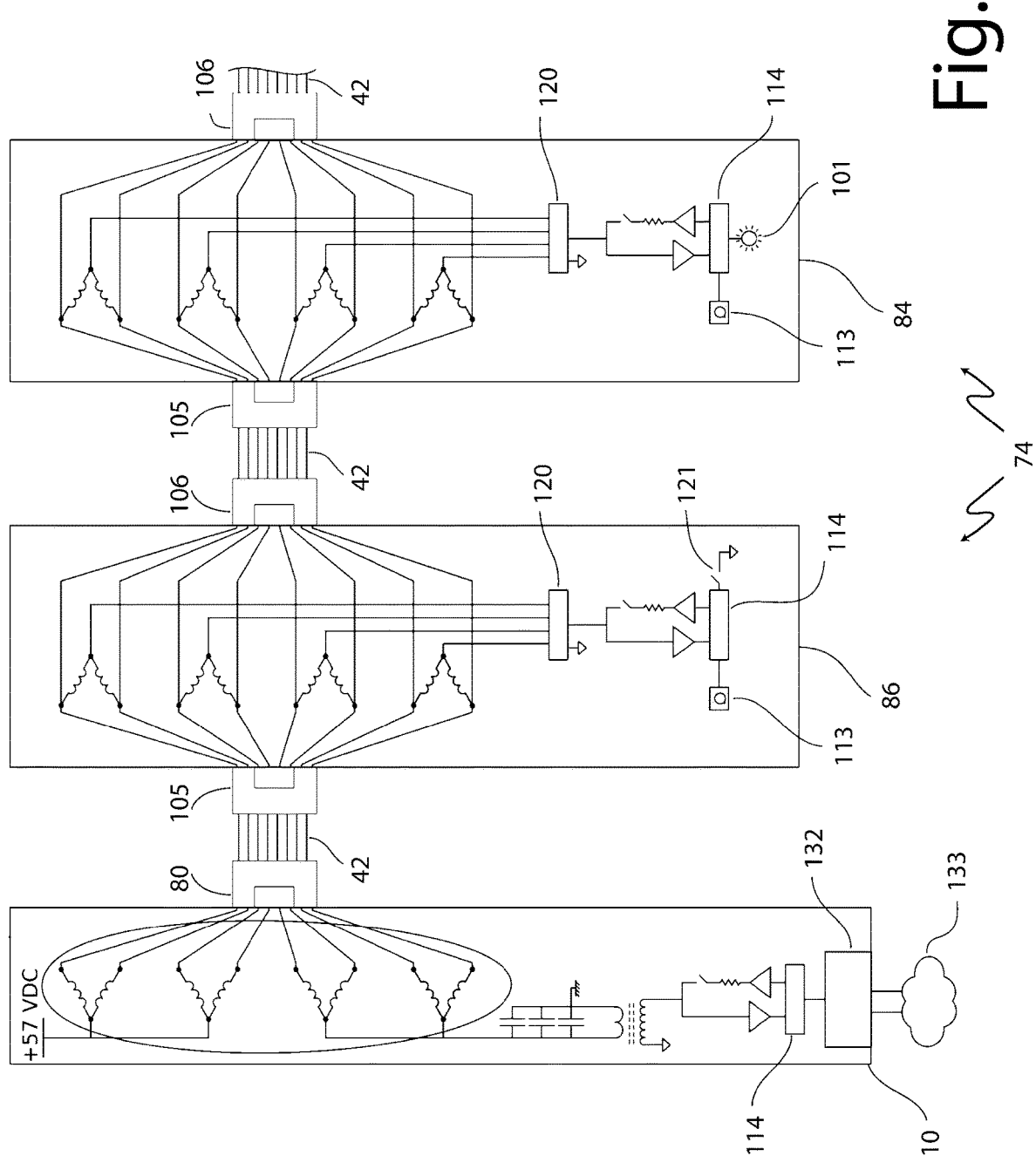
FIG. 17 is a schematic showing a simple network of two PDUs daisy-chained on a PSE port according to the present invention and wherein the first PD is a light switch and the second PD is the LED luminaire controlled by the light switch.

FIG. 17 shows a simple network of two MiPOE powered devices 74 daisy-chained on a PSE MiPOE port 80 of PSE 10. In this example a LED light 84 is daisy-chained to a wall-switch/dimmer control 86 on a single PSE MiPOE port 80. To help minimise reflections the data-path through each multi-drop MiPOE powered devices 74 is kept as short and straight as possible. Where permitted controlled impedance traces are used to implement the pass-through from RJ-45 connectors 105 to 106. In this example, pressing actuating the wall-switch 121 generates a communications event, where the micro-controller 114 through its modem 112 asserts its carrier (after checking if the channel is free) and transmits a switch command to all lighting points on the same PSE port 80 that match the same zone address, as set by the zone selection switch 115. This switch event can be captured by the PSE 10 which contains a similar longitudinal modem. This switch event can further be linked to a cloud/internet 133 linked Building Management System (BMS) including legacy management systems 72 and IoT gateways 78 via Protocol Gateways 132. Another example, a Building Management System (BMS) can control the lighting point [42] via the PSE 10. Linking lighting controls across different PSE ports 80 in the one PSE 10 is possible as is the transmission of lighting and other control signals between PSE 10 through the use of a management ports 194 for connecting PSE 10 to a specialise PSE 10, the management server 68. In one embodiment it is made possible using the Multi-protocol Gateway 132 that converts TCP/IP into longitudinal signalling on a particular channel and passes commands to alternate PSE channels.

Other aspects of the invention depicted in FIG. 17 include LEDs including:
  status LED 113 for indicating the status of the MiPOE powered devices 74; and
  LED bank 101 is what provides the illumination of lighting PD 84.

PoE Supervisor Integrated Circuit (SIC)

Figure 18:
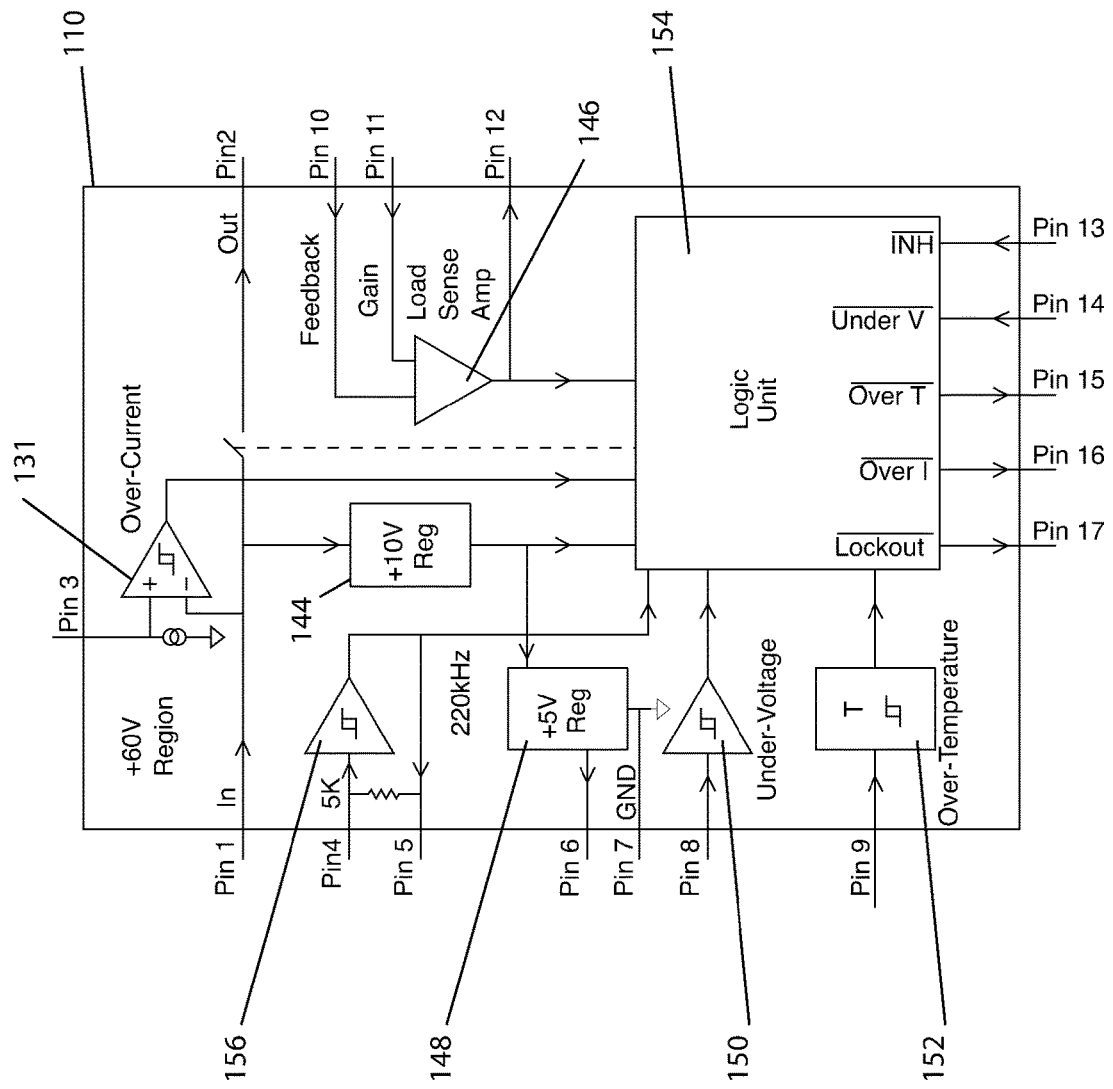
FIG. 18 depicts the components of the supervisor integrated circuit; ("SIC")

FIG. 18 shows a schematic representation of the PoE Supervisor Integrated Circuit 110. The purpose of the PoE Supervisor IC 110 is to provide a provide a safe and managed interface for MiPOE powered devices 74. It can operate as a stand-alone device or under microprocessor 114 controller. The SIC 110 provides a 5V supply to power the microcontroller/microprocessor 114 which can monitor the PoE voltage and current as well as the system temperature. In its simplest form the Supervisor 110 controls the delivery of the PoE supply to a DC load including DC to AC inverters, however, it is anticipated that the Supervisor IC 110 will be most beneficial for Multi-Drop lighting applications, hence, the series-pass switch can easily be configured as a buck regulator to directly drive Constant Voltage or Constant Current LED lighting. The SIC 110 is implemented in bipolar technology and can form complex functions with a small number of external components. The vast majority of the circuit operates with a 10V internal rail, however, there are two circuit blocks operating at the 60V (PoE Unregulated), namely, the Over-Current Detector, the Series Pass Switch and the input of the +10 V regulator.

SIC is also depicted in FIG. 30 which depicts:
1. Over-Current, Under-Voltage and Over-Temperature lockouts
2. Micro-processor interface, enabling reporting of failure mode as well as enabling Pulse-Width-Modulation (PWM) dimming of LED current.
3. Internal +5V linear regulator to supply a microcontroller and modem
4. Integrated high-current switch (10A) to isolate DC-AC convertor for GPO
5. Integrated error amplifier enabling buck-regulator Constant Current or Constant Voltage LED drive high efficiency 220 KHz switching frequency A short description of the various functional blocks within the SIC 110 follows:

Over-Current Detection. This circuit is shown in FIG. 19 and is used to measure the input current to the Supervisor IC via the 0.25 Ohm resistor 124. Once the voltage across the 0.25 Ohm resistor 124 matches that dropped across the 220 Ohm reference an over-current event is triggered shutting down the regulator via the Logic Unit. To avoid spurious triggering a low-pass filter by the 220 Ohm resistor 126 and the 10 nF capacitor 128. It is important that the voltage on Pin 3 be within 10V of the 60V PoE rail to avoid damage to the SIC 110.

Series-Pass Switch. This is shown in FIG. 20 and is the other functional block operating at 60V. The switch is a series-pass switch which can switch a steady DC supply to an DC to AC inverter. Alternatively, the series pass switch will be used as part of an integrated buck-converter. By adding a handful of external components, the Series-Pass Switch can be used in either Constant Current or Constant Voltage LED lighting.

Figure 21:
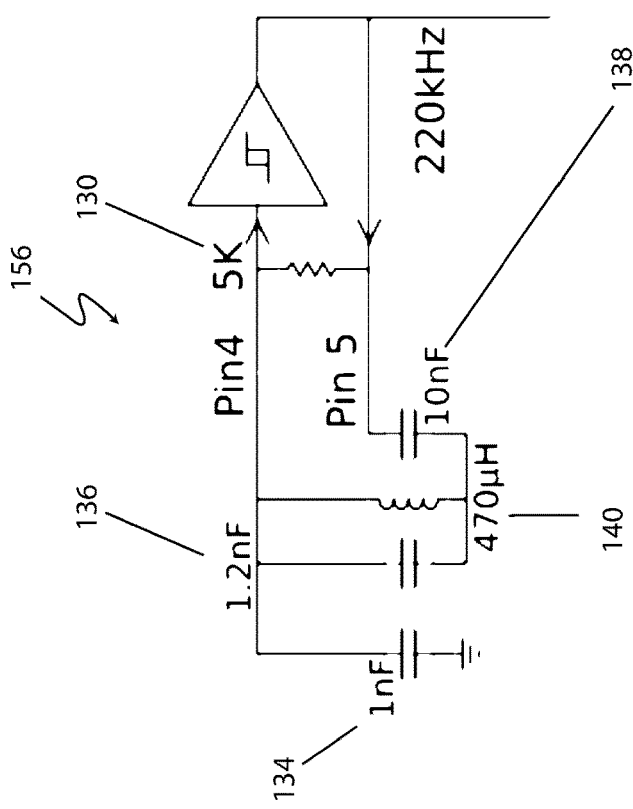
FIG. 21 depicts the resonant relaxation oscillator circuit of the SIC.

Resonant-Relaxation Oscillator 156 is shown in FIG. 21. To help ensure that the switching frequency of the Constant Current or Constant Voltage LED drive does not interfere with the Longitudinal Signalling frequency (typically 125 kHz) a high-Q tank circuit is used to help lock the Pulse Width Modulation (PWM) frequency. A frequency above the Longitudinal Signalling Carrier frequency was chosen (220 KHz) as harmonics from a switching frequency lower than carrier could possibly also interfere with communications.

The oscillator relies on the 5 k capacitor 130 and 1 nF capacitor 134 to initiate oscillation via the Relaxation of the capacitor charge through a hysteresis band set by the inverting amplifier. Relaxation oscillators have excellent start-up reliability, however, they often have poor frequency control as they are subject to high-sensitivity near their switching point leading clock-jitter and frequency drift. To avoid this draw-back of relaxation oscillators the oscillator switches into another mode once started, where the resonant tank circuit takes over as the dominant mode.

Figure 22:
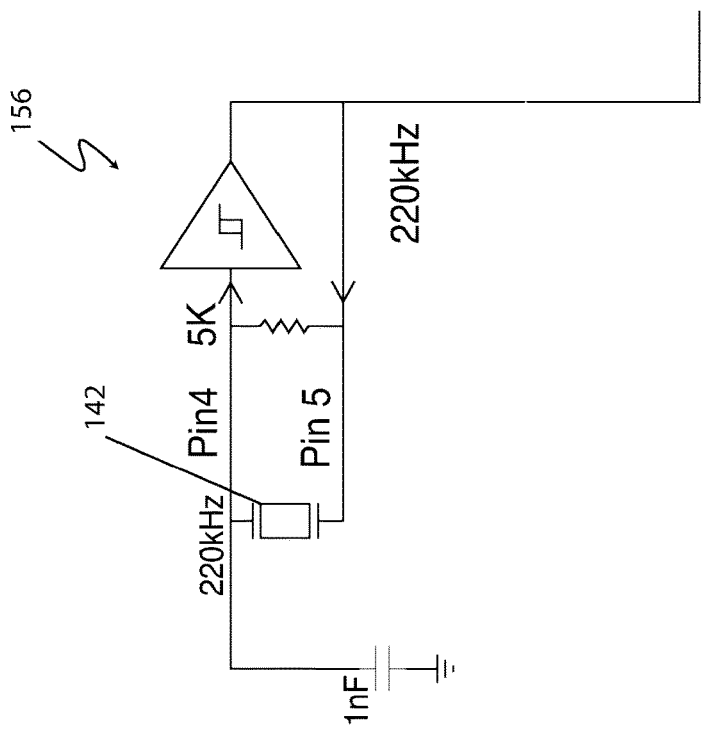
FIG. 22 depicts a further embodiment of the oscillator of FIG. 21 where the inductor is replaced with a crystal.

In the case where a crystal is preferred to lock the PWM frequency the 1.2 n capacitor 136 & 10 nF capacitor 138 and the 470 uH inductor 140 can be replaced with a crystal 142 as shown in FIG. 22. As custom cut crystal lead-times are often lengthy it is envisaged that the resonant tank circuit would likely be more advantageous.

Figure 23:
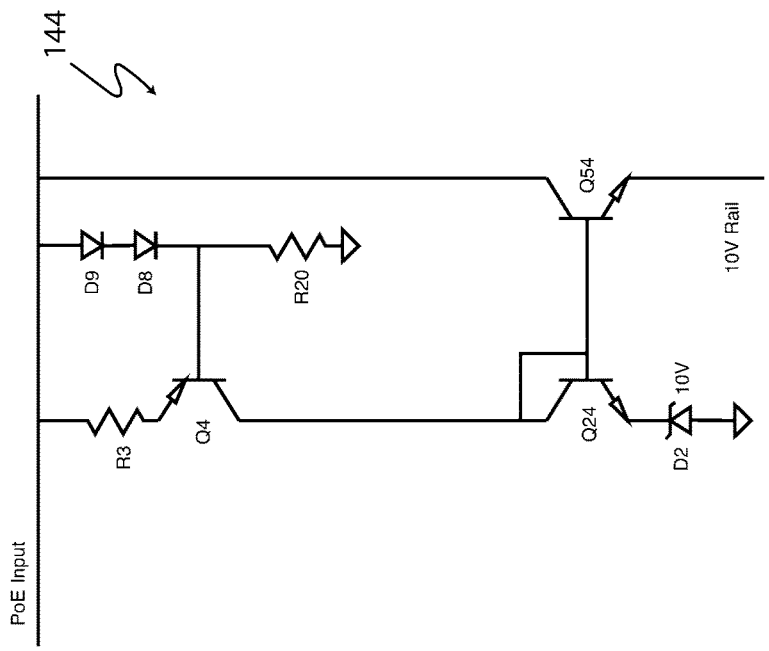
FIG. 23 depicts the +10 V regulator circuit.

+10 Volt Regulator 114 is shown in FIG. 23. To help reduce power consumption the integrated circuit is split into a 60V region and a 10V region. The vast majority (>80%) of the IC's transistor are supplied by this 10V supply. It was important that the regulator be unconditionally stable with a fast transient time to ensure the circuit reaches equilibrium quickly. The voltage-mirror configuration has a low component count and regulated the internal rail to within +/−2 mV.

Figure 24:
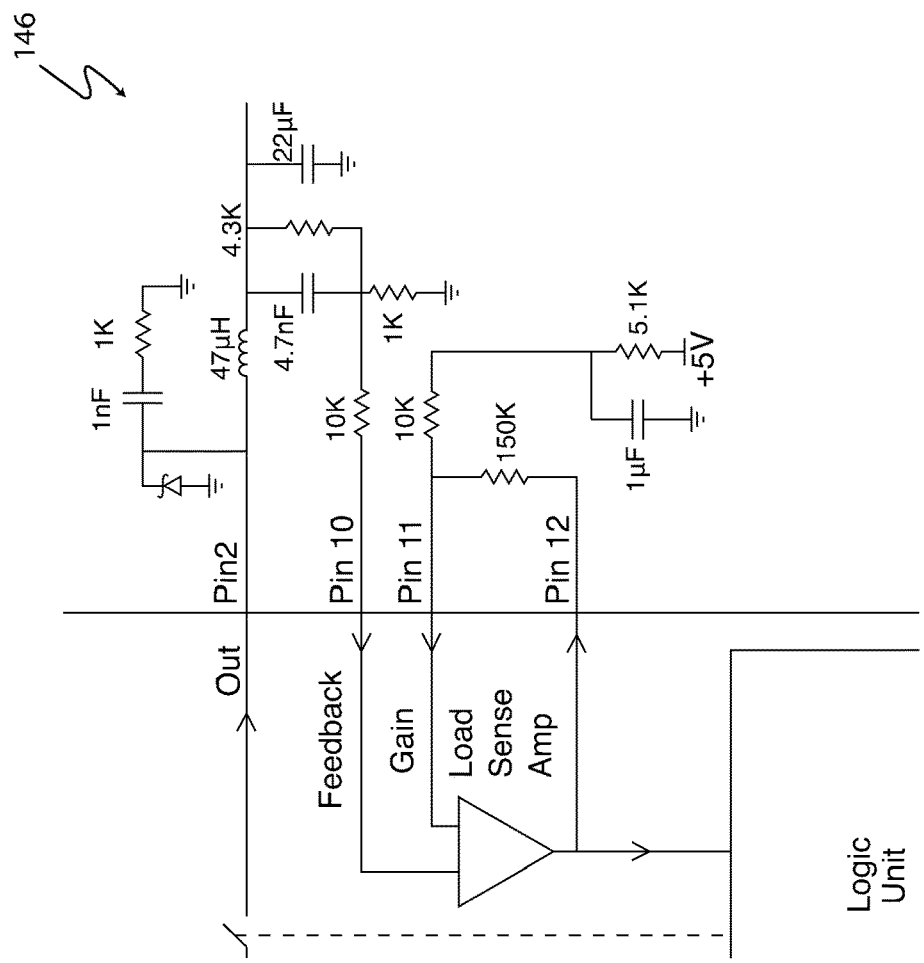
FIG. 24 depicts a load sense amplifier circuit as configured for a 24V constant voltage LED drive.

Load-Sense Amplifier 146 is shown in FIG. 24. To enable the series switch to operate as a Buck-Regulator a Pulse-Width Modulator (or Pulse Position Modulator) needs to be used in concert with a Load Sense Amplifier.

Figure 25:
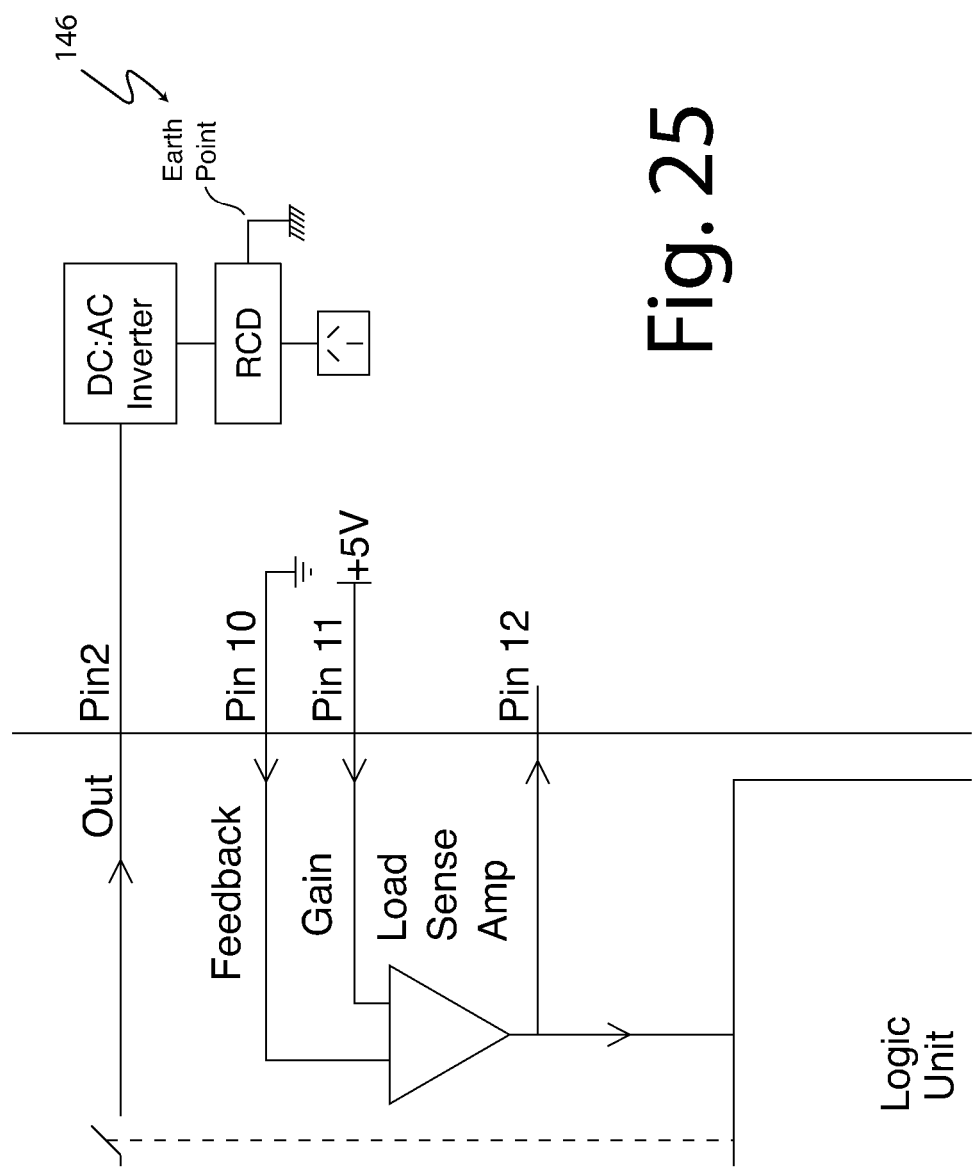
FIG. 25 depicts the switch from FIG. 20 configured as a simple isolation switch for the DC/AC convertor

An example of the Load Sense Amplifier being configured as a Constant Voltage Buck-Regulator is shown in FIG. 25. In this mode the Internal +5V supply is brought out to form the mid-rail (half of 10V) reference. In the example given equilibrium is reached once the potential divider formed by the 4.3 k and 1 k resistors yields +5V.

$$Vout = \frac{5V \times (1k + 3.9k)}{1k} = 24.5 \ VDC$$

It should be noted for the benefit of power efficiency the reference voltage in Constant Current mode should be 1V or less. To disable Buck-Regulator mode Pin 11 should be held at +5V and Pin 10 should be held at 0V.

Figure 26:
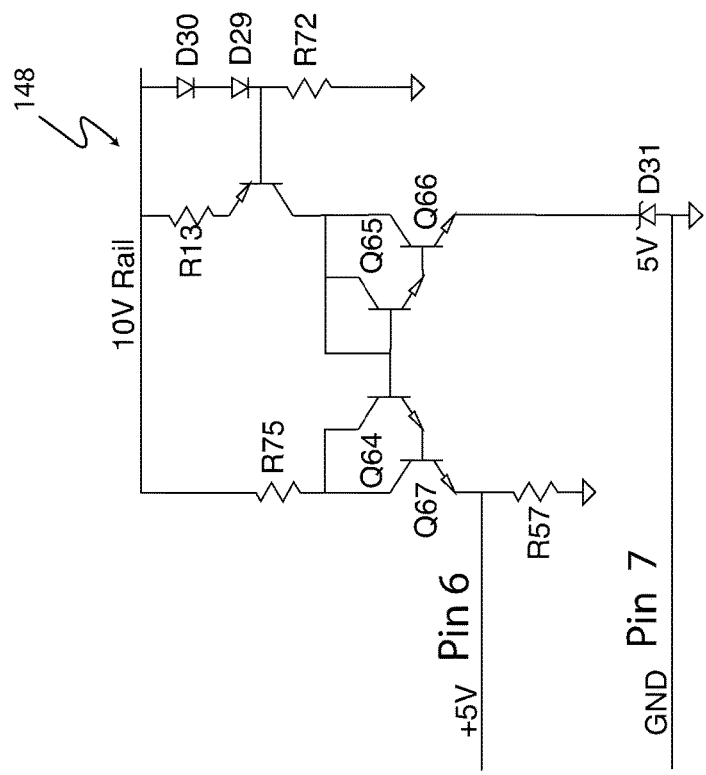
FIG. 26 depicts the +5 V regulator circuit of the SIC.

+5 Volt Regulator 148 is shown in FIG. 26. The internally sourced +5V supply is based on a similar voltage-mirror configuration except Darlington transistor configurations are used instead of single transistors. This helps the +5V regulator operate over a wider range of load currents. Also due to the uncertain current draw placed on the +5V supply an unconditionally stable current limit mechanism is formed by R75 and the +10V internal supply. The supply has been optimised to provide between 4-40 mA to the modem and microprocessor circuits within +/−3 mV regulation.

Figure 27:
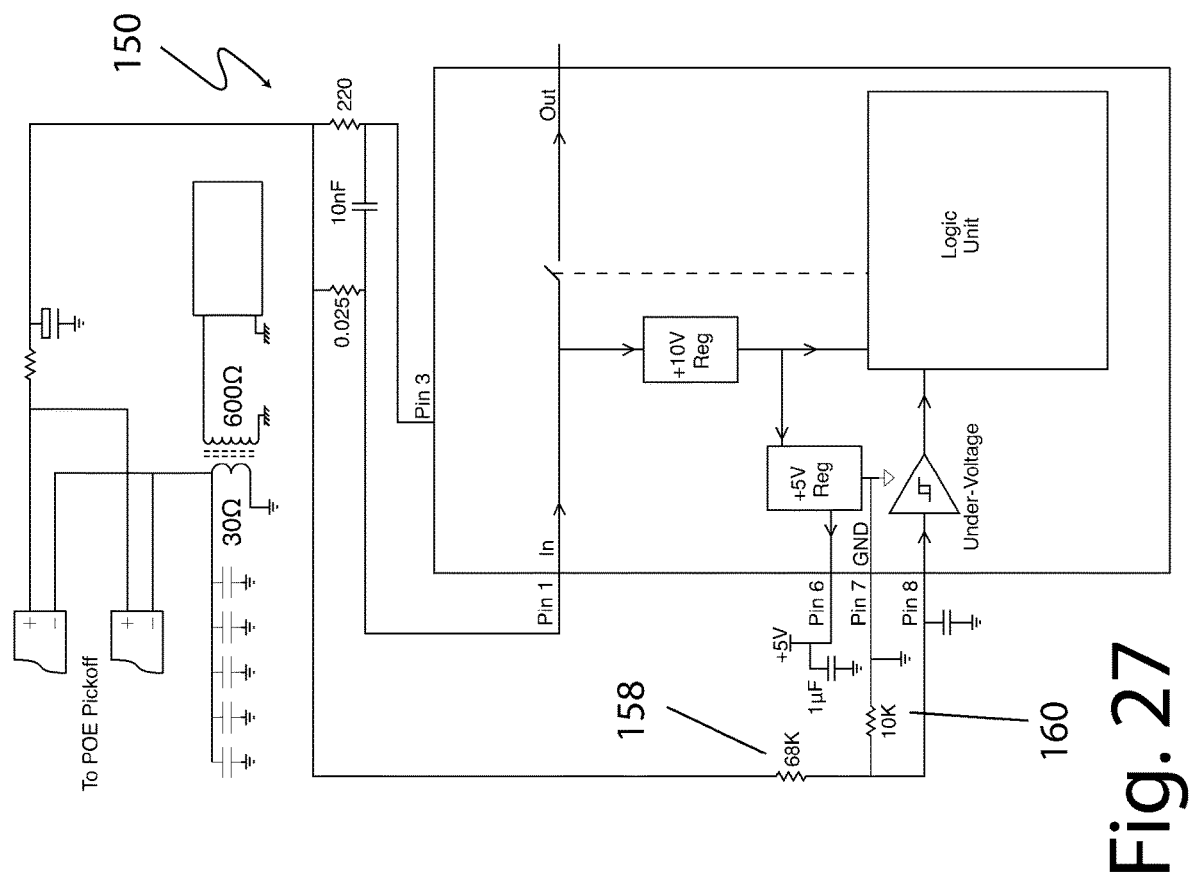
FIG. 27 depicts the under voltage detection circuit of the SIC.

Under-Voltage Detect 150 is shown in FIG. 27. To help identify high resistance Ethernet cables or joints and avoid undue stress to system components an Under-Voltage detection system is employed. The reference voltage for the undervoltage is an internally generated +5V. The lower-acceptable voltage threshold (Vmin) can be programmed using the potential divider formed by 68 k resistor 158 and 10 k resistor 160 that are connected to Pin 8. Using the familiar equation, the minimum voltage can be determined:

$$Vmin = \frac{5V \times (10k + 68k)}{10k} = 39 \ VDC$$

Figure 28:
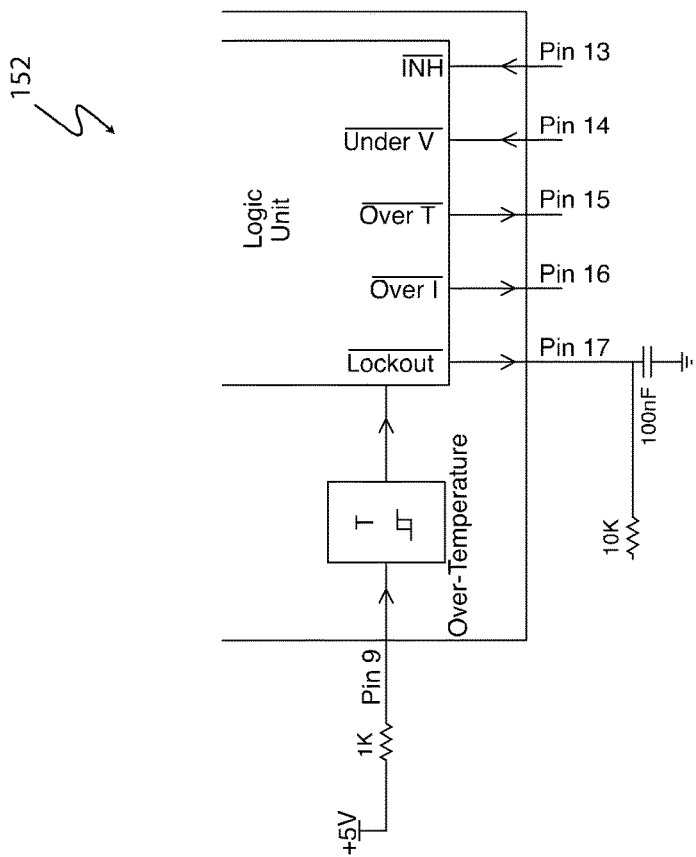
FIG. 28 depicts the over temperature detection circuit of the SIC.

Over-Temperature Detect 152 is shown in FIG. 28. To help ensure that the appliance does not suffer from thermal stress a temperature measurement and thresholding circuit has been employed. IC die temperature detection is achieved by measuring the forward voltage drop of a string of diodes. Setting Pin 9 to 5V gives a maximum operating temperature of 80 deg C. The source resistance sets the hysteresis of the temperature detection circuit. A source resistor of 1K represent approximately 10 degrees of hysteresis. In other words, this configuration will flag an Over-Temperature event at around 80 Deg Celsius and it will release the over-temperature flag if the die temperature drops below 70 Deg C.

Figure 29:
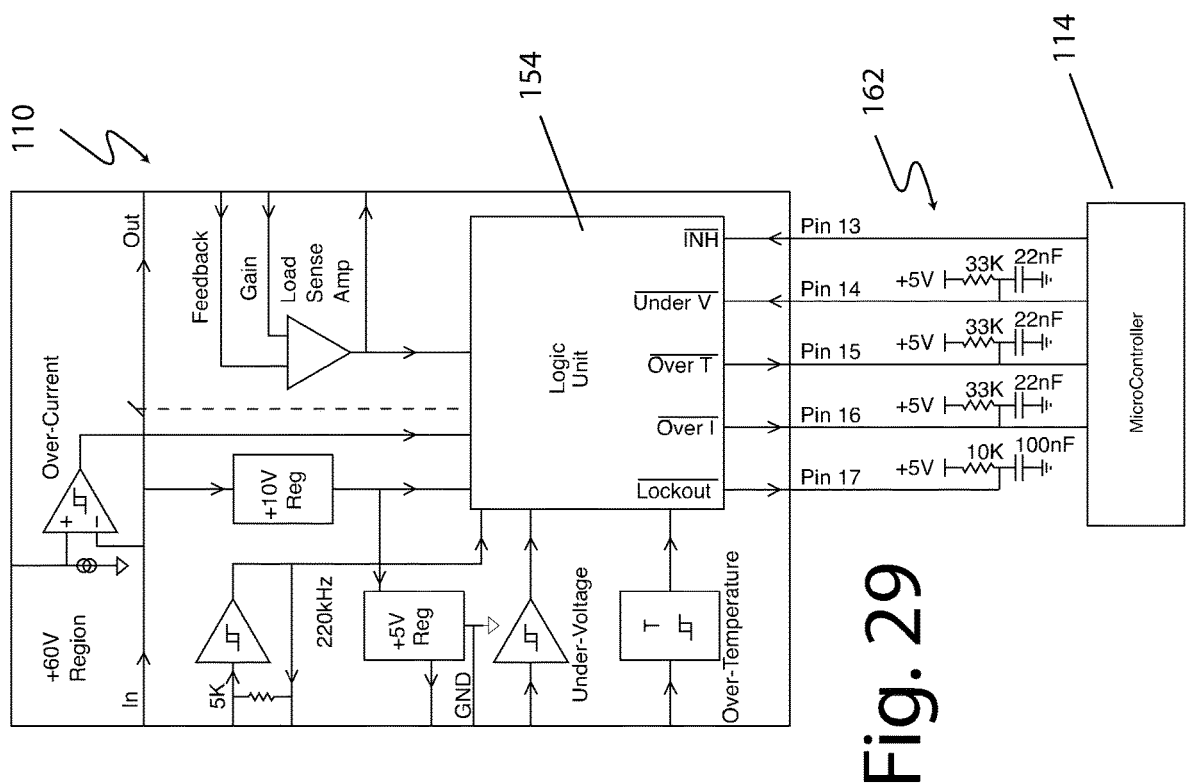
FIG. 29 depicts the logic unit of the SIC and its interface to a microcontroller.

Logic Unit 154 is shown in FIG. 29. This the heart of the SIC 110 and where almost half of the 75 transistors are dedicated. In all cases the presence of an Over-Temperature event or external Inhibit line being pulled low will disable the Series-Pass Switch. The Over-Current and Under-Voltage signal are treated a little differently in that both of these conditions are subject to a Lock-Out Delay so that if either of these conditions are triggered during the Lock-Out Delay they will not cause a Series-Switch isolation.

To help describe the logic unit operation the following logic statements should prove helpful:

IsolateSwitch=(INH & Over-Temp)+Lock-Out & (Over-Current & Under-Voltage)

If there is an under-voltage or over-current event the Lock-out timer Pin (17) will drive the pin low via an internal Open-Collector transistor within the SIC 110. This re-initiates the soft-start circuitry allowing the appliance to have another attempt at joining the PoE circuit.

The MicroController/Microprocessor Interface 162 is implemented with logic levels that suit both 5V and 3V Microprocessors. In the case of 3V Microprocessors an external 5V to 3V regulator is needed as shown in FIG. 29). The error flags (Over-Temp, Under-Voltage & Over-Current) should use 33 k pull-up resistors to the +3V regulator. The INH line is triggered if the voltage applied to that pin (Pin 13) falls below 2V (approximately) making this line of Supervisor IC 110 directly drivable from a 3V Microprocessor/Microcontroller 114.

The Logic Unit also interfaces with the 60V region of the Supervisor (the Series-Pass Switch and the Over-Current detect circuit 131 and performs all relevant signal level conversions.

Specific Embodiments of Supervisor Circuit

[is there any other text we want to provide to describe these next few diagrams—in particular any physical differences with FIG. 18 and FIG. 29.

Figure 31:
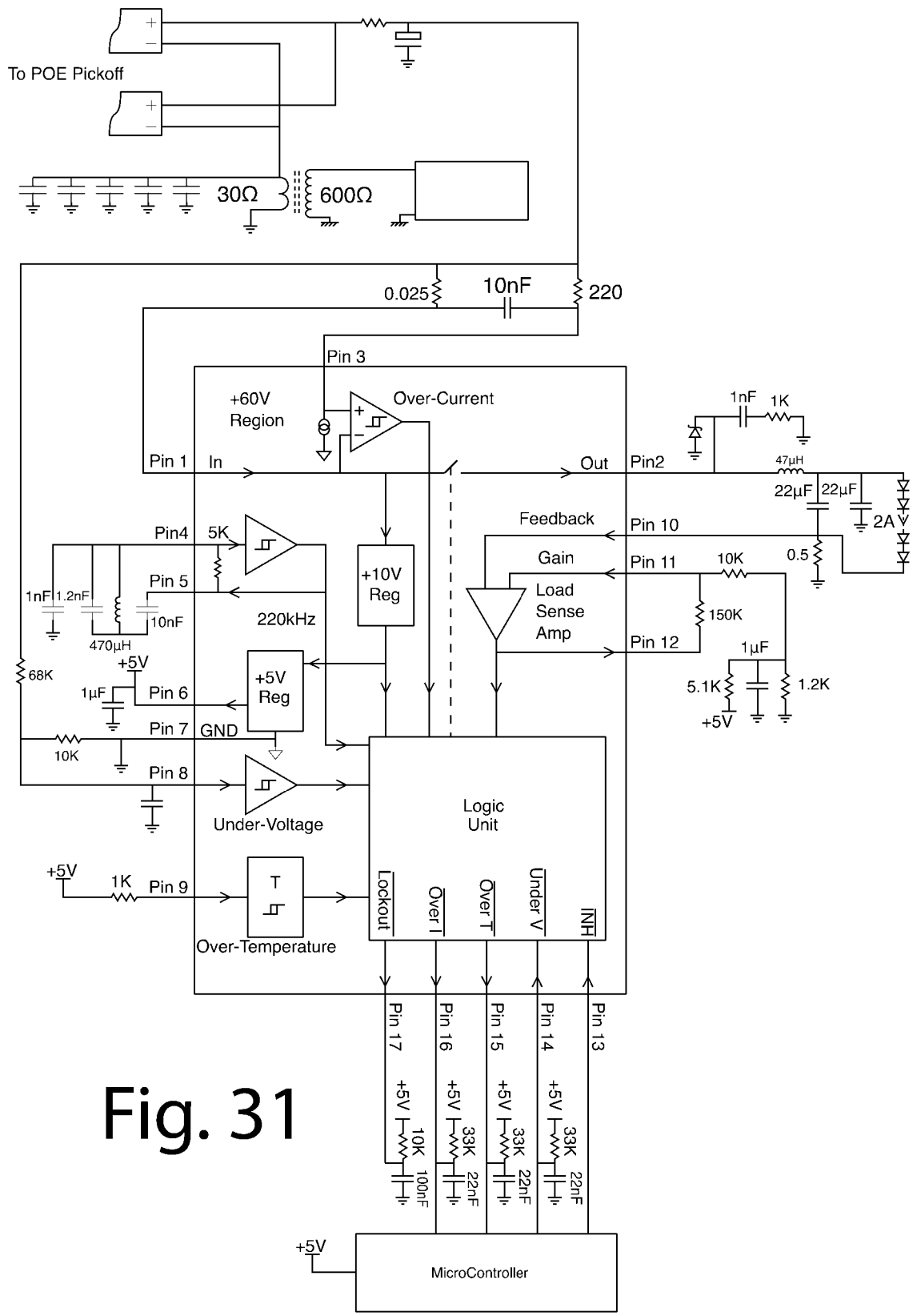
FIG. 31 depicts PoE Supervisor Integrated Circuit configured as Constant Current LED driver. In this example a 60 watt Constant-Current LED is driven directly from the Supervisor configured as a buck regulator under Microprocessor/Microcontroller control.

FIG. 31 shows the PoE Supervisor Integrated Circuit configured as a high-current invertor isolator switch used in a PDU 24 to supply General Purpose AC Outlets providing 240V/120V power for consumption. This mode is enabled by holding the Gain pin (Pin 11) to the +5V (sourced from the Supervisor IC) and the feedback pin (Pin 10). The Lock-Out timer should be set to give an adequate time for the DC to AC inverters current time to settle to avoid false triggering of the of a Series-Pass Switch isolation.

Figure 32:
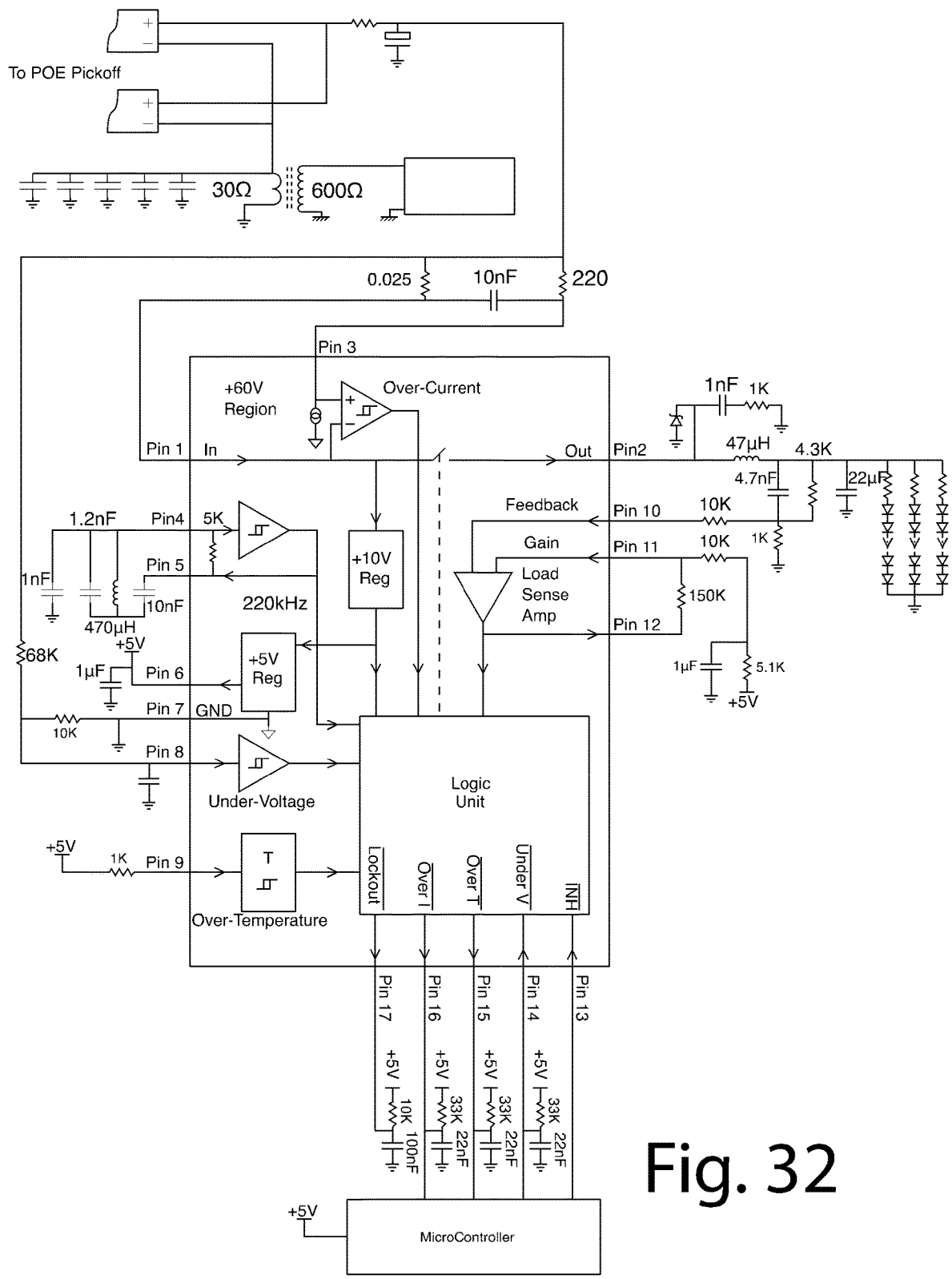
FIG. 32 depicts PoE Supervisor Integrated Circuit configured as Constant Voltage LED driver.

FIG. 32 shows a PoE Supervisor Integrated Circuit configured as a Constant Voltage LED driver with Soft-start and Delayed Turn-On implemented for use in LED lights 84. Features: If there is an under-voltage or over-current event the Lock-out timer Pin (17) will drive the pin low via an internal Open-Collector transistor within the SIC 110. This re-initiates the soft-start circuitry allowing the appliance to have another attempt at joining the PoE circuit.

Figure 33:
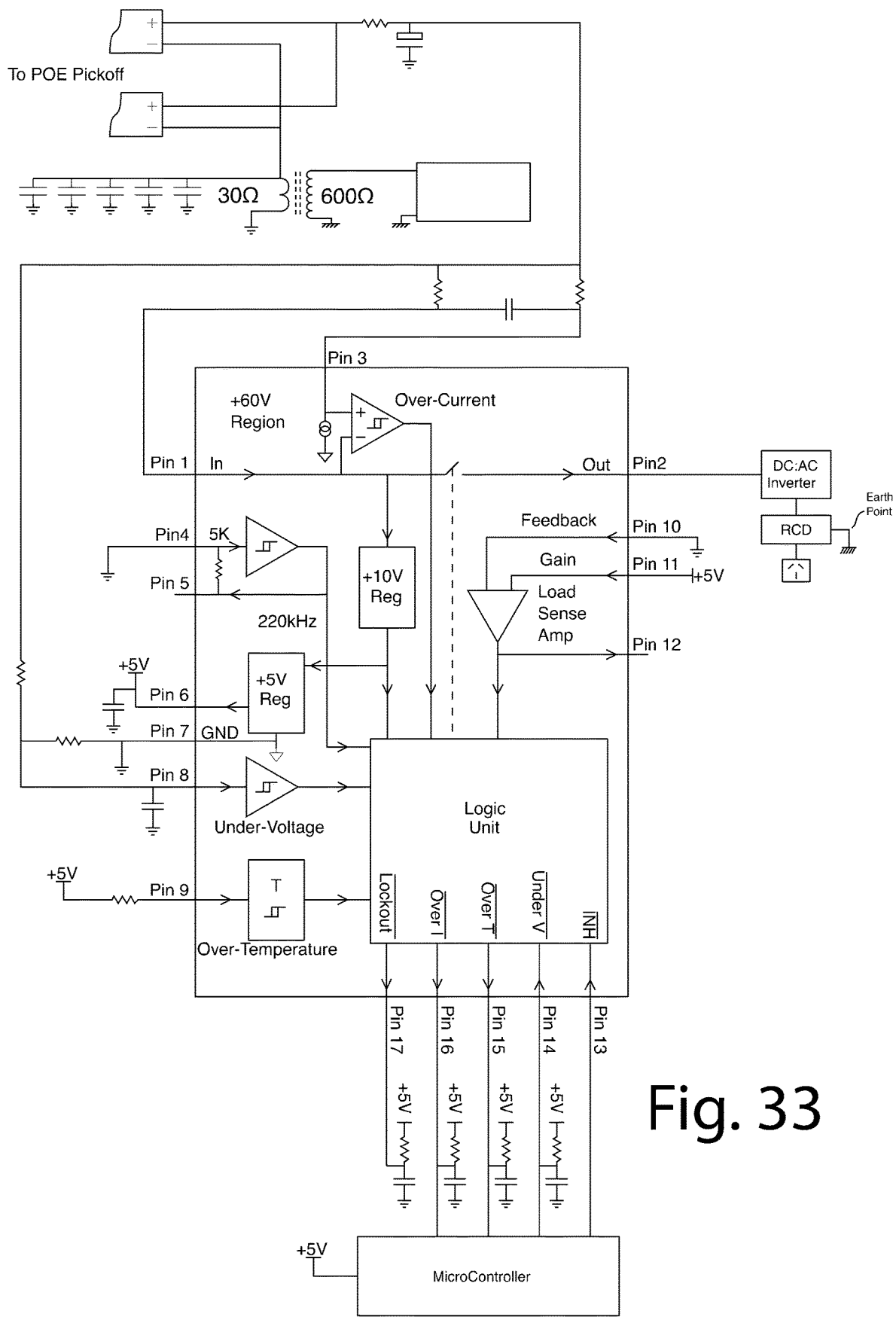
FIG. 33 depicts PoE Supervisor Integrated Circuit configured as a high-current invertor isolator switch used to supply General Purpose Outlets.

FIG. 33 shows the PoE Supervisor Integrated Circuit configured as a high-current invertor isolator switch used in a PDU 24 to supply General Purpose Outlets with 240V/120V AC power. This mode is enabled by holding the Gain pin (Pin 11) to the +5V (sourced from the Supervisor IC) and the feedback pin (Pin 10). The Lock-Out timer should be set to give an adequate time for the DC to AC inverters current time to settle to avoid false triggering of the Series-Pass Switch isolation circuit.

Figure 34:
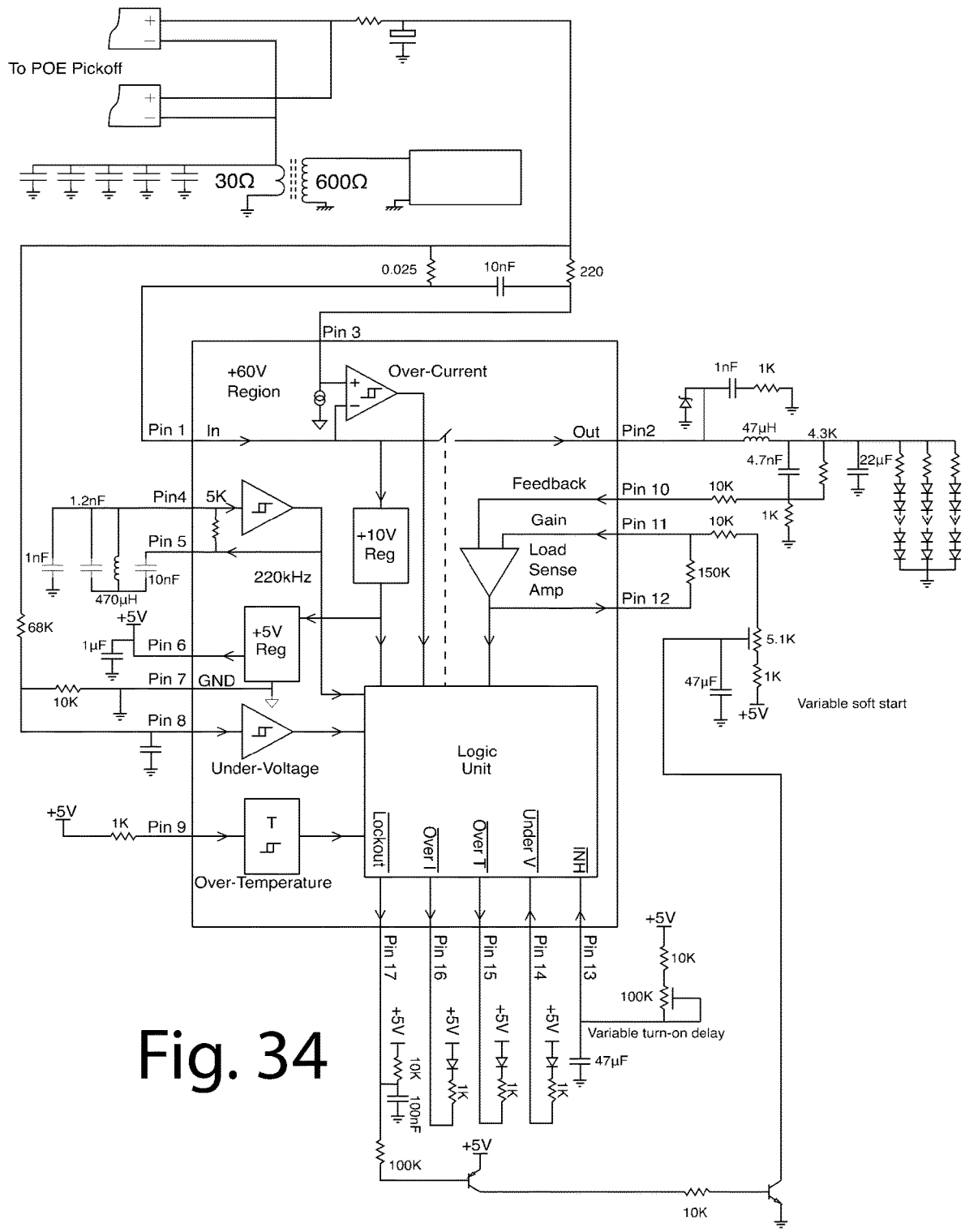
FIG. 34 depicts PoE Supervisor Integrated Circuit configured as a Constant Voltage LED driver with Soft-start and Delayed Turn-On implemented for low-cost emergency lighting environment without connection to a microcontroller.

FIG. 34 shows the PoE Supervisor Integrated Circuit configured as a Constant Voltage LED driver with Soft-start and Delayed Turn-On implemented for low-cost emergency lighting environment. If there is an under-voltage or over-current event the Lock-out timer Pin (17) will drive the pin low via an internal Open-Collector transistor within the IC. This re-initiates the soft-start circuitry allowing the appliance to have another attempt at joining the PoE circuit.

PSE, PDU and PD Appliances

Now that the hardware for communicating between PSE 10, PDU 24 and PD 26 devices has been described, attention turns to the appliances that the aforementioned circuitry is contained within. Reference is now made to FIGS. 35 to 60 which include schematic depictions of the PSE 10, PDU 24 and PD 26 devices. The following designations are used to refer to the individual components of the PSE and PDUs described herein.

Block 114 Microcontroller; is the heart of the system. It controls all the peripheral device but also communicates to the PSE, via common-mode signalling.

Block 164—Status display; implemented as an LCD, LED or OLED display.

Block 168—Keypad; The LCD interface is navigated through the keypad.

Block 88—PIR Sensor; to detect occupancy of the particular work space to assist in power management.

Block 165—Longitudinal signal pick off transformer this extracts the modulation of the DC PoE rails.

Block 112—Longitudinal modem; This converts the modulated PoE rail signal back into digital data.

Block 110—Supervisor Circuit; This monitors the DC operating conditions of the PDU link. If there is excessive current is drawn or the PoE voltage level is too low it is a requirement to isolate the PDU from any heavy current draw condition. The supervisor must include an isolation switch but should also provide a low current draw supply to the Modem and Microcontroller so that in the event of excessive current or insufficient voltage or over temperature, the PDU can report line condition status to the PSE via the Longitudinal Modem.

Block 168—Bridge Rectifier(s); The schematic depictions only shows one bridge rectifier where typically two would exist. Earlier versions of 802.3 only supported two pairs of data bearers, however, all modern Ethernet implementations include 4 data bearers which gives twice the current (beyond any advanced in conductor weight).

Block 120—Ethernet Pick-Off Inductors; The schematic shows only 2 inductors where modern Ethernet implementations include 4 sets of pick up inductors. These inductors provide very little insertion loss for the differential bearers, however, also provide very low resistance to the DC voltage (typically 57 volts or less) PoE supply.

Block 167—Pickoff Transformer-used in PSE 10 instead of Ethernet Pick Off Inductors 120.

Block 105—Ethernet Port Connector; linking PDU with PSE.

Block 106—Ethernet Port Connector; linking PDU with laptop or Wireless Access Point (WAP).

Block 116—DC:AC Converter; Fed from the DC Bus 169, proving power to GPO 117 via Residual Current Device 170.

Block 121—Residual Current Device 170; Is a circuit breaker that trips on around 3 Amps AC @230V (rms) or 6 Amps @ 115V AC (rms). If there is a current imbalance of greater than 30 mA (rms) between Active and Neutral indicating a possible electrocution risk to the residual device will isolate the circuit breaker.

Block 117—General Purpose Outlet; The general purpose outlet is designed to provide appliances with a either 230V or 115V (rms). The earth connector on this GPO is connected to a secure MEN earth point 173.

Block 172—LED DC Lighting Driver; This DC:DC converter links the DC bus 169 to either Constant Voltage DC power (CV) 103 or Constant Current DC power (CC) 119 LED lighting.

Block 101—LEDs for illumination.

Block 176—USB to HDMI A/V Video Adapter for generating audio video signals for output via HDMI port 180 (or for whatever display technology is desired (displayport, thunderbolt, DVI etc.). Can be used to receive video and other signals over USB C Port 178 from a connected PC so that the display can be extended over an external display connected to the HDMI port 180.

Block 178—USB C 3.1 Port/s; which can be used as a simple charger and/or a full data transfer connection and full USB PD capabilities. Also includes plurality of USB ports including type A/B that can then function as a USB hub for a PC.

Block 180—HDMI Port; is used to pass video data to a monitor from the USB port 178.

Block 182—USB charge manager; provides USB PD charging.

Block 184—Battery Management Unit; This block controls the charge of various storage batteries. Although focused on Lithium-Ion batteries, Lithium Polymer or Sealed Lead Acid batteries can be supported.

Block 186—Storage Battery; Either Lithium-Ion batteries, Lithium Polymer or Sealed Lead Acid. May be internal or external.

Block 188—Stereo Receiver; This block is a digitally controlled stereo receiver that supports Digital Audio B (DAB) broadcast, Amplitude Modulated (AM) broadcast, Frequency Modulated (FM) broadcast, as well as USB music retrieval via the data-stream provided between the USB adaptor 176 and USB Port 178. This receiver includes an internal power amplifier capable of providing high-fidelity stereo audio to loudspeakers 171.

Block 171; Stereo Loud Speakers which are integrated into the enclosure. Alternatively, they can be located externally to the enclosure as satellite speakers.

Block 172—Multi-band Radio Antenna; This may be an external antenna if the PDU enclosure is mainly metal or internal if the enclosure is mainly plastic.

Block 173—MEN Earth.

Block 174—Variable DC outlet.

Block 175—Wi-fi Module.

Block 177—Network Expansion/Interface for example a PCIe slot.

Block 181—Lighting Controller Input.

Block 183—POE enabled ethernet ports.

Figure 35:
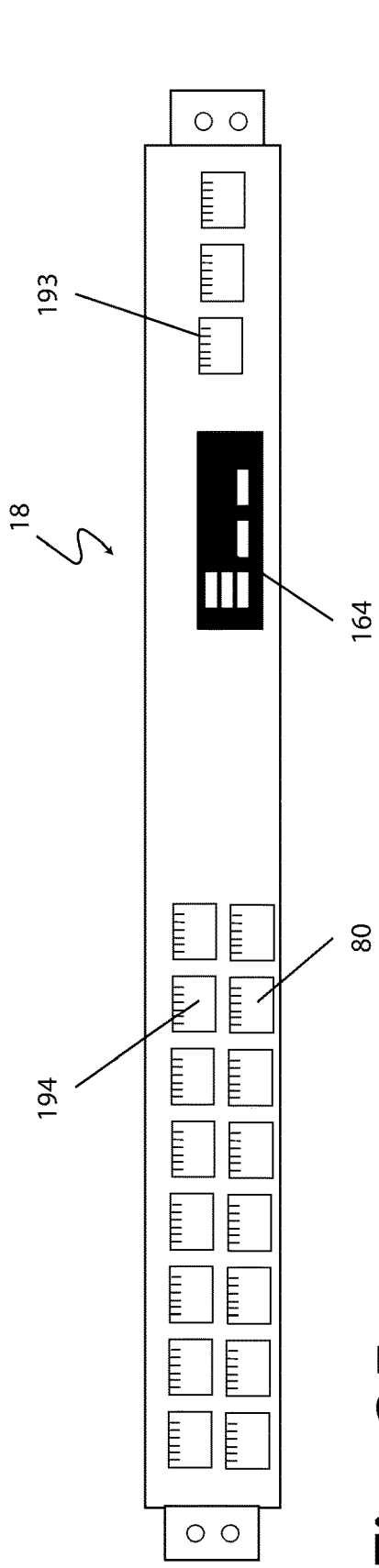
FIG. 35 depicts a PSE device.
Figure 36:
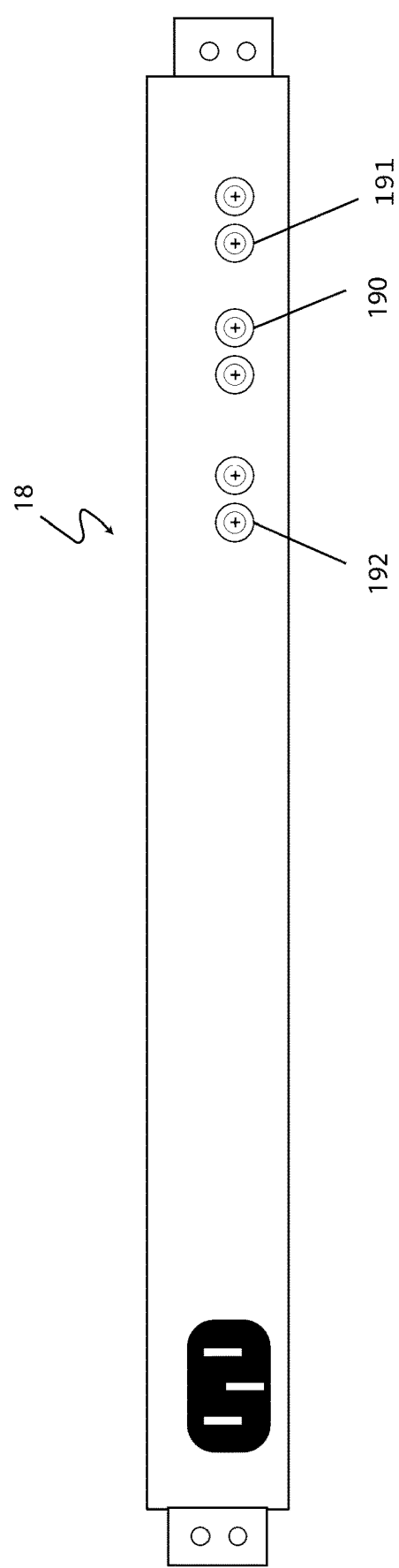
FIG. 36 depicts the rear of the PSE device of FIG. 35.
Figure 37:
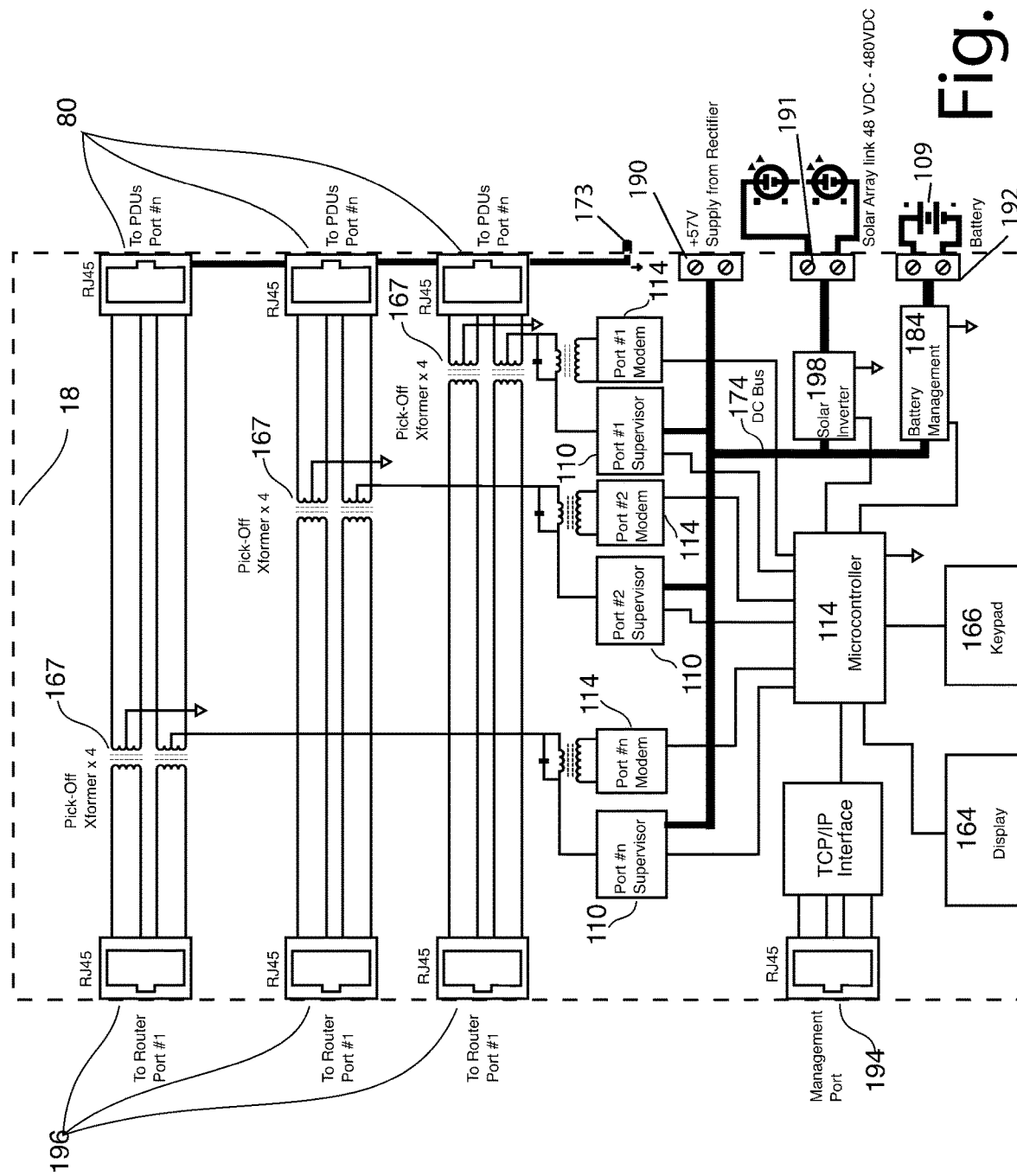
FIG. 37 depicts a schematic diagram of the components of the device shown in FIGS. 35 and 36.

Mid Span PSE—Reference is now had to FIGS. 35 to 37 which depict mid span 18 forming part of PSE 10. Mid span 18 occupies 1 rack unit of height in the server cabinet 54. Mid span 18 provides between 1600 W-2400 W across 8 MiPOE powered RJ-45 ports 80. Data signals received on RJ-45 ports 193 are combined with DC power supplied to the mid span 18.

Mid Span 18 receives DC power from a DC power bank via DC inputs 190. Alternatively DC power from other sources including solar, wind, other renewable sources including storage sources can be introduced via DC inputs 191 and DC-DC inverter 198. Power from an uninterruptable power supply 109 can be supplied via DC inputs 192.

Between 200 W and 300 W can be delivered per POE connection when utilising Cat 5a-6+ ethernet cable. Mid span 16 has an LCD screen 164 for displaying relevant information including loads and data speeds. Mid span 18 also features a management port 194 for directly communicating with the controller 114 of the mid-span 16 which facilitates the communication between PSE 10 and management server 68 which control a plurality of PSEs 10.

Mid span 18, receives high speed high bandwidth ethernet connection over RJ-45 switch ports 196 and outputs the high powered MiPOE connections over RJ-45 ports 80 after the injection of the DC power and longitudinal signals by the pickoff transformer 167. Signalling to connected MiPOE PD and PDU devices 74 is achieved through the plurality of modems 114, one of each is associated with each MiPOE port 80. Mid Span 18 also has a plurality of PSE supervisors 200 for monitoring the current and isolate the circuit if it's too high for too long.

LED Luminaire 84

Figures 38, 39A, 39B:
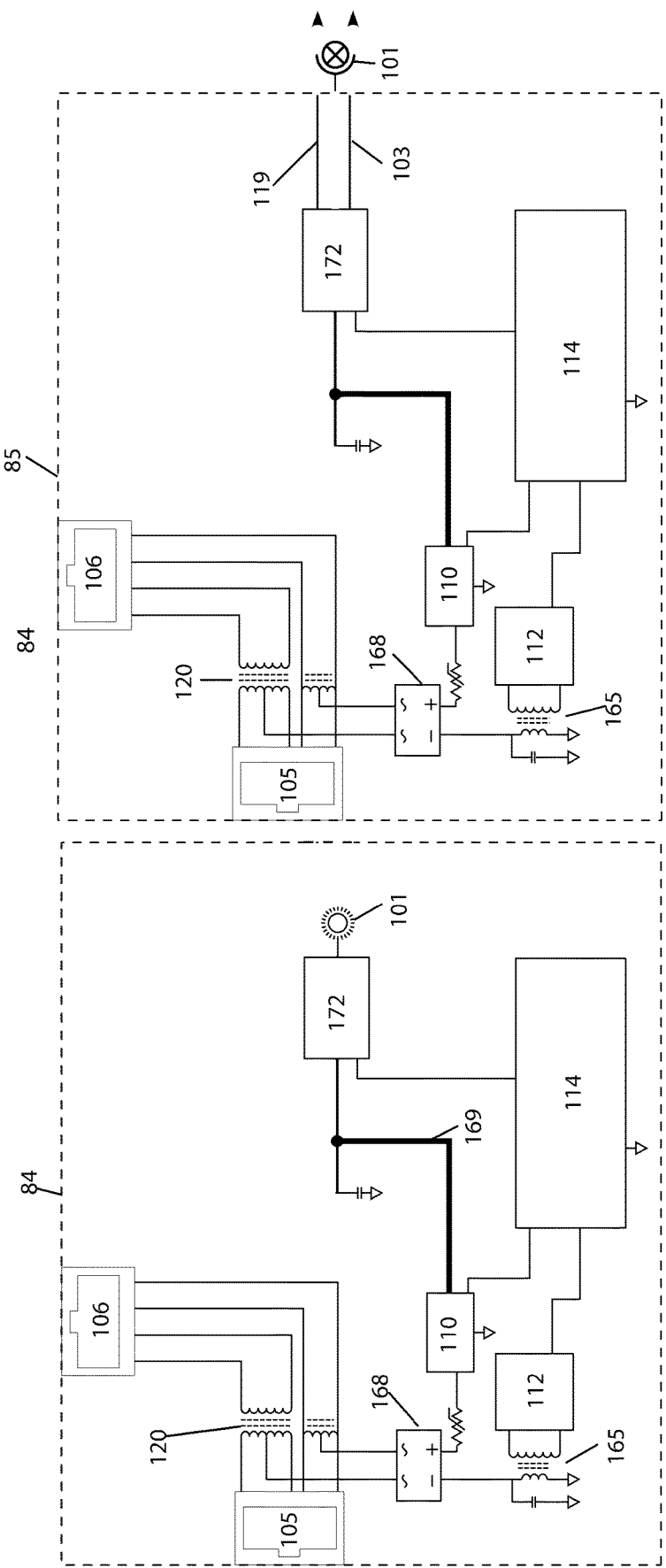
FIG. 38 depicts a LED luminaire PD of the present invention that is able to be daisychained on an ethernet cable and be controlled via the supervisor circuit without recourse to conventional PoE.
FIG. 39A depicts a schematic diagram of the components of the device shown in FIG. 38.

FIG. 38 depicts lighting PD or LED luminaire 84. LED luminaire 84 has two RJ-45 ports which may be weatherproof and through which power is directed as shown in FIG. 15. The LED 84 is shown in schematic form in FIG. 39A where the device incorporates banks of LEDs 101. LEDs 101 provide the illumination that the LED luminaires 84 provide. LED luminaires 84 are adapted to be connected by way of daisychaining one LED 84 to another in series using the RJ-45 ports 105 and 106. Strings of LED luminaires 84 can be created and thereafter controlled by a lighting control panel 86. The schematic shown in FIG. 39B is a alternate embodiment of LED Luminaire 86 in which the driver and electronics associated with the MiPOE connection including the common mode signalling modem and microcontroller are housed in a separate housing to the actual LED banks 101 and where the housing has outlets 119 for constant current LEDs to be connected and/or outlets 103 for constant voltage LEDs to be connected. As such the LED driving device 85 acts as an external driver for bare LEDs. In either embodiments the connected LEDs or embedded LED 101 can be controlled via common mode signalling along the MiPOE connection delivered over ethernet. Such commands may include dimming, colour and temperature control and other conventional commands used with LED lights.

Lighting Control Panel 86 and PIR 88

Figure 41:
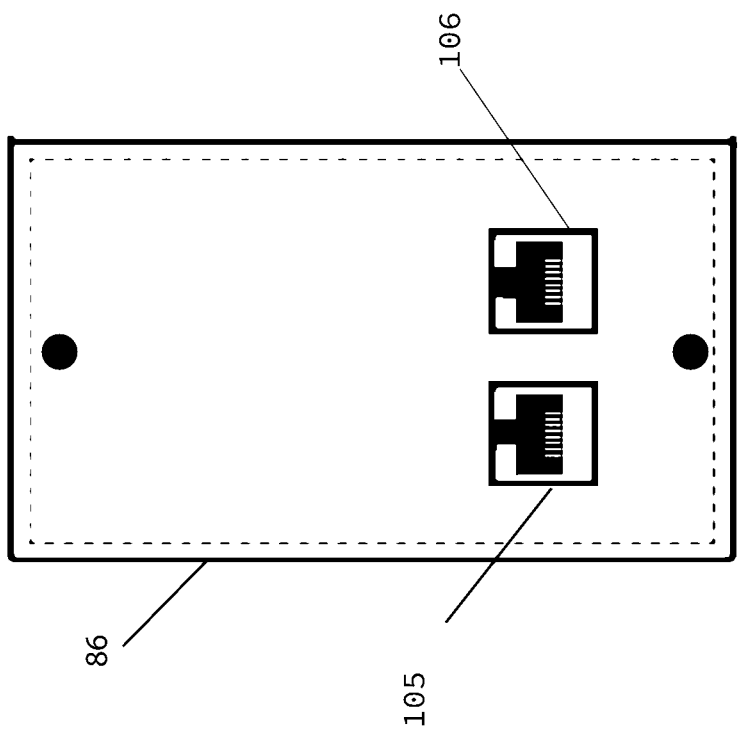
FIG. 41 shows the rear of a control panel PD.
Figure 40:
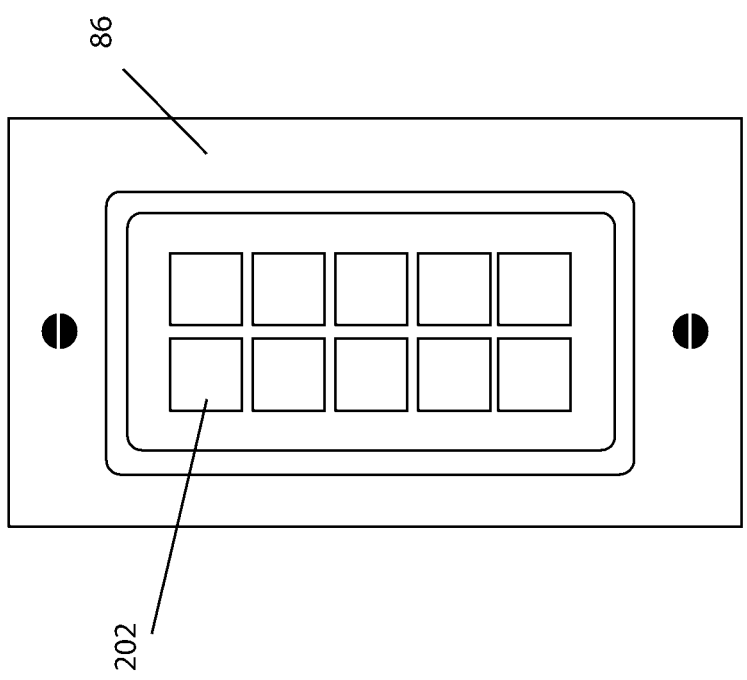
FIG. 40 shows the front of a control panel PD.

FIGS. 40 to 42 depict a lighting control panel in accordance with a first embodiment. The control panel 86 takes inputs through buttons 202, etc. and converts them to signals which are communicated to the PSE 10 and other devices connected on the MiPOE connection 80, including through other PD and PDU devices 74. Such signals include directions to operate lights or dim them or change their colours or set timers for their operation. The control panel may operate lights or they may operate any MiPOE Powered PD or PDU devices 74 on MiPOE connection 80 (or which is connected in some way to PSE 10). In other embodiments control panel may comprise a touch video screen or other methods of obtaining user input including cameras and other sensors.

Indeed such a device may forgo user inputs and in other embodiments, may be sensor only. In which case the sensor is powered by the MiPOE connection and where the data accumulated by the sensor is conveyed via common mode signalling back to other parts of the MiPOE connected network and networks it connects to. For instance, PIR 88 may be provided in such a manner (not shown). PIR 88 may work with LED Luminaires 84 such that the LEDs 84 only illuminate when the PIR 88 senses occupancy. Alternatively sensed data can be acted on locally by shutting down circuits or activating alarms etc.

Figure 43:
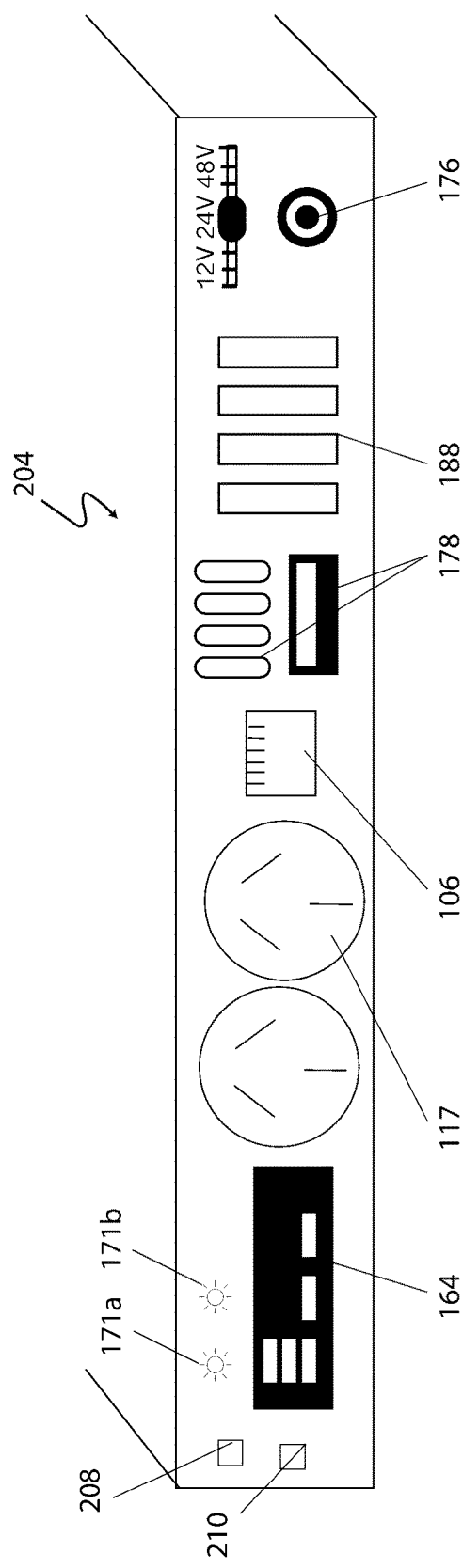
FIG. 43 shows a front view of a desktop hub PDU.
Figure 44:
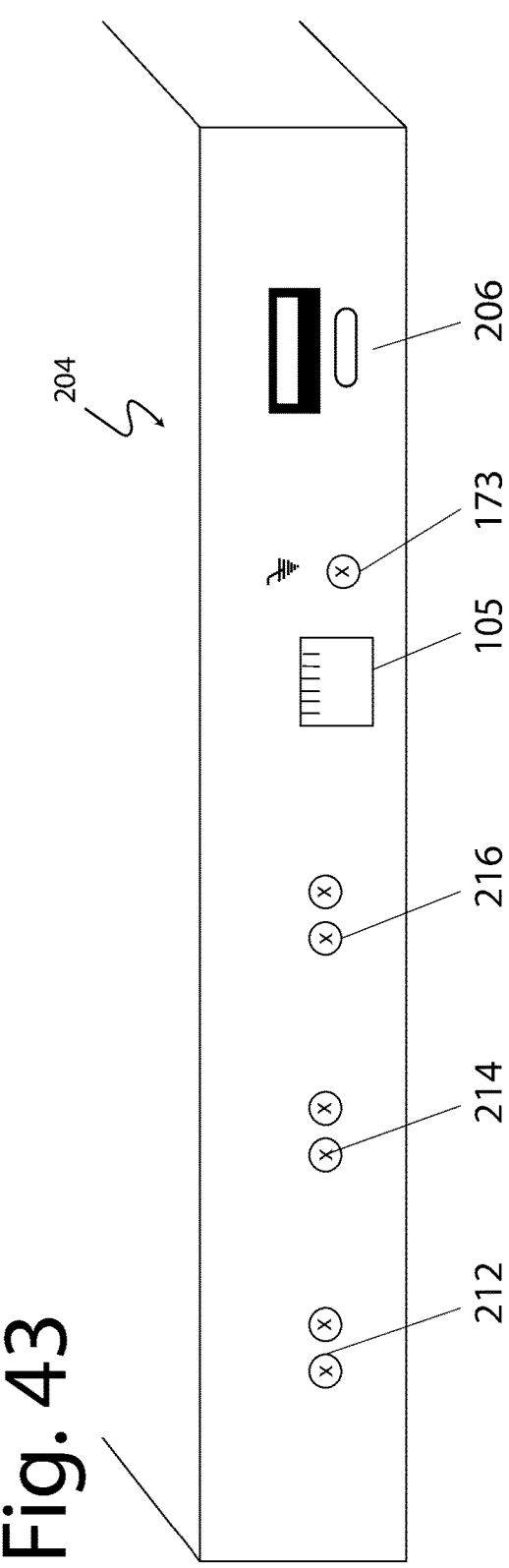
FIG. 44 shows the review view of the desktop hub PDU
Figure 45:
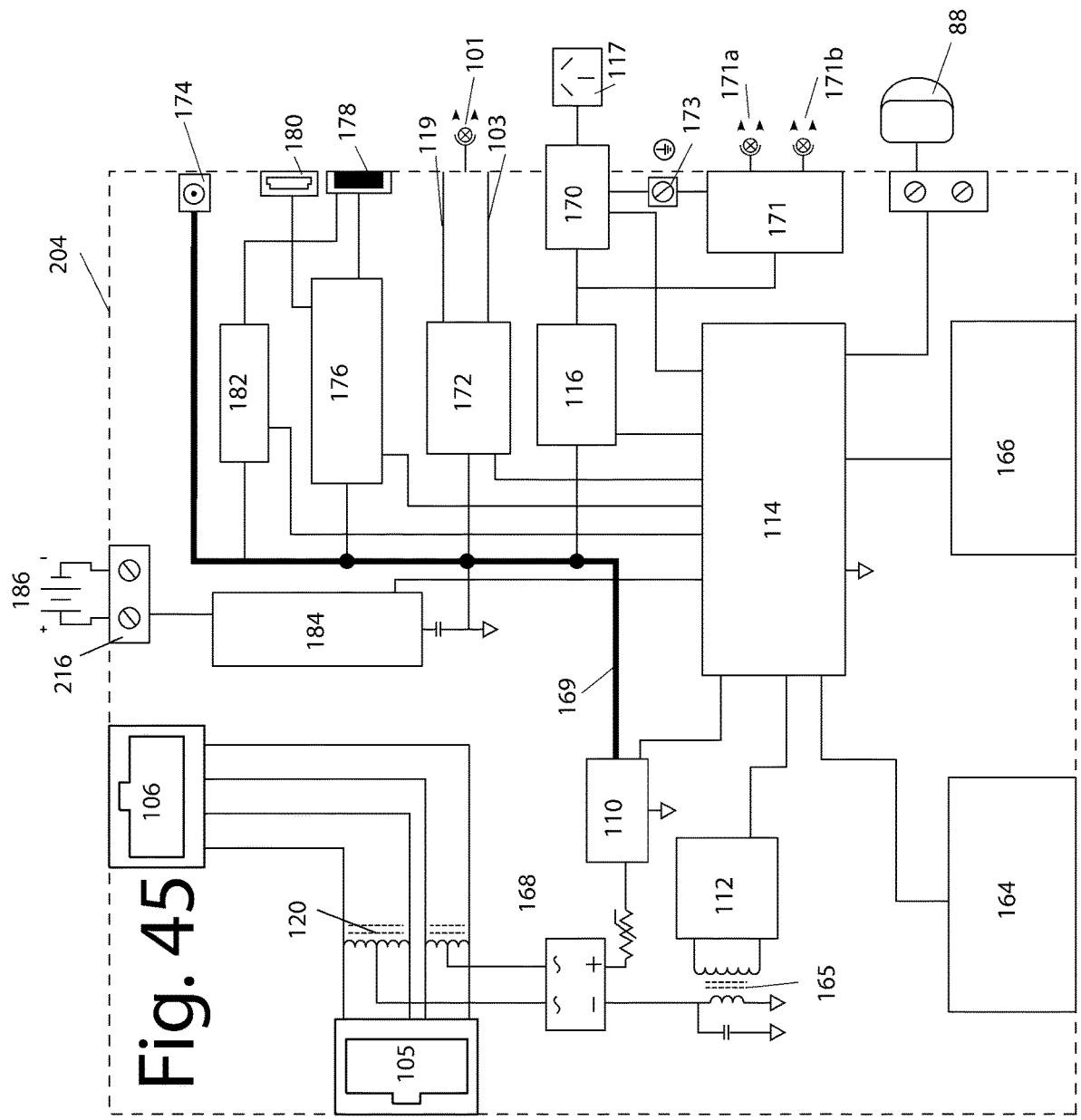
FIG. 45 depicts a schematic diagram of the components of the device shown in FIG. 43 and FIG. 44.

Docking Station/Hub 204 FIGS. 43 to 45 depict an embodiment of a PDU, namely a docking station 57 that has been incorporated into a hub type form factor which is adapted to meet the needs of an office worker in a work-pod. Docking station 204 has a MiPOE ethernet RJ-45 jack input 105 for receiving high powered MiPOE connection. In addition, the docking station 204 includes a second RJ-45 106 outputting high powered MiPOE connection (and high speed TCP/IP networking) for connecting other devices that device power off the DC power transmitted over the ethernet conductors 42.

As docking station 204 is a PDU which creates AC power for distribution from DC power, it is preferable that the AC power is distributed as safely as possible. This requires the provision of a ground or earth connection via ground connection point 117. The ground is used to provide a ground for use via PGO 117 and also by the RCD safety device 170. An example RCD device that is suitable for use in the present invention are the RCDs/circuit breakers made available from Schnieder Corporation. The ground can be provided from a PSE 10 over cable 34 which includes an earth conductor 38 for connection to earth point 173. Or ground may be provided by many other ways including a local connection to a grounded object or building element.

Docking station 204 does not have an internal battery but it does have battery terminal 216 for a battery 186 to be attached providing both UPS functionality as well as being able to provide uninterrupted power for short peaks over and above the continuous 200 W-300 W that can be drawn over each POE connection via port 105. The docking station 204 is a complete solution for office workers connecting a laptop or desktop PC to the docking station using a USB 3.1 connection over PC port 206 which is a USB C port. Once docked in this way, the connected PC will be able to use any USB devices connected to USB ports 178. In FIG. 43 only one USB A type port is shown but in other embodiment there are plurality of A and C USB ports including mini A and Micro A ports (not shown). The docking station 204 utilises a USB power manager 182 for powering connected devices over the USB Ports 178 (and PC port 206).

Display ports including HDMI ports 180 enable the device to be connected to external monitors whereby video derived from the connected PC is output to the HDMI ports via USB PC docking port 202 and USB to HDMI adaptor 176. The variable DC outlet 176 can be used to charge and power devices requiring DC power that have a proprietary plug that can be connected to the device via the standard DC outlet that can be adopted by manufacturers to enable the docking station 204 to power a bigger range of DC devices that do not yet utilise the USB PD via USB ports 178.

The docking station 204 also makes available a RJ-45 port 106 for providing network connectivity and the ability to daisychain further MiPOE PD or PDU devices 74 requiring power and communications over the common mode longitudinal signalling facilitated by the present invention. The RJ-45 106 can be connected to WAP or WIFI Mesh client or any other wireless networking adaptor or directly to a desktop PC. The docking station 204 also provides two AC outlets 117 for connecting devices that require AC power. The AC power is derived from DC power via an internal inverter 116.

User input can be provided by RCD reset button 208 and device reset button 210. The latter is equivalent to keypad 166 of the associated schematic in FIG. 45. LCD screen or display 164 shows information pertaining to the POE connection (for example the watts being drawn over the connection 80 and the power being drawn by the docking station 204 and connected devices). The docking station 204 is also adapted to receive from a PIR 88, signals that indicate whether the area in which the station is located is in use by a person. Absent the signal from the connected PIR 88 over the sensor input or PIR dry contact points 212, the docking station 204 will put itself in a sleep mode. Further, the docking station 204 also optionally provides DC LED outlets 214 for powering LED luminaires integrated into the work-pod that illuminates the user's workspace.

Figure 47:
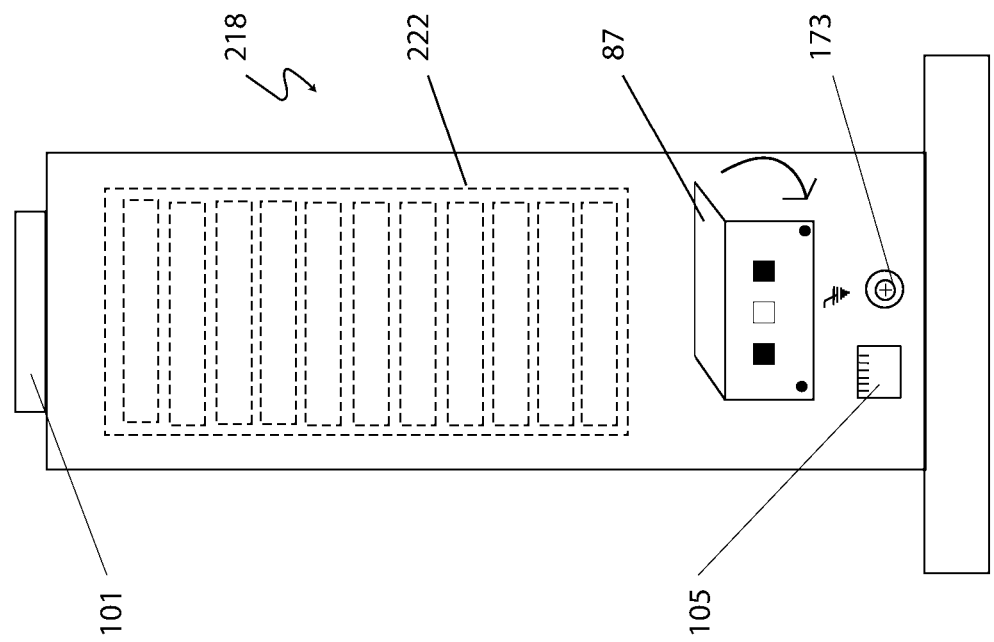
FIG. 47 shows the rear view of a tower charger.
Figure 46:
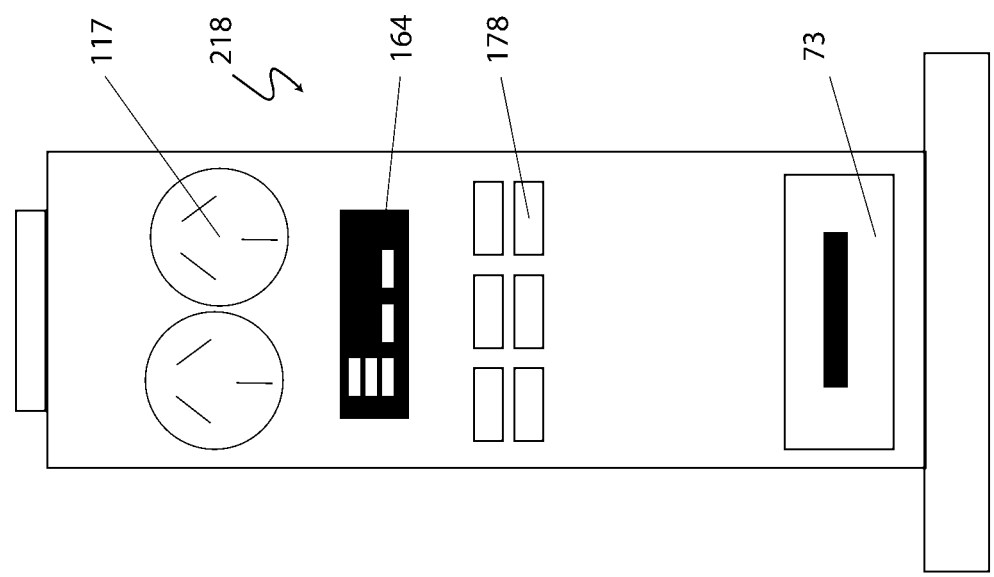
FIG. 46 shows a front view of a tower charger.
Figure 48:
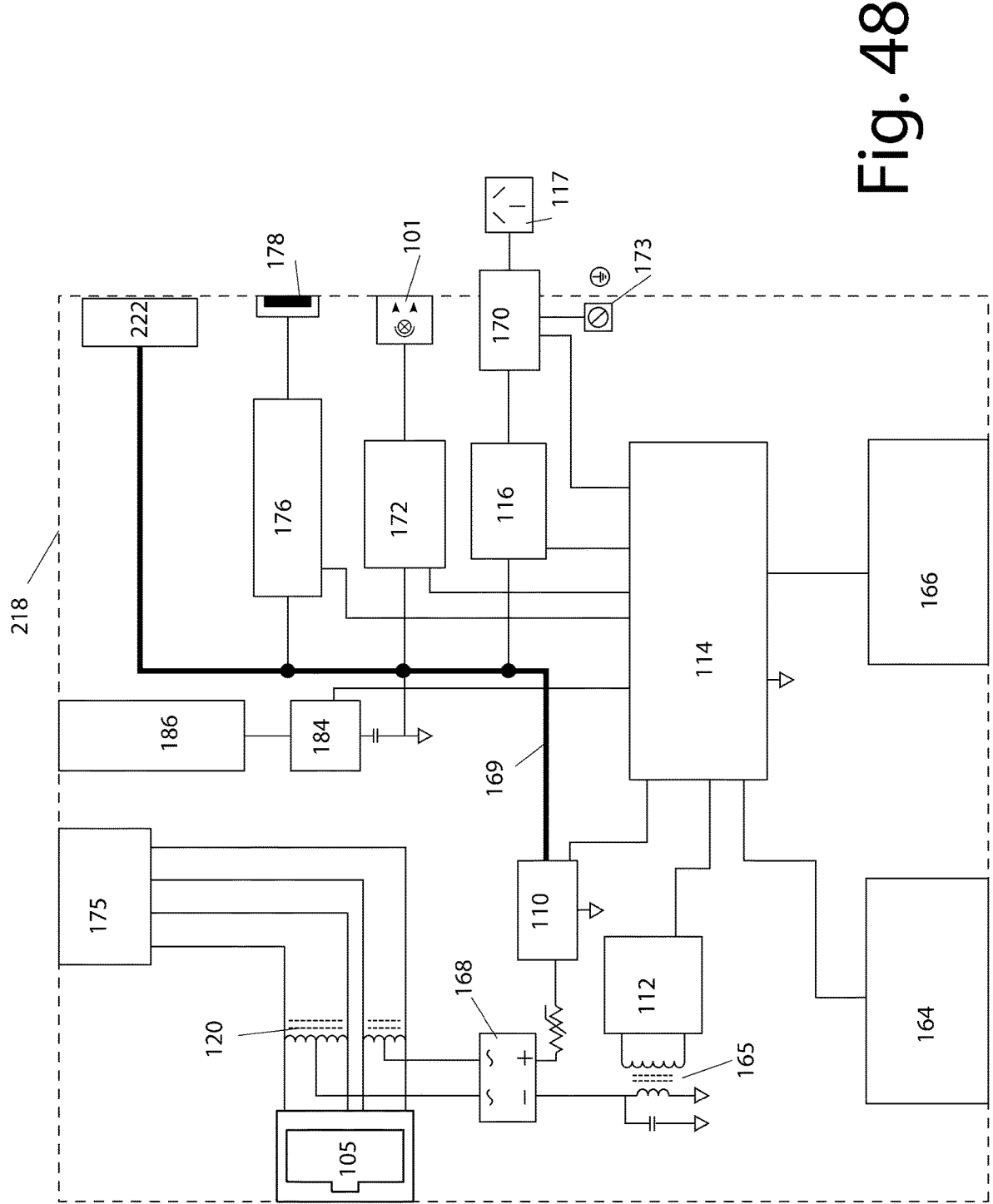
FIG. 48 depicts a schematic diagram of the components of the device shown in FIGS. 46 and 47.

Power Station Tower 218—Tower power station 218 is the PDU 24 shown in FIGS. 46 to 48. It is envisaged that the tower power station 218 would be used in high volume traffic areas such as lobbies or airports or weatherproof embodiments used on construction sites or mining sites. Like the docking station 204 the tower power station 218 is depicted having one high powered MiPOE RJ-45 input 105 and associated earth point 173. However, in other embodiments of the tower more MiPOE ports 105 could be added to receive additional 200 W-300 W from MiPOE 80 connections. Tower 218 has banks of USB ports 178 (including USB PD ports) and an LCD screen 167 for displaying the status of the built in WIFI, POE connection health, temperature, battery charge etc. Tower 218 also has RCD 208, WIFI and general reset buttons 210 under a securable cover or flap 220. It provides wireless networking capabilities including WIFI 175 which is provided by the internal WIFI module 175 which can create a network, extend a network or act as a mesh repeater for a WIFI mesh network. The tower power station 218 does differ from the docking station 204 by the inclusion of a battery 186 which allows the device to operate in the absence of power over incoming RJ45 port 105.

In construction, mining and other industrial applications the tower 204 may also optionally charge a plurality of removable batteries or devices in multi device dock 222. In an education environment the tower 218 could be adapted to connect to it a plurality of tablets for charging via USB ports 178 or via the multi device dock 222. The tower also has a LED light 101 such that the tower 218 can illuminate the area it is in, and also function as an emergency light in the event of power failure.

AC outlets 117 are also provided using the internal inverter 116. The battery 186 provides UPS capability as well as for maintaining peak 400 W of power supply to connected devices when the peak demand exceeds the continuous power received over the POE connection, being 200-300 W.

Figure 49:
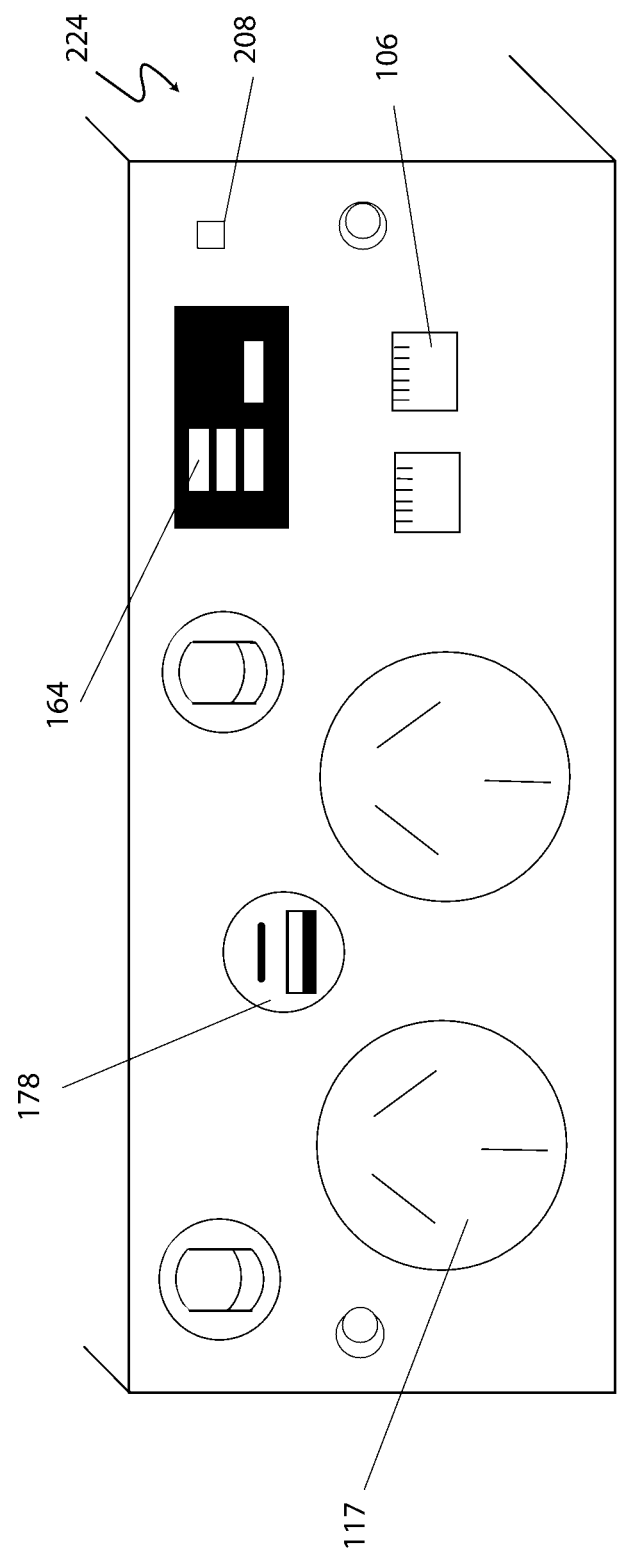
FIG. 49 shows a front view of a GPO PDU with networking capabilities.
Figure 50:
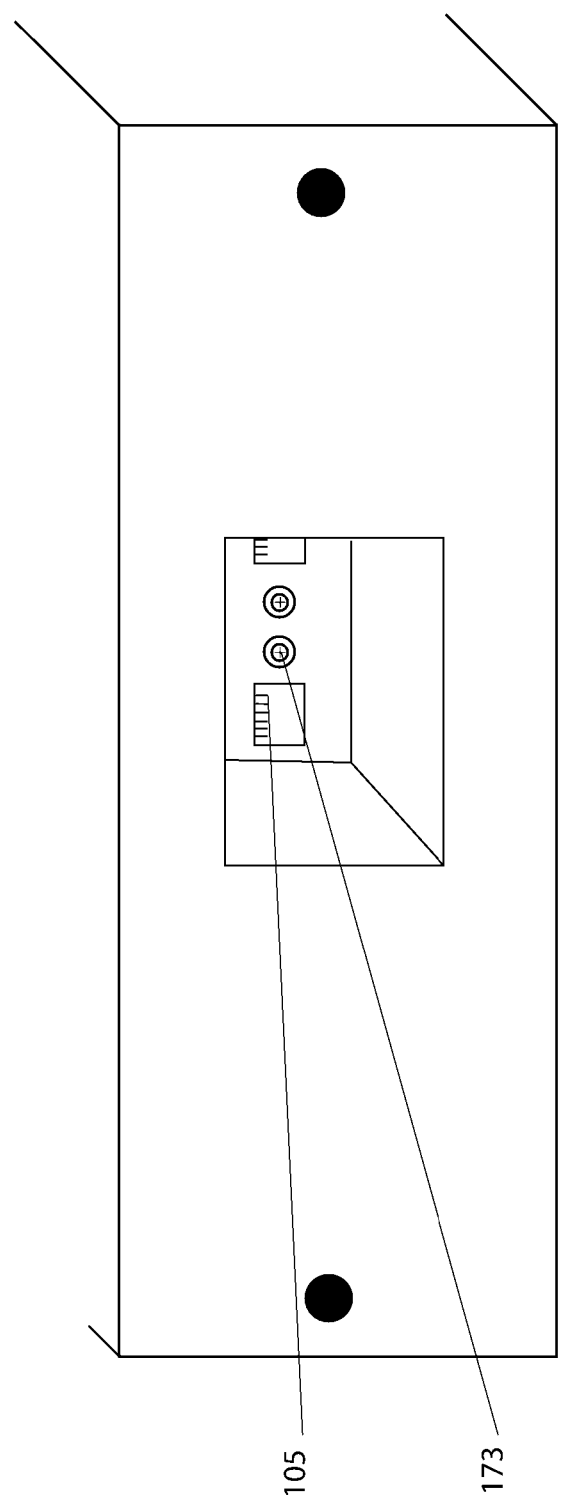
FIG. 50 shows the rear view of a GPO PDU with networking capabilities.

Wall Outlet GPO PDU 224 FIG. 49 depicts a wall outlet 224 which is dimensioned to be inserted into a wall cavity like a general power outlet. The wall outlet 224 has dimensions of 60 mm×60 mm×300 mm and is formed from a metal enclosure. It can receive two high powered DC MiPOE connections via RJ45 ports 105 and associated earth points 173. DC is split off and inverted and output over AC outlets 117. USB ports 178 are also provided for charging and powering purposes including a USB PD port. MiPOE ports 106 are provided on the front of the outlet. These can be used to connect networking devices (eg Router or WAP) or they can be used to provide power and communication to other MiPOE enabled PD and PDU devices 74.

Information is output over LCD screen 164 and the RCD safety cut off can be reset by actuating button 208. In other embodiments, ethernet networking signals may provide a computer network via ethernet ports 106 which is then communicated to the networking interface and any inserted networking adaptor such as a WIFI adaptor or WIFI mesh point for creating or extending a WIFI network so that remote devices can be connected to wirelessly.

Figure 53:
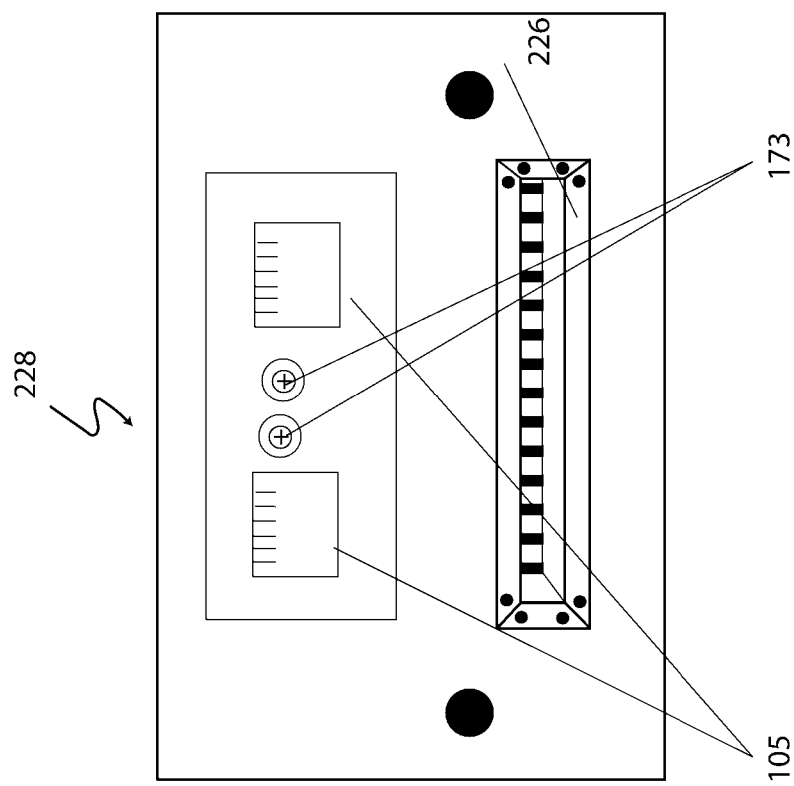
FIG. 53 depicts a rear view of a GPO PDU.
Figure 52:
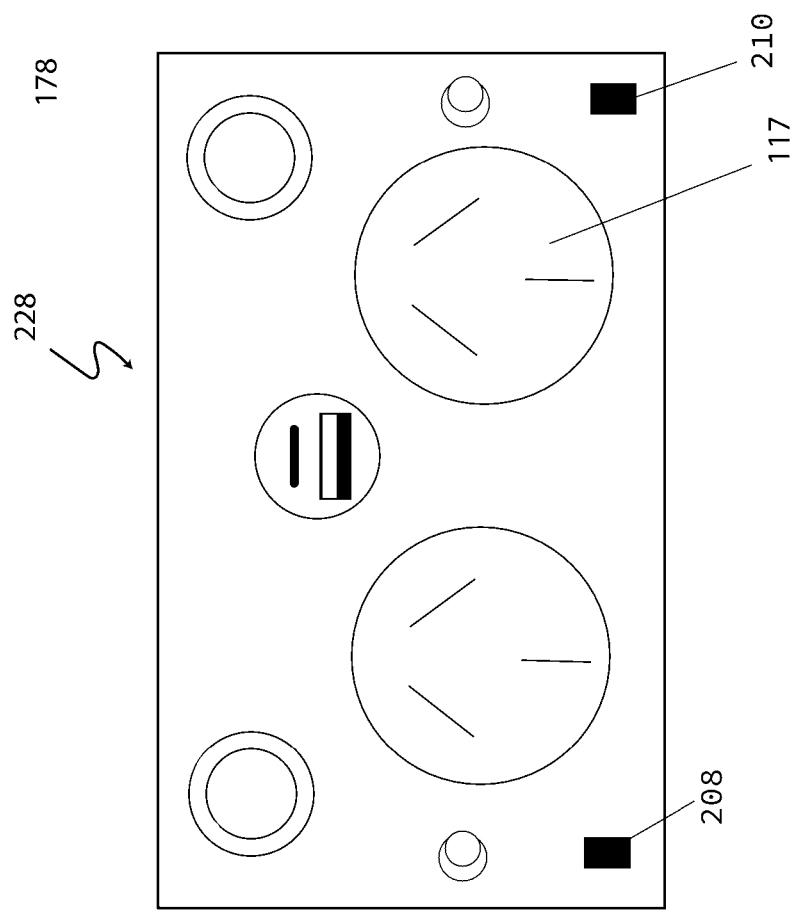
FIG. 52 depicts a front view of a GPO PDU.
Figure 54:
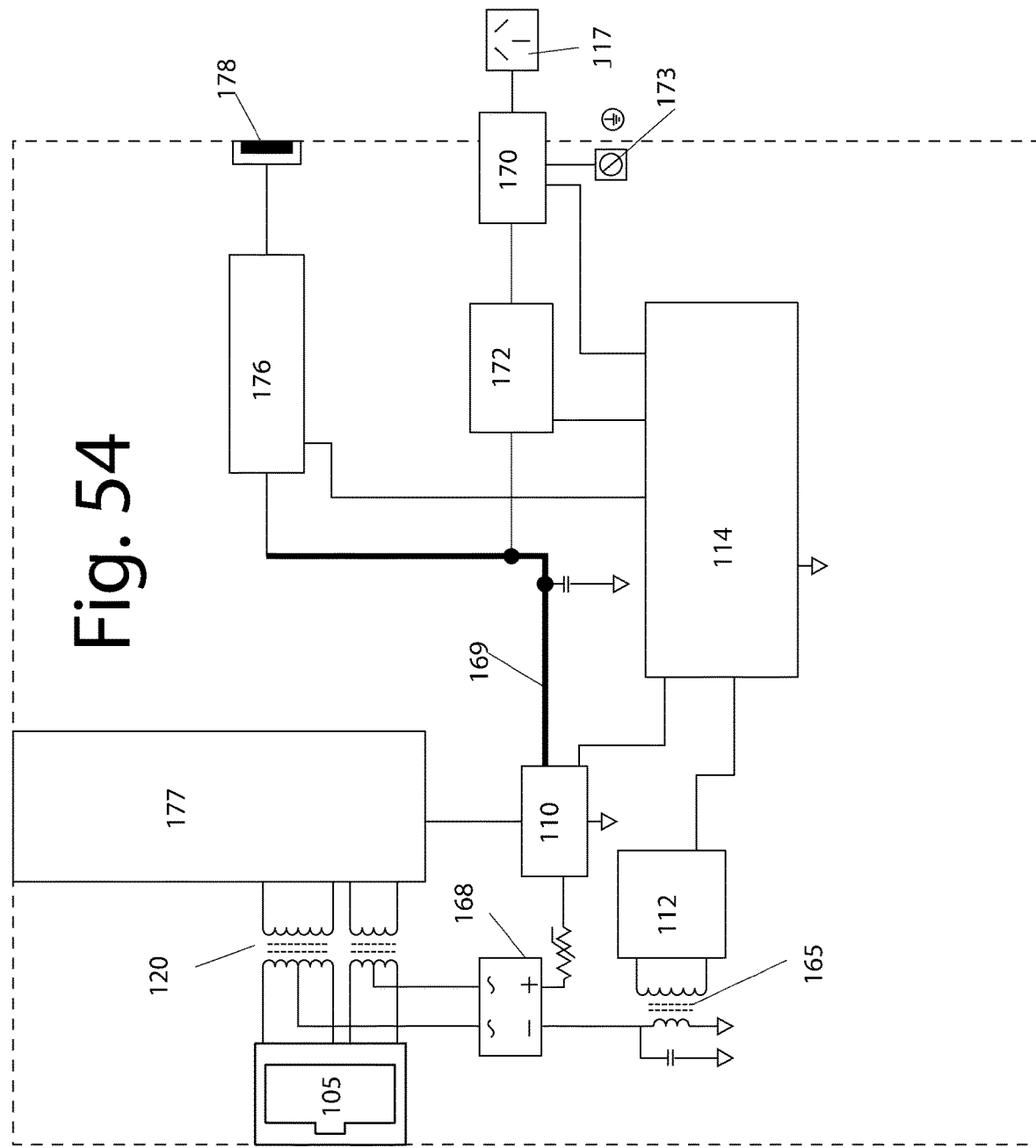
FIG. 54 depicts a schematic diagram of the components of the device shown in FIGS. 52 and 53.
Figure 58:
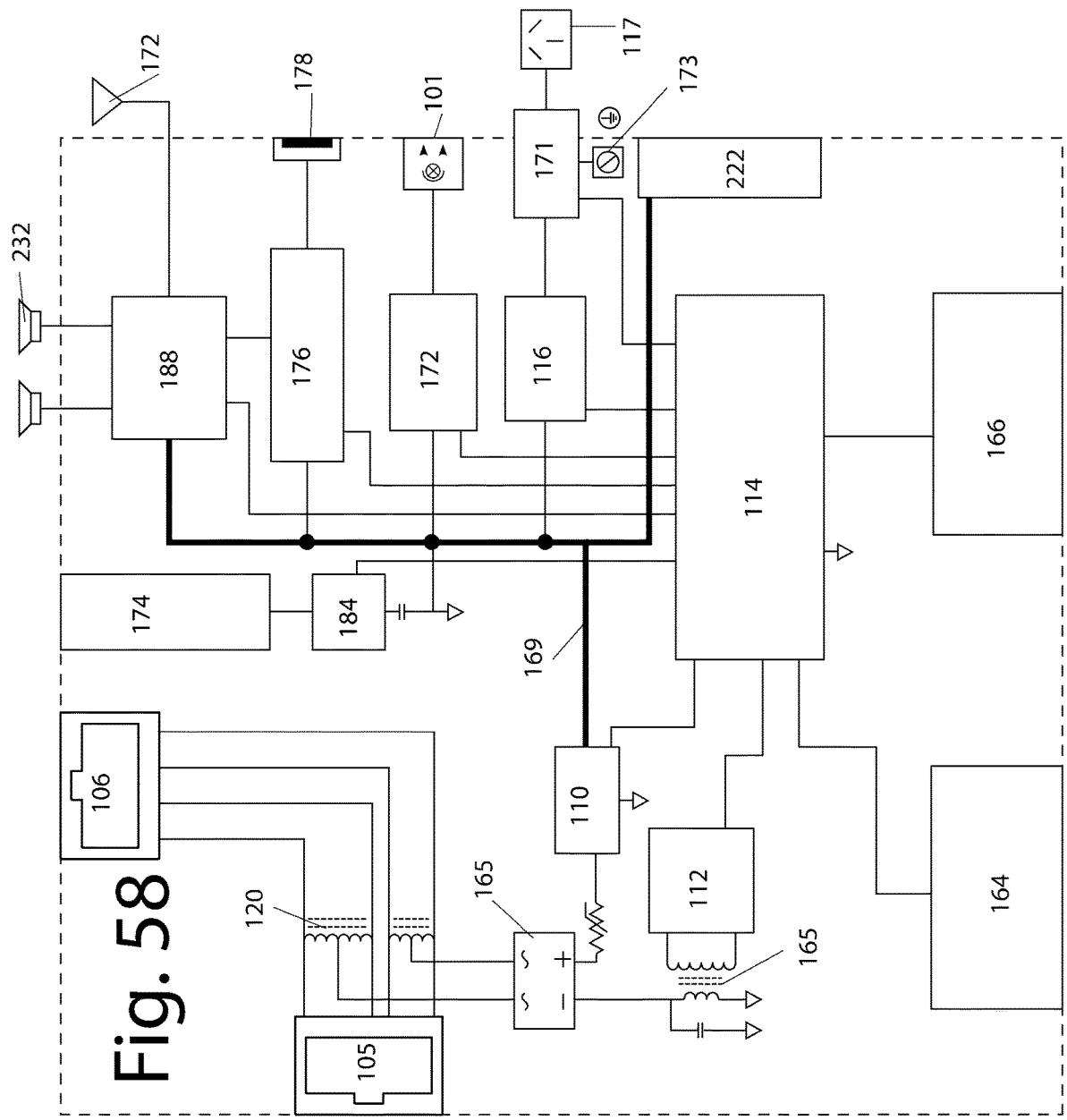
FIG. 58 depicts a schematic diagram of the components of the device shown in FIGS. 55 to 57.
Figure 59:
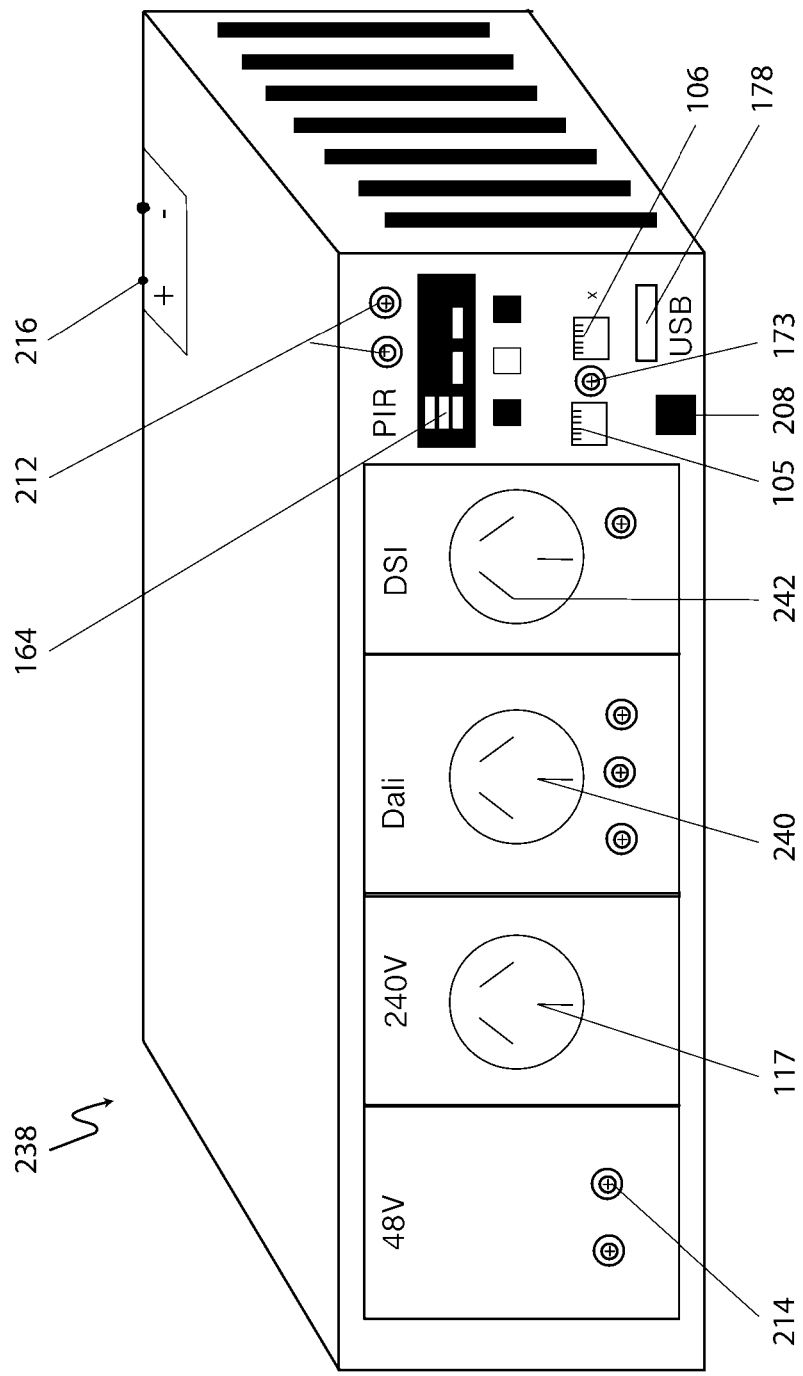
FIG. 59 depicts a lighting PDU.

Wall GPO Outlet 228—Home automationno RJ-45-FIGS. 52 to 53 depict outlet 77 which is similar to outlet 75 except that it does not have any RJ45 106 ports. Outlet 228 receives the supplied DC over POE ports 105 and inverts it into AC power. Both outlets 228 and 224 can output 400-500 W of continuous AC power from the twin POE connections 80 back to the PSE 10. Wireless networking and home automation functionality can be provided by the outlet 224 by the introduction of a wireless communication card into expansion port or wireless networking slot 224 which is accessed from the rear of the outlet 224 Networking slot 224 may be a PCIe express slot for conventional PCIe cards that provide 3G/4G/5G wireless communication, WIFI communication, Zigbee communication or any other future standard not yet invented or adopted that is able to be provided by way of a modular card including PCIe cards. The wireless communication capabilities can be used to control powered devices powered state even in the absence of incoming computer networking signals on ethernet port 105. For instance, a home automation network card could be inserted and used to power and depower lights powered by general power outlet points 117.

Charging and Communications Station 230—Reference is now had to FIGS. 55 to 58 which depict a portable charging, lighting and sound station 230. Charging station 230 is similar in operation and configuration to the earlier described PDUs except that it receives 4 POE connections providing 800 W to 1200 W of power to provide via its AC outlets 117 and USB outlets 178. It has a large internal battery 186 like the tower 218 so that if power is cut off, it can still provide power via its outlets 117 and 178 and operate LED lights 101 to provide emergency lighting. The station also has provision for proprietary charging dock or hub 222 for receiving rechargeable batteries of the sort used in power tools, toys, tablets and recording devices. Individual and/or modular docks can be adapted to be attached to the station 230 via separate adaptors (eg one that adapts the device to charge Makita batteries and another that adapts the device to charge Ryobi batteries) or they can be made unitary with the body of the station 230 in which case the user is limited to charging one type of battery. Station 230 also has speakers 232 and integrated radio receiver 188 for entertainment which can be overridden in an emergency situation to provide an audio broadcast capability in a mine, construction site or other workplace. Station 230 has a handle 236 and optional integrated WIFI. Station 230 is designed for use in remote and dangerous working conditions. Ports may also be optionally provided with IP rating 67 or more for dust and water. In addition to or in the alternative to Wi-Fi, Station 230 can also be provided with femtocells from a mobile telephony carrier. Such femtocells can create pockets of 3G/4G/5G connectivity for mobile telephone devices for when there is no other available signal.

Lighting PDU 238—Reference now turns to FIGS. 38 and 39 which discloses a lighting PDU 238. Lighting PDU 238 is most similar to docking station 204 in that it is depicted as being powered by a single high powered POE connection of 200-300 W DC power received via RJ-45 jack 105. Lighting PDU 238 is designed to be kept in the ceiling or close to the luminaires 84 that are driven and powered by the unit. Power is output in a number of ways including (i) straight DC outputs 214 over dry contacts for powering LEDs that are fed DC power directly; (ii) 240V AC outlets 117 for powering lights that are powered by mains electricity; (iii) Dali outlets 240 comprising an AC outlet and associated DALI signal contacts (for three DALI 3 wires) and a similar DSI outlet 242 which has an AC outlet and twin DSI signal contacts. The controller 114 of the lighting PDU 238 is adapted to turn off, dim, and change colour and frequency of any attached light (provided they are capable) and can do so natively in the case of outlets 214 and 117. However, in the case of outlets 240 or 242, appropriate proprietary signals are translated into DALI and DSI communication protocol for transmission to the connected DALI or DSI luminaires via the lighting protocol adaptor 182. The lighting PDU 238 has PIR inputs 212 to determine occupancy and will talk to remote PSEs 10 and management server 68, over management ports 194, to receive information from other connected sensors 88. The lighting PDU 238 does not have an internal battery but can be connected to one via battery contacts 216. Lighting PDU 238 has an optional control panel 86 which is remotely connected to the unit via RJ45 port 106. The control panel is used so that the screen and buttons, including emergency lighting test button and RCD reset controls can be accessed remotely from inside the illuminated room and not via the ceiling space. The lighting PDU 238 can be used with combined lights and batteries 90 in a way that they comply with emergency lighting rules. The lighting PDU can also be optionally provided with WIFI networking capabilities for providing network to nearby users.

System Topology, Network Signalling and Inverter Commands

Reference is now made to FIG. 61 which depicts Management Server 68 in connection via TCP/IP with a plurality of PSEs 70 which in turn have three daisychained ethernet connections 258, 256 and 254 which have on them of powered devices 26 including LED lights 84, PIRs 88 and control panels or switches 86 and in the case of ethernet connection 258 it has a conventional POE wireless access point located at the terminus of the ethernet connection 258 and in the case of ethernet connection 254 it features a PDU 24 connected to an AC powered device 28 (a 240V powered desk lamp). The powered devices 26 and PDU 24 all have a zone ID associated with the device. These can be set via jumper switches (not shown), a dial selection or programmed via a connected device for storage in a memory module of the PDU 24.

Management server 68 is also connected via TCP/IP network or internet 133 to legacy building management systems 72 via an open API provided by the management server software. Management server software and server 68 are also optionally in communication with a higher level application/server 250 for controlling multiple management server 68.

The application/server 250 uses the information in application data map 266 to communicate and command connected devices. It includes:

Management Server IP address for addressing TCP/IP packets to the relevant management server 68;

PSE IP which is the IP address for individual PSEs 10 forming part of the plurality of PSs 70;

Port No for addressing individual POE connections formed on each port of a PSE 10 forming part of the plurality of PSEs 70;

Device/ID or Zone Id—these are the id assigned to each PD 26 or PDU 24. They can share Zone IDs to put the devices into a pool of devices addressable by a single data packet containing commands or they can be individually numbered so that each device on a MiPoE connection can be addressed individually. The application 250 also maintains information about the status of connected devices in its data map 266. Similarly PSEs 70 also have a data map 264 which is maintained in the memory of each individual PSE 10.

Communication with each PD 26 or PDU 24 is effected via the common mode (longitudinal) signalling system described herein carried over and in conjunction with PoE connections that allow conventional PoE devices such as Wifi access point 96 being able to be powered and communicate at full speeds with PSE 10 and through it, a network switch providing the network signals for transmission by the Wifi access point 96.

The common-mode (longitudinal) control signal of the present invention is injected in a similar way to which the DC signal is injected in the Power Source Equipment (PSE) 10. That is, the control signal, from a modem, is fed via transformer which is then superimposed onto the DC signal by creating a small ripple or perturbation (typically hundreds of millivolts in amplitude) of the DC injected signal. This signal is in turn recovered from the Powered Device (PD) 26 or Power Distribution Unit (PDU) 24 via a similar transformer and feed in modem.

Preferably, modems use a frequency modulated carrier to encode data, otherwise known as Frequency Shift Keying (FSK). To facilitate full duplex communications each modem may operate on separate carrier frequencies. However, it is preferable to operate at half-duplex as this mode enables many more devices to be paralleled off each port. Also, if only half duplex communications are required then both modems could operate at the same carrier frequency. Whilst the modems preferably use a frequency modulation carrier(s), alternative modulation schemes are possible such as, phase, amplitude, pulse position, or Manchester coding. Alternatively, both the phase and amplitude may be modulated in schemes such as Quadrature Amplitude Modulation (QAM). As the amount of data transferred longitudinally across the link is only minimal, various low-baud-rate commercial modem standards are suitable, such as, Bell 103, Bell 202, or V22.

Various commercial communications protocols are suitable for the low-speed longitudinal signalling. As low-cost micro-controllers often contain in-built Universal Asynchronous Receiver Transmitters (UARTs) an asynchronous byte oriented protocol is preferred. However, this signalling could also be implemented using synchronous techniques and/or a bit wide protocols. Preferably, asynchronous framing using a single frame version of the High-level Data Link Control (HDLC) as described in ISO 3309.

In practice a command may be received from a legacy building management system 72 over TCP/IP network which is translated into a command compatible with the system of the present invention which is directed at a specific management server 68 over TCP/IP network which onforwards the command to connected PSE 10. The PSE 10 uses the information received to create packets which are delivered by the common mode signalling system.

One of the aims of the design of the Multi-Drop Longitudinal Signalling System is to help localize much of the signalling traffic. This has the effect of reducing the amount of traffic that is required on this Half-Duplex narrow-band network as well as reducing some of the system administration requirements. For the majority of scenarios, by weight of data traffic, sees the majority of the commands applying directly between PDs 24 and PDUs 26 on the same network port on PSE 10.

It is advantageous for the longitudinal signalling to be modulated at a low baud rate as this dramatically reduces the line termination requirements from short port cable runs of up to 500 metres when no conventional PoE is required (that is, when conventional data in a PoE connection is discarded in favour of MiPOE longitudinal signalling.

The packet structure is given in FIG. 80 together with a table of exemplary commands and a table of ports which both factor into each data packet which is transmitted through the common mode signalling network.

There are seven fields within the protocol, namely, Frame (one byte), Address (one bytes), Length (one byte), Payload or Command (variable length from 0 bytes to 255 bytes), CRC-8 (one byte), Frame (end byte).

Each message is framed with a start and an end byte using a unique byte, typically 170 in binary or 10101010 is typically used as a frame byte. Should this byte be required in the payload it needs to be bounded with an escape character. If the escape code is required in the payload an additional escape character is stuffed into the payload.

The advantageous features of this protocol include a very simple and generic message structure, with error detection using a single byte Cyclic Redundancy Check (CRC-8), protocol level handshaking using the ACK (acknowledge) and NACK (not-acknowledge).

The address consists of a single byte which is separated into a high nibble (4 bits) and a low nibble (4 bits). Each message contains an address which enables up to 16 devices to be separately addressed on each port, thus enabling multiple devices to be either paralleled or even daisy chained onto each port (eg an PDU 24, a controller 86, emergency light 84). Ethernet standards (IEEE 802.3) do not support multi-drop configurations on its differential (transverse mode) signalling as the high data-rates need accurate line termination to the characteristic impedance of the cable, however, the common (longitudinal-mode) signalling operates at a much lower carrier frequency and is therefore much more tolerant of non-ideal line termination, thus enabling multi-drop configurations.

A Port Id is also provided for identifying the port on the PSE 10 that the packet is directed to. For scenarios in which there is communication between devices on the one port, the Port Address is 00 (meaning intra-port communications). All other Port address values (01.15) refer to adjacent ports on the same PSE 10.

The Length is single byte limiting the length of the payload (Command +Data) to only 256 bytes. However, as the Multi-drop interface is using narrow-band longitudinal signalling and most control signalling can be achieved with a handful of bytes, it is unlikely this will pose a real limitation.

As the signal to noise ratio is very high in this link and as the payload lengths are only a short Cyclic Redundancy Check (CRC-8) is required.

The packet structure is focused on localized traffic with control across several PSE 10 or from a legacy BMS 72 to being implemented at the Application 250 (7th ISO Layer). This greatly reduces installation requirements with the vast number of control transactions not requiring application/server 250 to provide any management services. In the most part devices on each MiPOE connection on each port communicate between themselves without either the PSE 10 or management server 68 being involved. It is only once the commend needs to leave the port it originates on that the PSE 10 and management server 68 come into operation as shown below.

Example 1—Intra Port Communication—Zone 1 Communication

Figure 81:
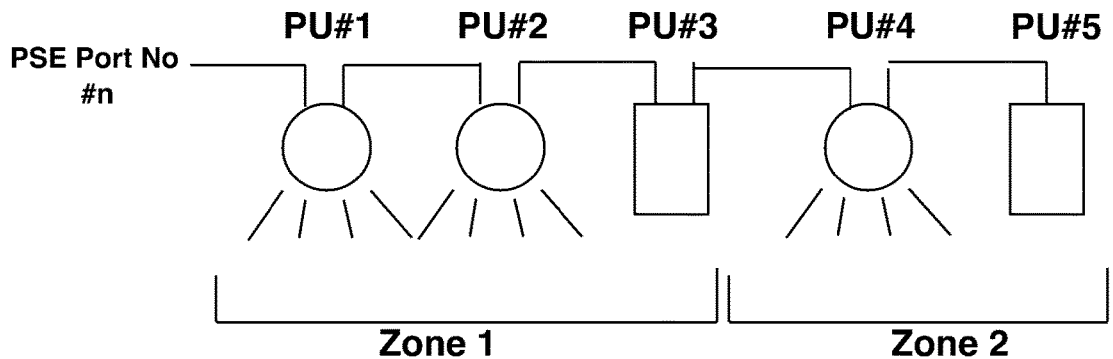
FIG. 81 depicts a first scenario and an exemplary data packet of the sort shown in FIG. 80 according to a first embodiment of the data packet.

FIG. 81 depicts a first scenario in which there is connected to a single MiPoE port two lights 84 and a control panel 86 all set to zone 1 and a further light 84 and control panel 86 set to zone 2. As there are several PDs that can respond to the above broadcast message generated by the light switch no communication acknowledge is required for this command. It should be noted that the data packet of FIG. 81 could be sent by either control panels 86.

As set out in the schematic for the data packet in FIG. 81 it can be seen that a frame value of 170 (in base 10) is utilised followed by the address. The address is 00 for intra-port communication and 01 for zone one. This means that any PD or PDU on this port set to zone 1 will listen and note the contents of the packet which are directed at them. Command No. 1 is included in the packet which is the LIGHT SET command. The value 255 is the maximum value and turns a light on to its maximum brightness. The CRC is calculated in its normal manner and the frame 170 terminates the data packet. This packet would be picked up by PDs 26 set to zone 1 and if they are a light that accepts command 1, will set the light to maximum brightness.

Example 2—Intra Port Communication—Zone 2 Communication

In this example, depicted in FIG. 82, the same components are utilised with the same zone settings as set out in FIG. 81. In this scenario either control panel 86 is able to command the dimming rate and light intensity via commands 2 and 1 set out in the command table of FIG. 80. In the present case the Dim Set Rate has been set to 100 which represents 100 seconds and the Set light rate to 127 which is approximately 50% intensity. This command is received by devices in Zone 2. It may be sent from either control panels 86.

Example 3—Inter Port Communication

Figure 83:
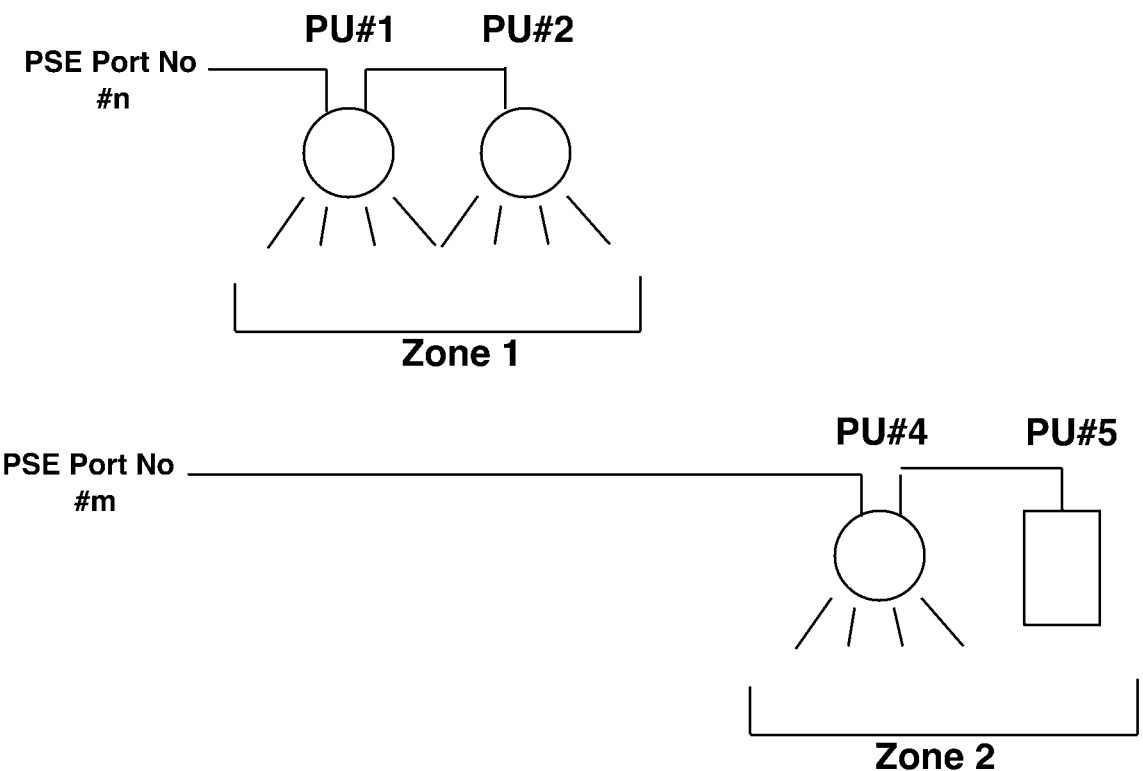
FIG. 83 depicts a third scenario and exemplary data packet of the sort shown in FIG. 80 according to a third embodiment of the data packet.

In this example of FIG. 83 there are two lights 84 located in zone 1 on port #n and a single light 84 and control panel 86 in zone 2 of port #n. In the command depicted, the lights 84 in Zone 1 on port #n would be turned on to their maximum intensity. In this case the PSE 10 listens for any data packet on port #m and notes when any port other than 00 is indicated. PSE 10 then routes that data packet to port #n where it is received by lights 84.

Example 4—External Commands

In some cases where the management server 68 is connected to a local legacy BMS 72 a command may be received by the management server 68 which is connected to a PSE 10 which in turn has a port upon which two lights 84, a control panel 86 and a PDU 24 in Zone 2 are maintained on a MiPOE connection. The initial command is received over TCP/IP and may be in the form of another command structure associated with the legacy BMS 72. This in turn is received and transformed by the application 250 into a MiPoE data packet in accordance with the structure set out in FIG. 80. These data packets formatted for delivery by the PSE 10 are delivered to the PSE 10 using TCP/IP by the application 250.

In the present example the application 250 creates the first packet shown in FIG. 84 which contains the 04 command and value 100 which turns the inverter's AC outlet on (any value other than 1 will turn it on in some embodiments, or if multiple outlets are controllable independently different on and off values could be set for each AC outlet). The PDU 24 receiving the first packet responds by sending the second depicted packet which is an Invertor Status command with the data comprising four bytes representing Iout, Vin, Temp and V Battery values. If the PDU 24 temperature exceeds safe levels or the input (PoE) voltage drops too low, or the output current exceeds a preset value (stored in the invertor) then the PDU 24 will generate a status message indicating the nature of the fault which is picked up by the PSE 10 and communicated to the management server 68 and software 250.

Example 5—Passive Infra Red Sensor Parameter Set

In the present example there is on one MiPoE connection two lights 84 and a control panel 86 together with a PIR 88 as depicted in FIG. 85. In this example a Passive Infrared (PIR) sensor 88 is programmed with the sense delay (the amount of time an occupant is present before it sends a message to the PSE 10). The polling rate sets the highest frequency the PIR is permitted to generate a sense message. These two parameters help reduce spurious network traffic. The response from the sensor is also a two-byte response, like the control command, however, the response represents a two byte (word) contiguous occupancy in seconds (1-65535 seconds).

As can be seen in the examples, the PSE 10, PD 26 and PDU 24 all communicate using the common mode signaling (longitudinal) system of the present invention in ways that minimise data traffic and to provide the capacity to send information back from connected devices that may be operated on by application 250.

The invention claimed is:
1. A power distribution system comprising:
 (i) a power over ethernet connection provided by a first ethernet cable containing ethernet conductors wherein the power over ethernet connection is comprised of at least:
  200 W of DC power; and
  data packets comprised of electrical signals wherein the signals are injected longitudinally across at least some of the ethernet conductors in the ethernet cable; and
 (ii) at least two devices powered and connected to the power over ethernet connection and wherein a first device of the at least two devices has at least two ethernet ports, one for connection to the first ethernet cable and the other for connection to a second device of the at least two devices over a second ethernet cable and wherein the first and second ethernet ports are directly connected such that electrical signals conducted over the first ethernet cable pass through the first device into the second ethernet cable, and wherein at least the first and second devices are adapted to operate on DC power picked off the ethernet conductors.

2. The system of claim 1 wherein the first and second devices of the at least two devices communicate with each other via common mode signaling using modems contained in the first and second devices.

3. The system of claim 2 wherein the system additionally comprises a power source equipment (PSE) with at least one high powered power over ethernet port for creating the power over ethernet connection including providing the 200 W of DC power for transmission over the power over ethernet connection and for communicating with the at least one of the at least two devices via common mode signaling using modems contained in the PSE and devices.

4. The system of claim 3 wherein there are a first and second high powered power over ethernet ports on the PSE creating a first and second power over ethernet connections over which each first and second power over ethernet connections has connected at least two devices on each power over ethernet connection, and wherein at least one of the at least two devices connected to the first high powered power over ethernet ports is able to communicate with at least one of the at least two devices connected to the second high powered power over ethernet port of the PSE, wherein the PSE receives the data packets transmitted on the first power over ethernet connection and directs a data packet along the second power over ethernet connection.

5. The system of claim 3 wherein the PSE is a network switch or a mid spaninjector.

6. The system of claim 3 wherein the PSE also provides via its at least one high powered power over ethernet port full IEEE compliant TCP/IP high bandwidth, high speed data network signals and communications protocols, and wherein the second of the at least two devices is adapted to communicate using conventional TCP/IP networking protocols, and wherein the second device of the at least two devices connected to the PSE with the first device of the at least two devices connected in between the PSE and the second device of the at least two devices, and wherein the first device draws DC power for its operation from the ethernet connection received via one ethernet port of the first device and communicate with at least the PSE via common mode (longitudinal) signaling, and wherein the second device, connected to the first device and PSE is adapted to draw DC power from and/or communicate with the PSE and first device over common mode longitudinal) signaling and also the PSE, using conventional TCP/IP protocol when the second device of the at least two devices is connected to the PSE at terminus of the at least one high powered power over ethernet connection.

7. The system of claim 6 wherein the PSE is in turn connected to an external TCP/IP network which the second device of the at least two devices which are connected to the PSE at the terminus of the at least one high powered power over ethernet connection can communicate with the external TCP/IP network using conventional TCP/IP network protocols.

8. The system of claim 6 wherein the PSE also provides conventional IEEE 802.3 power distribution capabilities to the second device of the at least first and second devices when it is connected to the PSE at the terminus of the power over ethernet connection.

9. The system of claim 6 wherein the longitudinal signaling occurs at rate of up to 2400 baud.

10. The system of claim 6 wherein the longitudinal signaling is used to convey data from the at least first or second devices to the PSE.

11. The system of claim 10 wherein at least one of the first or second devices comprise electronic sensors and wherein the longitudinal signaling is used to sensor data from the at least one of the at least two devices to the PSE.

12. The system of claim 11 wherein the longitudinal signaling is used convey information about the power requirements of one or more of the at least two devices to the PSE.

13. The system of claim 3 wherein the first or second device is a power distribution unit (PDU) which further comprises:
- a DC to AC inverter for inverting DC power to AC power output between 110V and 230V over at least one general power outlet for connecting at least one AC powered device;
- a residual current device (RCD) connected to a path to earth;
- a modem;
- a microcontroller; and
- a supervisor circuit for powering the microcontroller and wherein the supervisor circuit is adapted to respond to the following situations:
  - the common mode DC voltage superimposed on the ethernet bearers is too low; or
  - the common mode DC current is too high; or
  - the temperature is too high.

14. The system of claim 13 when the PDU is the second device of the at least two devices or is otherwise at terminus of the at least power over ethernet connection and wherein:
the PDU is provided in a form of a desktop hub for a computer, and
the power distribution unit further comprises:
a plurality of USB ports including at least one USB PD port for powering a computer or other devices connected to the PDU, including connected displays which receive video signals from the computer for display;
at least one video port for connecting at least one external video display; and
a computer networking interface for communicating with, at least, the PSE via TCP/IP signals over the power over ethernet connection provided by the PSE.

15. The system of claim 13 wherein:
the PDU is provided in the form of a power outlet; and
the PDU provides at least one AC outlet for connecting an AC powered device.

16. The system of claim 13 wherein:
the PDU is provided in the form of a charging station in which there are a plurality of ports for charging connected devices including USB PD ports; and
the power distribution unit further comprises a battery for portable and remote use when charged and in-built LED lighting for emergency or remote illumination.

17. The system of claim 13 wherein:
the PDU is a lighting control PDU which is adapted to receive lighting commands and translate the lighting commands into signals that able to be acted upon by other systems using different protocols; and
the PDU is adapted to output the translated signals to devices connected to the lighting control PDU that operate any one or more of the following protocols:
DALI;
OSI;
0-10V;
Dynalight;
Z wave;
Zigbee;
X10;
Universal Powerline Bus;
OMX; and
CBUS.

18. The system of claim 13 wherein the PDU has a second ethernet port for passing through the power over ethernet connection to downstream devices.

19. The system of claim 1 wherein each first and second device comprises:
a power distribution unit (PDU) with inverter and AC outlet; or
LED light; or
control panel.

20. The system of claim 1 wherein the at least two devices comprise a LED light and a control switch for controlling the LED light.

* * * * *